United States Patent
Komiya et al.

(10) Patent No.: US 10,608,775 B2
(45) Date of Patent: Mar. 31, 2020

(54) OPTICAL TRANSMISSION APPARATUS, OPTICAL TRANSMISSION METHOD, AND OPTICAL TRANSMISSION SYSTEM

(71) Applicant: FUJITSU LIMITED, Kawasaki-shi, Kanagawa (JP)

(72) Inventors: Shinji Komiya, Sapporo (JP);
Norifumi Shukunami, Yokohama (JP);
Makoto Hasegawa, Sapporo (JP);
Tomohiro Yamauchi, Kawasaki (JP);
Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/390,849

(22) Filed: Apr. 22, 2019

(65) Prior Publication Data
US 2019/0349113 A1 Nov. 14, 2019

(30) Foreign Application Priority Data
May 10, 2018 (JP) .................................. 2018-091677

(51) Int. Cl.
*H04J 14/02* (2006.01)
*H04Q 11/00* (2006.01)
(Continued)

(52) U.S. Cl.
CPC ...... *H04J 14/0221* (2013.01); *H04Q 11/0005* (2013.01); *H01S 3/108* (2013.01); (Continued)

(58) Field of Classification Search
CPC .. H04J 14/0221; H04J 14/02; H04Q 11/0005; H04Q 2011/0015; H04Q 2011/0016; H04Q 2011/0039; H04Q 11/00
(Continued)

(56) References Cited

U.S. PATENT DOCUMENTS 6,459,525 B1 * 10/2002 Aso ........................... G02F 1/39
359/326
6,885,499 B1 * 4/2005 Hoshida ............. H04B 10/2942
359/337
(Continued)

FOREIGN PATENT DOCUMENTS

JP 2000-75330 3/2000
JP 2001-75136 3/2001
(Continued)

*Primary Examiner* — Abbas H Alagheband
(74) *Attorney, Agent, or Firm* — Staas & Halsey LLP

(57) ABSTRACT

An optical transmission apparatus includes a splitter configured to split a first wavelength division multiplexed optical signal arranged in a first wavelength band and a second wavelength division multiplexed optical signal arranged in a second wavelength band, respectively, from an optical signal including the first wavelength division multiplexed optical signal and the second wavelength division multiplexed optical signal, a wavelength converter configured to convert a wavelength of the split second wavelength division multiplexed optical signal to generate a third wavelength division multiplexed optical signal to be arranged in the first wavelength band, an optical monitor configured to monitor power of each wavelength channel of the third wavelength division multiplexed optical signal, and a transmitter configured to transmit a monitoring result by the optical monitor to a transmission source node of the optical signal or a relay node of the optical signal.

10 Claims, 48 Drawing Sheets

(51) Int. Cl.
*H01S 3/108* (2006.01)
*H04B 10/564* (2013.01)
*H04B 10/079* (2013.01)

(52) U.S. Cl.
CPC ........ *H04B 10/0797* (2013.01); *H04B 10/564* (2013.01); *H04J 14/02* (2013.01); *H04Q 2011/0011* (2013.01); *H04Q 2011/0015* (2013.01); *H04Q 2011/0016* (2013.01); *H04Q 2011/0039* (2013.01)

(58) Field of Classification Search
USPC .......................................................... 398/48
See application file for complete search history.

(56) References Cited

U.S. PATENT DOCUMENTS

| | | | | |
|---|---|---|---|---|
| 6,891,661 | B2* | 5/2005 | Hayashi | H04B 10/2916 359/334 |
| 8,121,477 | B2* | 2/2012 | Takita | H04Q 11/0005 398/48 |
| 8,588,609 | B2* | 11/2013 | Hiraizumi | H04B 10/07953 398/26 |
| 2003/0053175 | A1* | 3/2003 | Szczepanek | H04B 10/0797 398/164 |
| 2003/0185567 | A1* | 10/2003 | Kurumida | H04J 14/0204 398/79 |
| 2005/0099674 | A1* | 5/2005 | Watanabe | G02F 1/3538 359/330 |
| 2007/0274725 | A1* | 11/2007 | Takeyama | H04B 10/506 398/93 |
| 2009/0274459 | A1* | 11/2009 | Takita | H04Q 11/0005 398/48 |
| 2011/0293273 | A1* | 12/2011 | Futami | G02F 1/3513 398/48 |
| 2014/0233943 | A1* | 8/2014 | Yamakami | H04J 14/0221 398/34 |
| 2016/0315729 | A1* | 10/2016 | Tsuzuki | H04J 14/0221 |
| 2019/0011639 | A1* | 1/2019 | Abediasl | G02B 6/29301 |

FOREIGN PATENT DOCUMENTS

| | | |
|---|---|---|
| JP | 2003-188830 | 7/2003 |
| JP | 2014-165543 | 9/2014 |
| JP | 2016-208310 | 12/2016 |

* cited by examiner

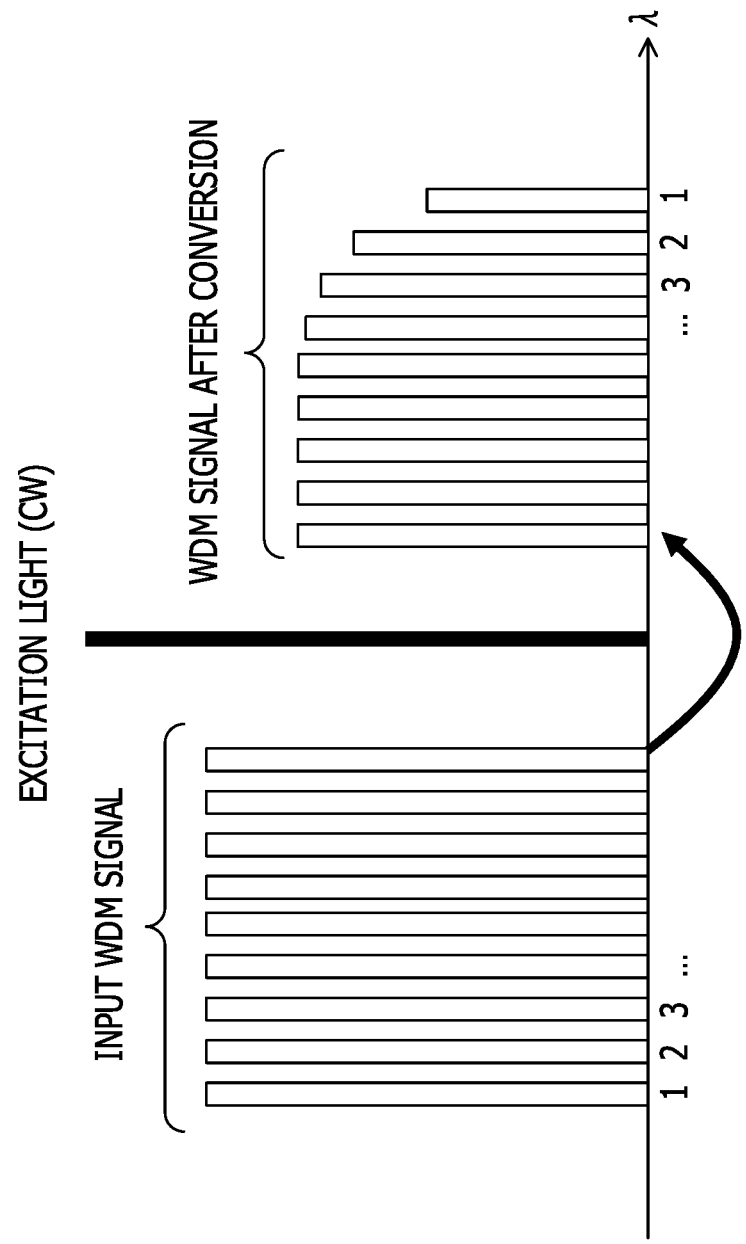

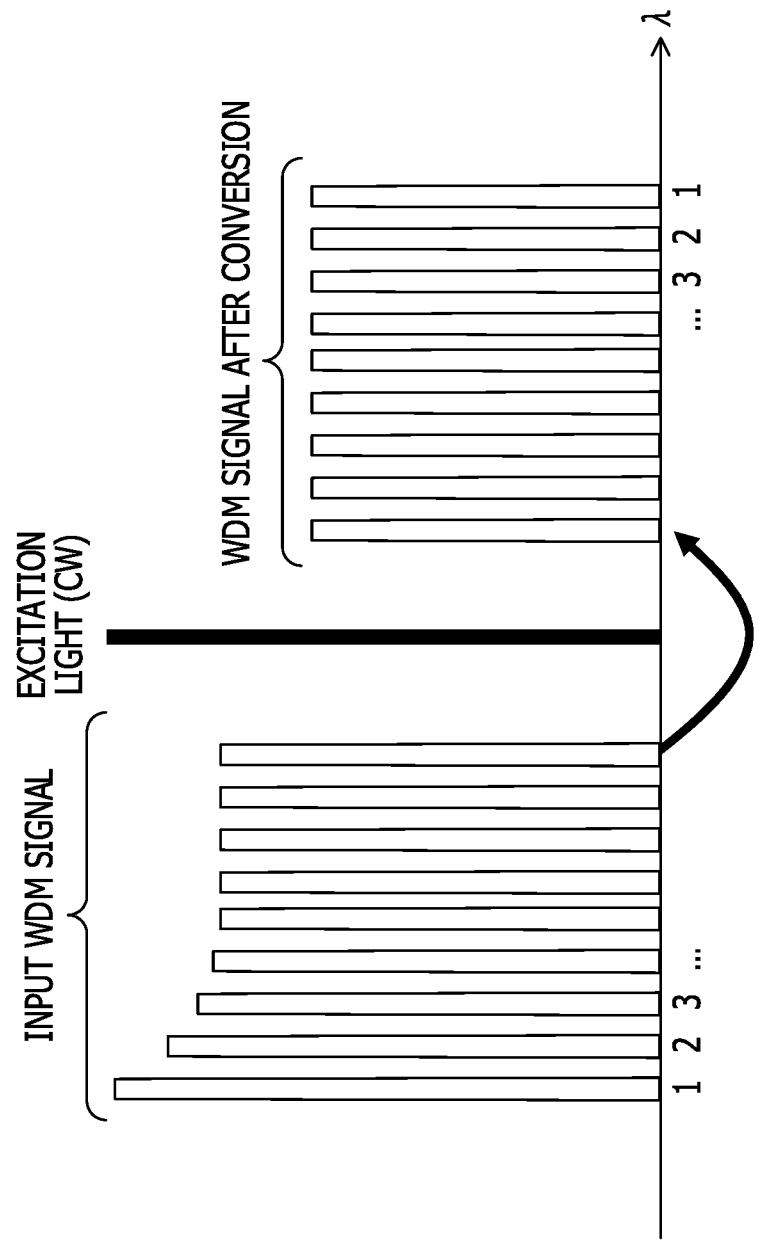

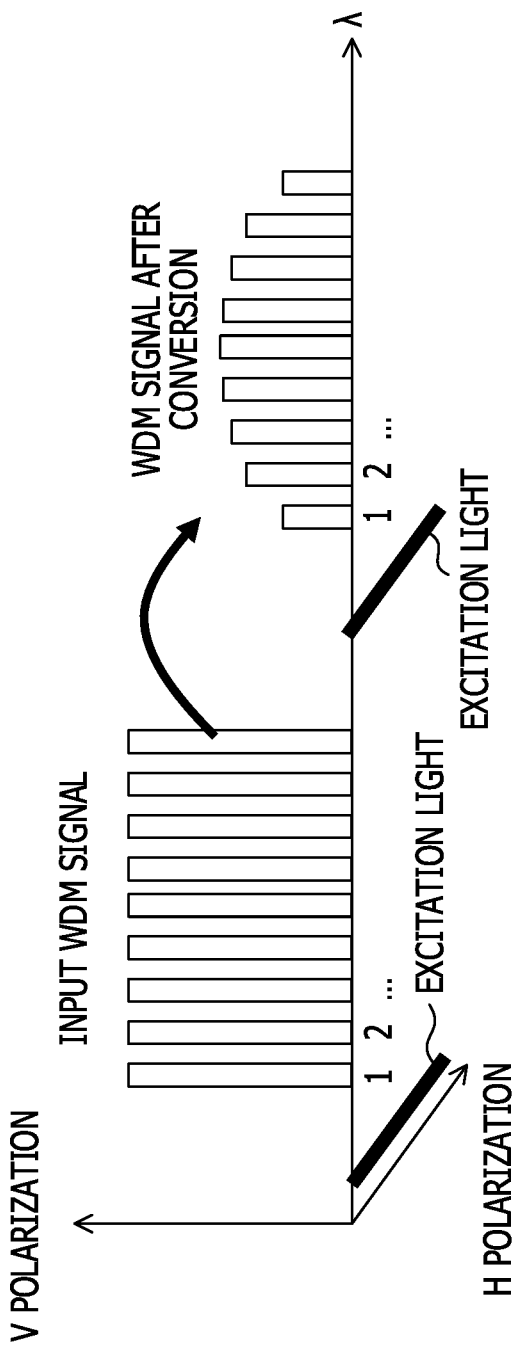
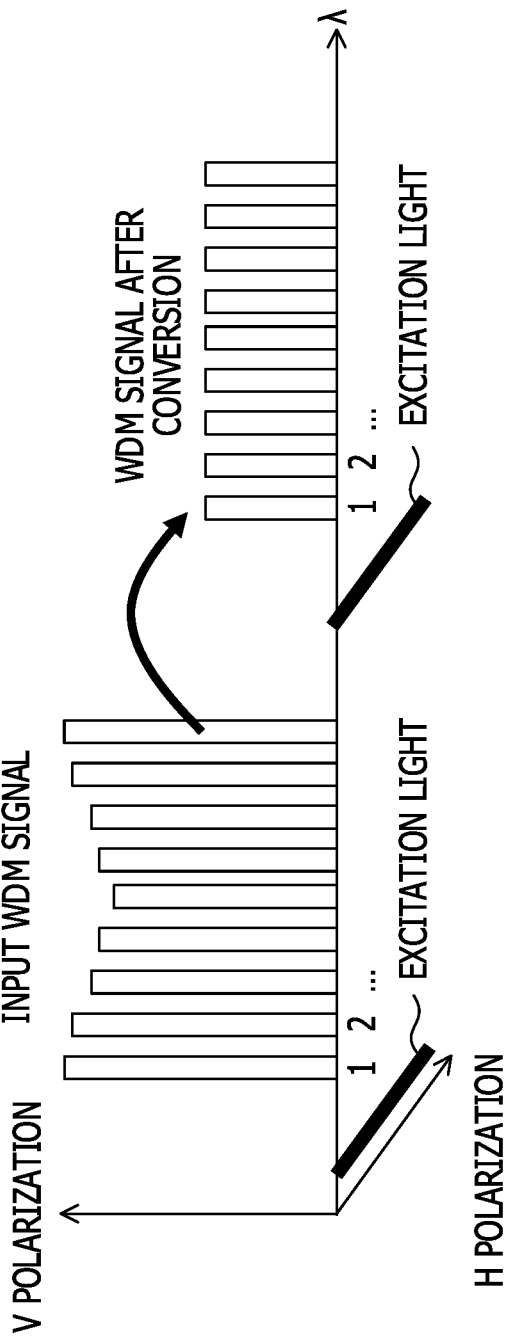
FIG. 5A
FIG. 5B

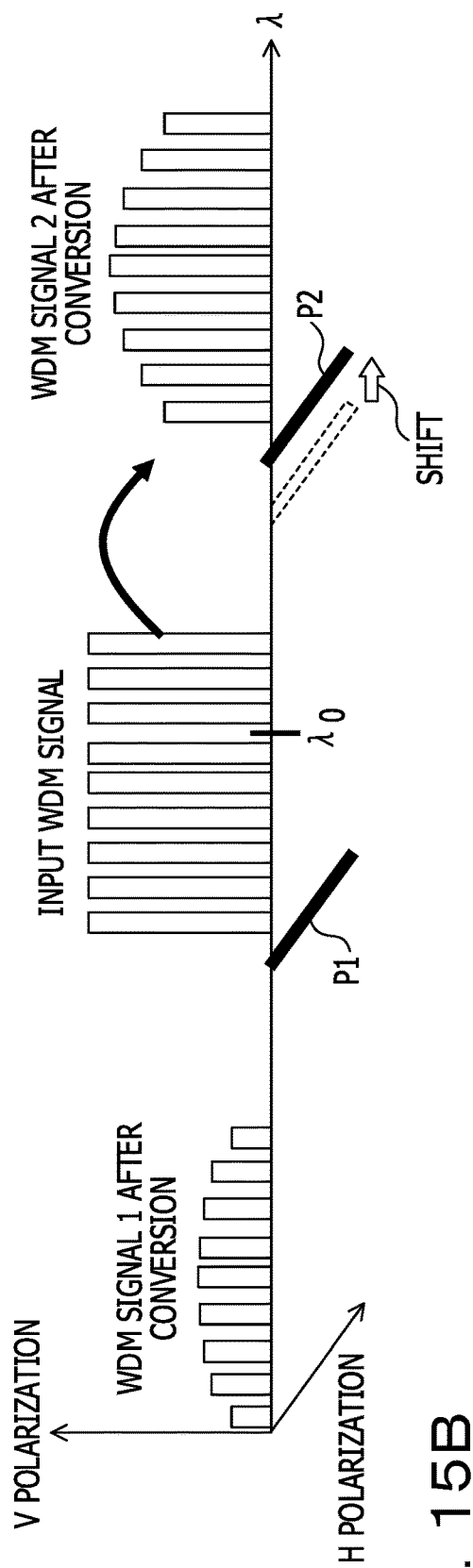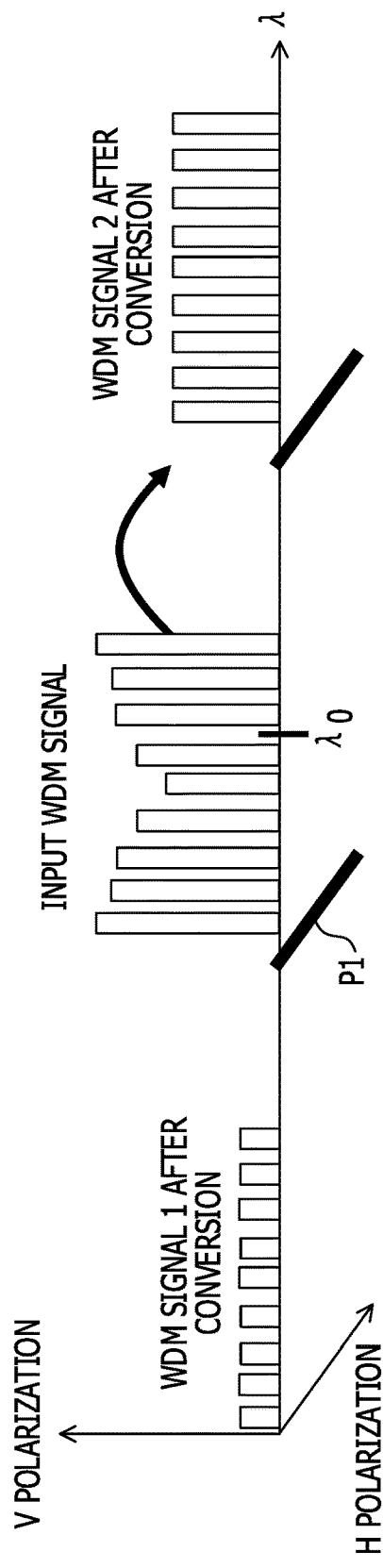

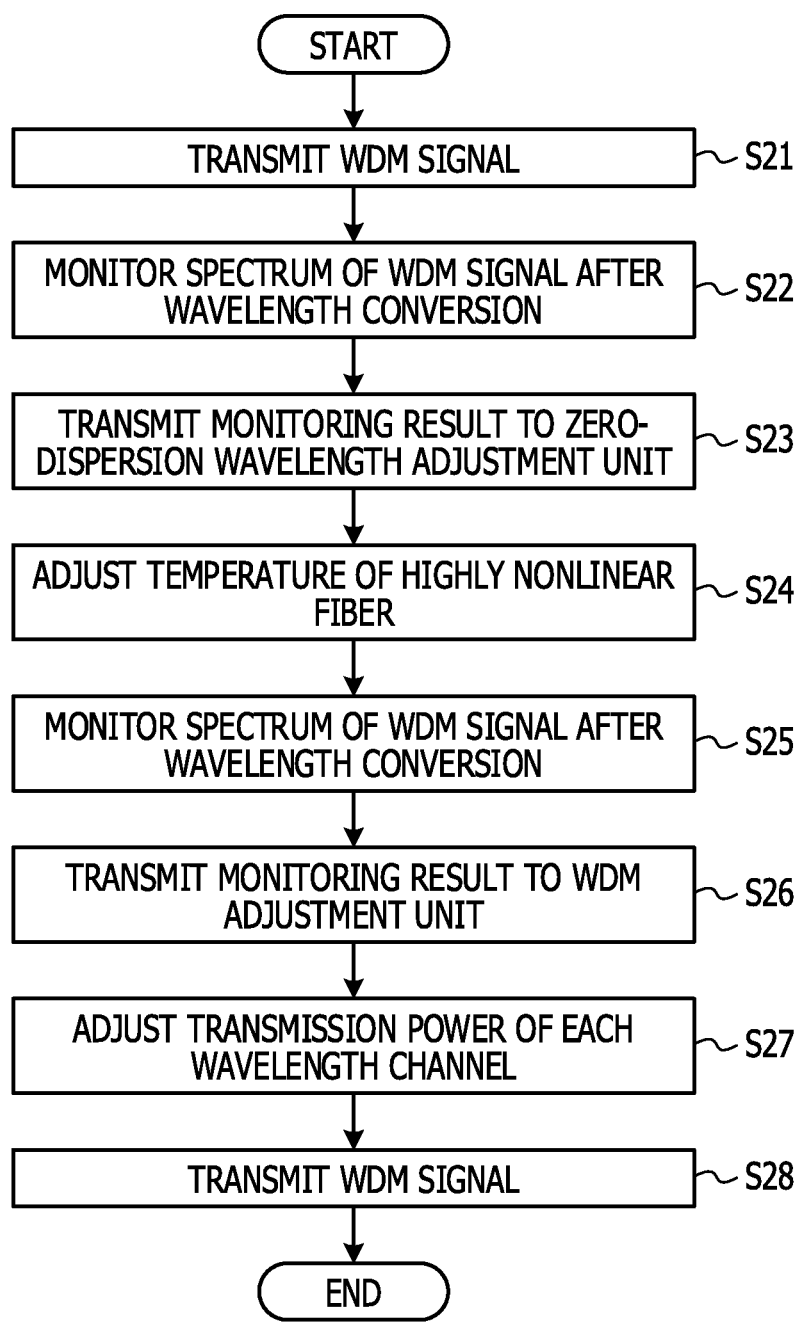

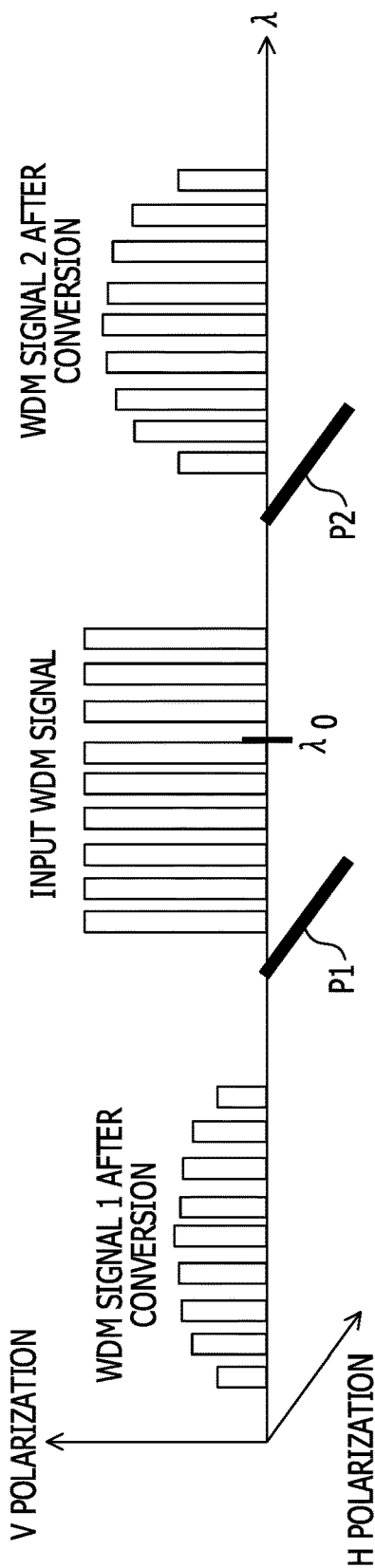
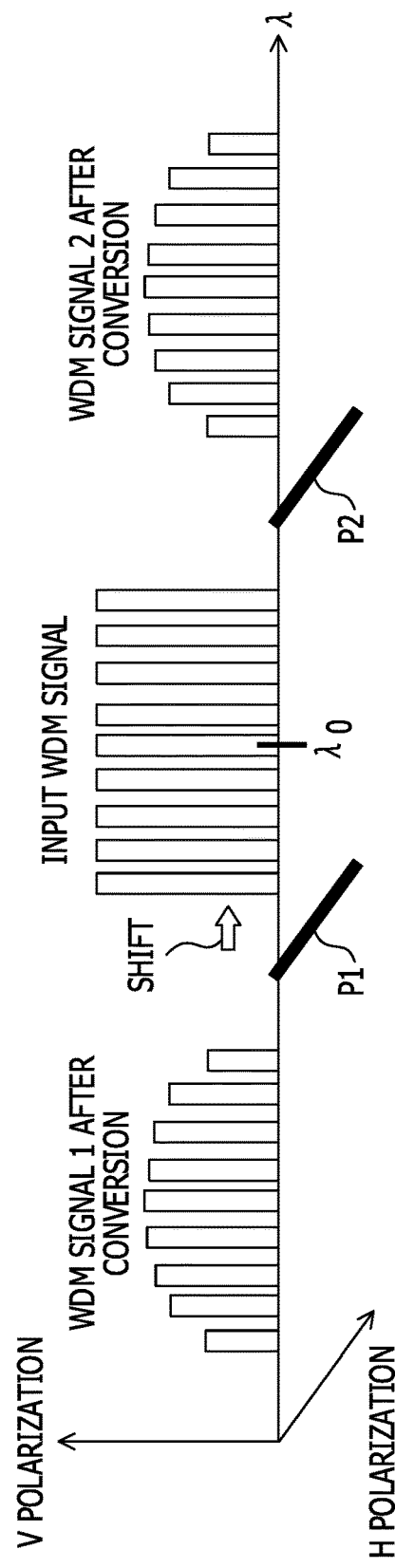
FIG. 21A
FIG. 21B

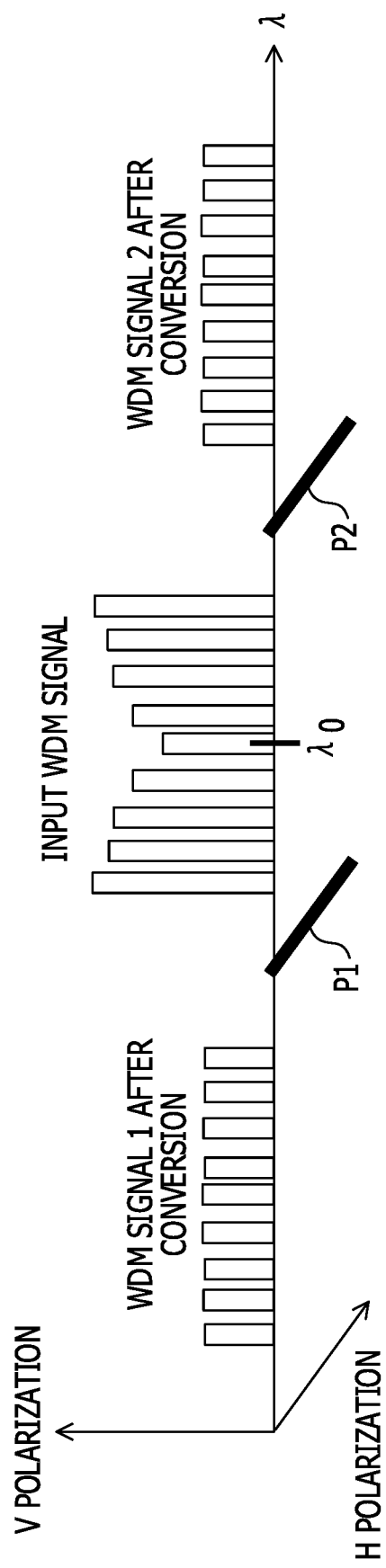

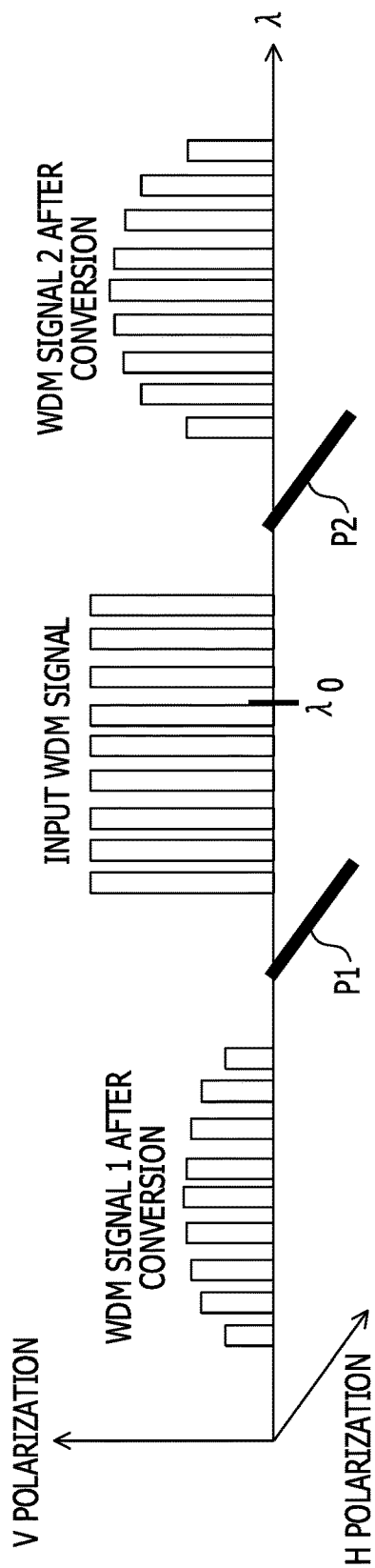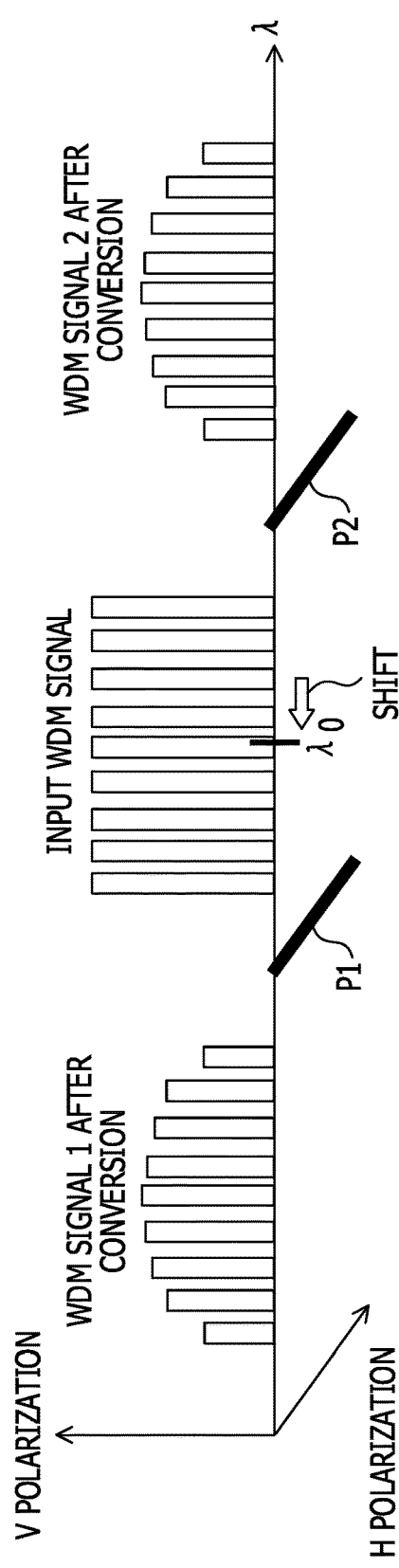

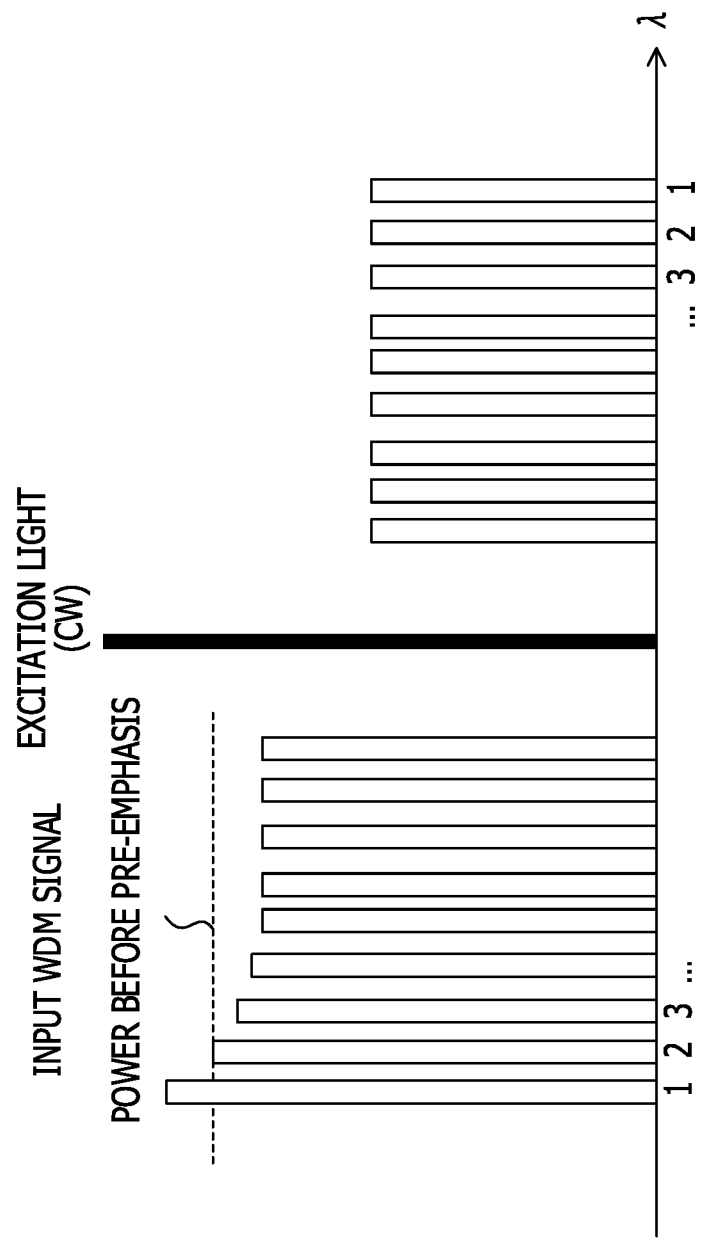

FIG. 42A

| POWER OF OPTICAL SIGNAL BEFORE CONVERSION | POWER OF EXCITATION LIGHT | POWER OF OPTICAL SIGNAL AFTER CONVERSION |
|---|---|---|
| 0 dBm | 20 dBm | APPROXIMATELY -10 dBm |
| -10 dBm | 20 dBm | APPROXIMATELY -20 dBm |
| -20 dBm | 20 dBm | APPROXIMATELY -30 dBm |

FIG. 42B

| POWER OF OPTICAL SIGNAL BEFORE CONVERSION | POWER OF ANOTHER OPTICAL SIGNAL ACTING AS EXCITATION LIGHT | POWER OF PSEUDO SIGNAL |
|---|---|---|
| 0 dBm | 0 dBm | APPROXIMATELY -40 dBm |
| -10 dBm | 0 dBm | APPROXIMATELY -50 dBm |
| -20 dBm | 0 dBm | APPROXIMATELY -60 dBm |

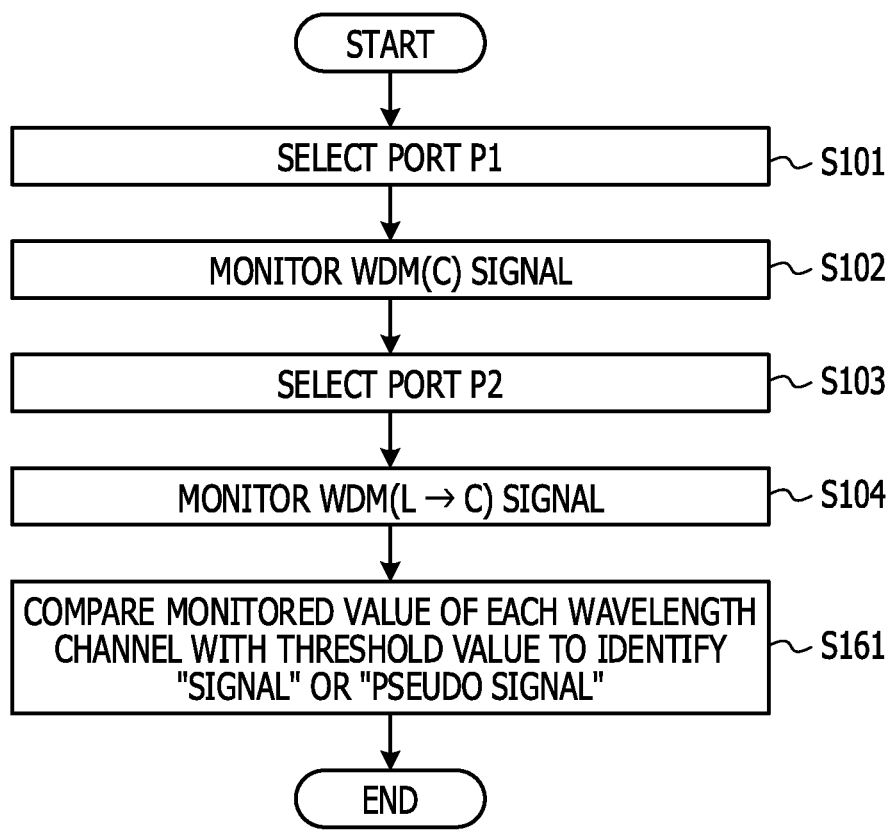

OPTICAL TRANSMISSION APPARATUS, OPTICAL TRANSMISSION METHOD, AND OPTICAL TRANSMISSION SYSTEM

CROSS-REFERENCE TO RELATED APPLICATION

This application is based upon and claims the benefit of priority of the prior Japanese Patent Application No. 2018-91677, filed on May 10, 2018, the entire contents of which are incorporated herein by reference.

FIELD

The embodiments discussed herein are related to an apparatus and method for adjusting or monitoring power of each wavelength channel of a wavelength division multiplexed optical signal.

BACKGROUND

Wavelength division multiplexing (WDM) is widely put to practical use as one technology for increasing capacity of an optical communication network. In a WDM transmission system, a WDM signal is generated by multiplexing a plurality of wavelength channels. Data signals are transmitted through respective wavelength channels in the WDM signal. The WDM signal is arranged in a wavelength band called the C-band (approximately 1530 to 1565 nm), for example.

In order to further increase the capacity of the WDM transmission system, a configuration in which the WDM signal is arranged also in the L-band and/or the S-band in addition to the C-band is proposed. The wavelength of the L-band is longer than that of the C-band, and the wavelength of the S-band is shorter than that of the C-band.

However, a configuration for transmitting the WDM signal using the L-band or the S-band as compared with the C-band is not widespread. For that reason, an optical transceiver for the L-band or S-band is currently expensive. On the other hand, development of a wavelength converter that converts a wavelength of an optical signal between the C-band and another band (L-band or S-band) is proceeding. Accordingly, a large capacity transmission system in which WDM signals are transmitted using the C-band, the L-band, and the S-band, respectively, by combining the optical transceiver for C-band and the wavelength converter for wavelength conversion between the C-band and the other band is proposed.

In Japanese Laid-open Patent Publication No. 2003-188830, a configuration in which a wavelength multiplexed optical signal having a plurality of wavelength bands is amplified by using a predetermined type of optical amplifier for a single wavelength band is proposed.

In Japanese Patent No. 4550187, a method for converting a wavelength using an optical fiber is disclosed.

In Japanese Laid-open Patent Publication Nos. 2014-165543 and 2016-208310, a method for detecting or adjusting power of each wavelength of the WDM signal is disclosed.

However, conversion efficiency of the wavelength converter has wavelength dependency. For that reason, for example, even when a WDM signal of which power of a plurality of wavelength channels is uniform is generated, the power of the plurality of wavelength channels in the WDM signal output from the wavelength converter may not be uniform. In this case, transmission performance (optical signal-to-noise ratio (OSNR), bit error rate (BER), and the like) varies for each wavelength channel.

Accordingly, in an optical transmission system that transmits a plurality of WDM signals having different wavelengths by using wavelength conversion, monitoring each WDM signal to control the characteristics of each WDM signal is demanded. However, when a plurality of WDM signals having different wavelengths are monitored, a plurality of different monitor devices are demanded, which may increase the cost for the optical transmission system.

In view of the matters described above, in the optical transmission system that transmits a plurality of wavelength division multiplexed optical signals using a plurality of wavelength bands, it is desirable to control the characteristics of each wavelength division multiplexed optical signal by monitoring the wavelength division multiplexed optical signal at one wavelength band.

SUMMARY

According to an aspect of the embodiments, an optical transmission apparatus includes a splitter configured to split a first wavelength division multiplexed optical signal arranged in a first wavelength band and a second wavelength division multiplexed optical signal arranged in a second wavelength band, respectively, from an optical signal including the first wavelength division multiplexed optical signal and the second wavelength division multiplexed optical signal, a wavelength converter configured to convert a wavelength of the split second wavelength division multiplexed optical signal to generate a third wavelength division multiplexed optical signal to be arranged in the first wavelength band, an optical monitor configured to monitor power of each wavelength channel of the third wavelength division multiplexed optical signal, and a transmitter configured to transmit a monitoring result by the optical monitor to a transmission source node of the optical signal or a relay node of the optical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating an example of deterioration in signal quality due to wavelength conversion;

FIG. 4 is a view illustrating an example of pre-emphasis of the WDM signal;

FIGS. 5A and 5B are views illustrating examples of wavelength conversion by two excitation light;

FIGS. 15A and 15B are views (part 2) illustrating another example of the wavelength conversion according to the second embodiment;

FIG. 20 is a flowchart illustrating an example of a method for adjusting the optical power in the third embodiment;

FIGS. 21A and 21B are views (part 1) illustrating an example of wavelength conversion according to a fourth embodiment;

FIG. 22 is a view (part 2) illustrating another example of the wavelength conversion according to the fourth embodiment;

FIGS. 24A and 24B are views illustrating an example of a variation of the fourth embodiment;

FIG. 25 is a view illustrating an example of wavelength conversion according to a fifth embodiment;

FIGS. 42A and 42B are tables illustrating examples of a relationship between power of excitation light and power of an optical signal generated by wavelength conversion;

FIG. 43 is a flowchart illustrating an example of an operation of monitoring the WDM signal in consideration of the pseudo signal;

DESCRIPTION OF EMBODIMENTS

Figure 1:
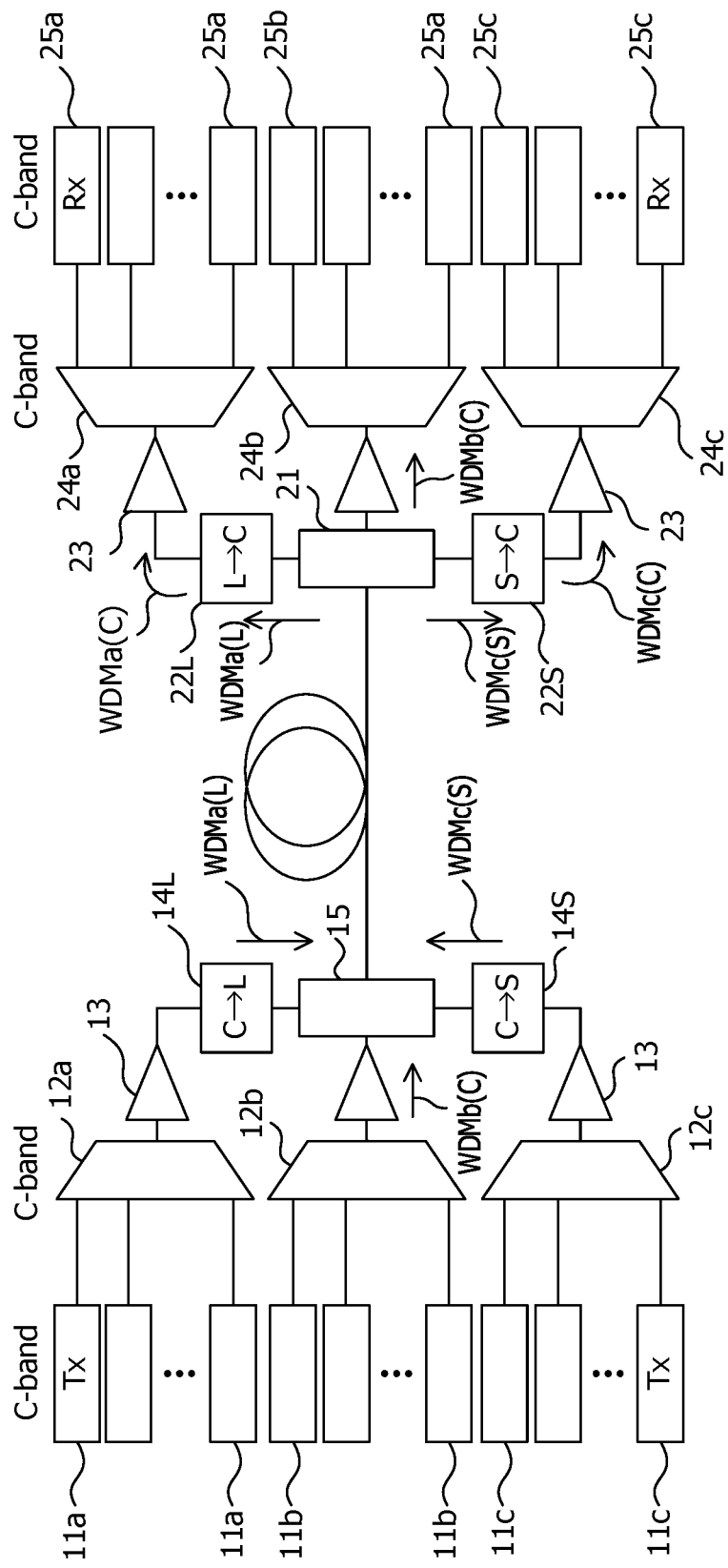
FIG. 1 is a diagram illustrating an example of an optical transmission system.

FIG. 1 illustrates an example of an optical transmission system according to an embodiment of the present disclosure. This optical transmission system transmits an optical signal including a WDM signal arranged in the C-band, a WDM signal arranged in the L-band, and a WDM signal arranged in the S-band.

A WDM transmission device installed on a transmitting side node includes a plurality of transmitters 11a, 11b, and 11c. Each of the transmitters 11a to 11c outputs an optical signal that belongs to the C-band. A WDM multiplexer 12a multiplexes the optical signals output from the plurality of transmitters 11a to generate a WDMa signal. Similarly, a WDM multiplexer 12b multiplexes the optical signals output from the plurality of transmitters 11b to generate a WDMb signal, and a WDM multiplexer 12c multiplexes the optical signals output from the plurality of transmitters 11c to generate a WDMc signal. The WDM signals output from the WDM multiplexers 12a to 12c are arranged in the C-band, respectively. The wavelengths of the plurality of optical signals multiplexed by the WDM multiplexer 12a are different from each other, and the wavelengths of the plurality of optical signals multiplexed by the WDM multiplexer 12b are different from each other, and the wavelengths of the plurality of optical signals multiplexed by the WDM multiplexer 12c are different from each other.

A wavelength converter 14L converts the wavelength of the WDMa signal output from the WDM multiplexer 12a. The wavelength converter 14L performs wavelength conversion from the C-band to the L-band. For example, the WDMa signal to be arranged in the L-band is generated by this wavelength conversion. In the following description, the WDMa signal obtained by wavelength conversion from the C-band to the L-band may be referred to as "WDMa(L) signal". Similarly, a wavelength converter 14S converts the wavelength of the WDMc signal output from the WDM multiplexer 12c. The wavelength converter 14S performs wavelength conversion from the C-band to the S-band. For example, the WDMc signal to be arranged in the S-band is generated by this wavelength conversion. In the following description, the WDMc signal obtained by wavelength conversion from the C-band to the S-band may be referred to as "WDMc(S) signal". Although the wavelength of the WDMb signal output from the WDM multiplexer 12b is not converted, the WDM signal may be referred to as a "WDMb(C) signal".

A multiplexer 15 multiplexes the WDMa(L) signal, the WDMb(C) signal, and the WDMc(S) signal. The WDM signals output from WDM multiplexers 12L, 12C, and 12S may be amplified by optical amplifiers 13, respectively.

In a WDM transmission device installed on a reception side node, a splitter 21 is configured to extract L-band light, C-band light, and S-band light from input light, respectively. Therefore, the splitter 21 extracts the WDMa(L) signal, the WDMb(C) signal, and the WDMc(S) signal from a received optical signal. The splitter 21 is an example of an extraction unit that extracts a first WDM signal arranged in a first wavelength band and a second WDM signal arranged in a second wavelength band from an optical signal including the first WDM signal and the second WDM signal, respectively.

A wavelength converter 22L converts the wavelength of the WDMa(L) signal. The wavelength converter 22L performs wavelength conversion from the L-band to the C-band. For example, the WDMa signal to be arranged in the C-band is generated by this wavelength conversion. In the following description, the WDMa signal obtained by wavelength conversion from the L-band to the C-band may be referred to as a "WDMa(C) signal". Similarly, the wavelength converter 22S converts the wavelength of the WDMc (S) signal. The wavelength converter 22S performs wavelength conversion from the S-band to the C-band. For example, the WDMc signal to be arranged in the C-band is generated by this wavelength conversion. In the following description, the WDMc signal obtained by wavelength conversion from the S-band to the C-band may be referred to as a "WDMc(C) signal". The wavelength of the WDMb(C) signal is not converted.

A WDM demultiplexer 24a splits the WDMa(C) signal for each wavelength. A WDM demultiplexer 24b splits the WDMb(C) signal for each wavelength. A WDM demultiplexer 24c splits the WDMc(C) signal for each wavelength. The respective optical signals obtained by the WDM demultiplexers 24a, 24b, and 24c are received by corresponding receivers 25a, 25b, 25c, respectively. Each of the receivers 25a to 25c is configured to receive the optical signal that belongs to the C-band. The WDM signals input to the WDM demultiplexers 24a to 24c may be amplified by the optical amplifiers 23, respectively.

As such, in the optical transmission system illustrated in FIG. 1, the WDM signal in the L-band is transmitted without using the transmitter and the receiver for the L-band and the WDM signal in the S-band is transmitted without using the transmitter and the receiver for the S-band. For example, the WDM signals in the C-band, L-band, and S-band are transmitted using only the transmitter and the receiver for the C-band. Accordingly, according to the configuration illustrated in FIG. 1, the capacity may be increased while reducing the cost by standardizing parts.

Figure 2:
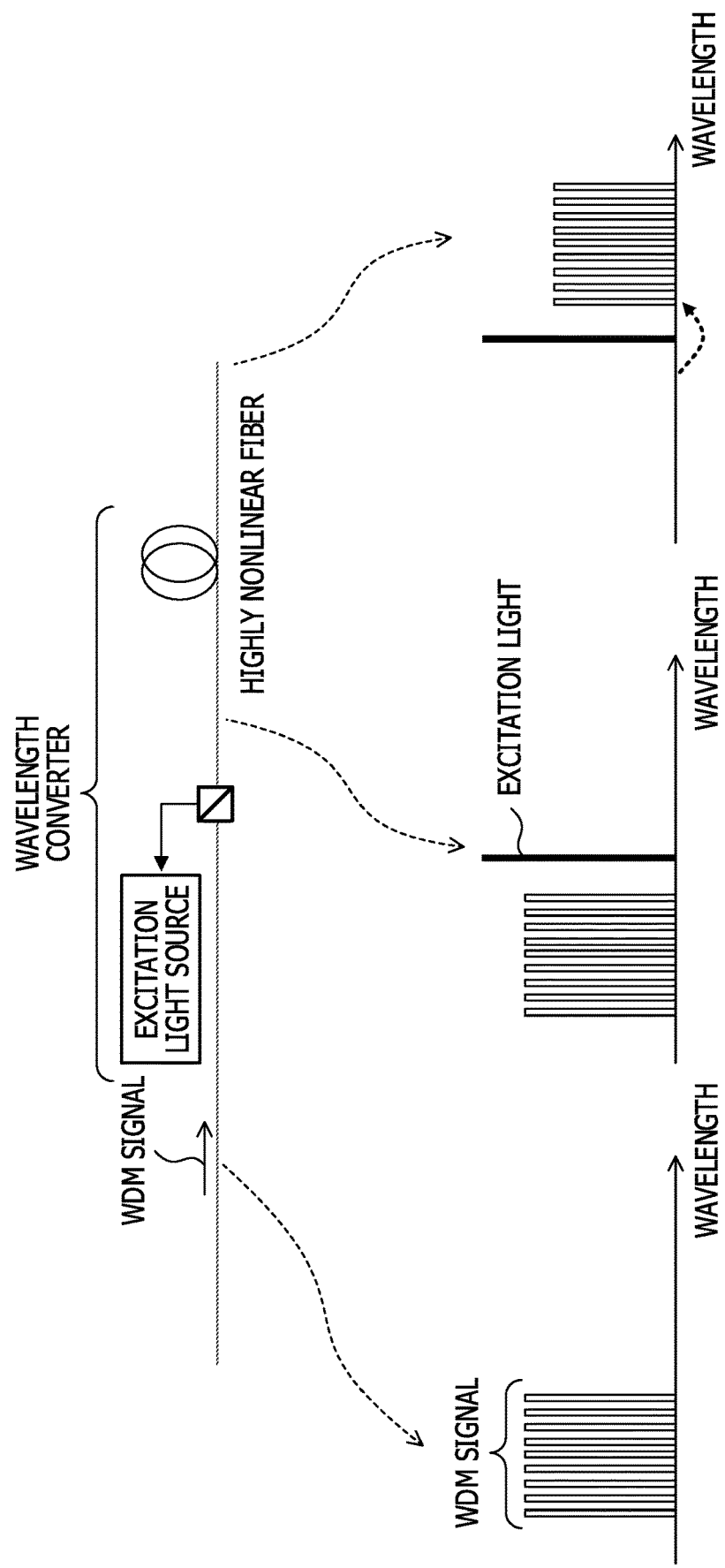
FIG. 2 is a view illustrating an example of wavelength conversion of a WDM signal.

FIG. 2 illustrates an example of wavelength conversion of the WDM signal. In this example, the wavelength converter includes an excitation light source and a highly nonlinear fiber. Then, the wavelength converter multiplexes the input WDM signal and excitation light to be guided to the highly nonlinear fiber. Then, in the highly nonlinear fiber, the wavelength of the WDM signal is converted by four-wave mixing.

FIG. 3 illustrates an example of deterioration in signal quality due to wavelength conversion. The wavelength converter is realized by using a highly nonlinear fiber, for example, as described above. However, wavelength dispersion and group delay of the highly nonlinear fiber have wavelength dependence. For that reason, even if power of each wavelength channel of an input WDM signal (that is, the WDM signal before wavelength conversion) is uniform, the power of each wavelength channel of an output WDM signal (that is, the WDM signal after wavelength conversion) may not be uniform. For example, power of a wavelength channel (channels 1 to 3 in FIG. 3) having a wavelength far away from an excitation wavelength may be smaller than that of a wavelength channel having a wavelength close to the excitation wavelength. When the power of the wavelength channel decreases, signal quality such as the OSNR and bit error rate deteriorates.

FIG. 4 illustrates an example of pre-emphasis of the WDM signal. In this example, pre-emphasis is realized by adjusting power of one or more wavelength channels in the WDM signal at an input side of the wavelength converter. For example, the power of one or more wavelength channels in the WDM signal is adjusted at the input side of the wavelength converter so that the power of each wavelength channel of the WDM signal output from the wavelength converter becomes uniform. This pre-emphasis is realized by feedback control based on the monitoring result of, for example, monitoring the power of each wavelength channel of the WDM signal output from the wavelength converter. By performing such pre-emphasis, variation in the signal quality of each wavelength channel of the WDM signal after the wavelength conversion is suppressed.

In a case where the power of each wavelength channel of the WDM signal is adjusted after the wavelength conversion, a wavelength device such as a wavelength selection switch is wanted, and its configuration becomes complicated. In contrast, in a case where the power of each wavelength channel of the WDM signal is adjusted by pre-emphasis, its configuration is simple.

FIGS. 5A and 5B illustrate examples of wavelength conversion by two excitation light. In the example illustrated in FIGS. 5A and 5B, the WDM signal and the excitation light are multiplexed so that polarization of the WDM signal and polarization of the excitation light are orthogonal to each other. For example, the H-polarized excitation light is applied to the V-polarized WDM signal. If polarizations of the two excitation light are orthogonal to each other, wavelength conversion of the WDM signal of arbitrary polarization is realized.

However, also in this wavelength conversion, power of some wavelength channels in the WDM signal may decrease. In the example illustrated in FIG. 5A, the power of the wavelength channel arranged at end portions of the wavelength band of the WDM signal is reduced. Accordingly, in this case, as illustrated in FIG. 5B, if the power of the wavelength channel arranged at the end portions of the wavelength band of the WDM signal is adjusted by pre-emphasis, the wavelength channels of the WDM signal after the wavelength conversion may be made uniform.

Figure 6:
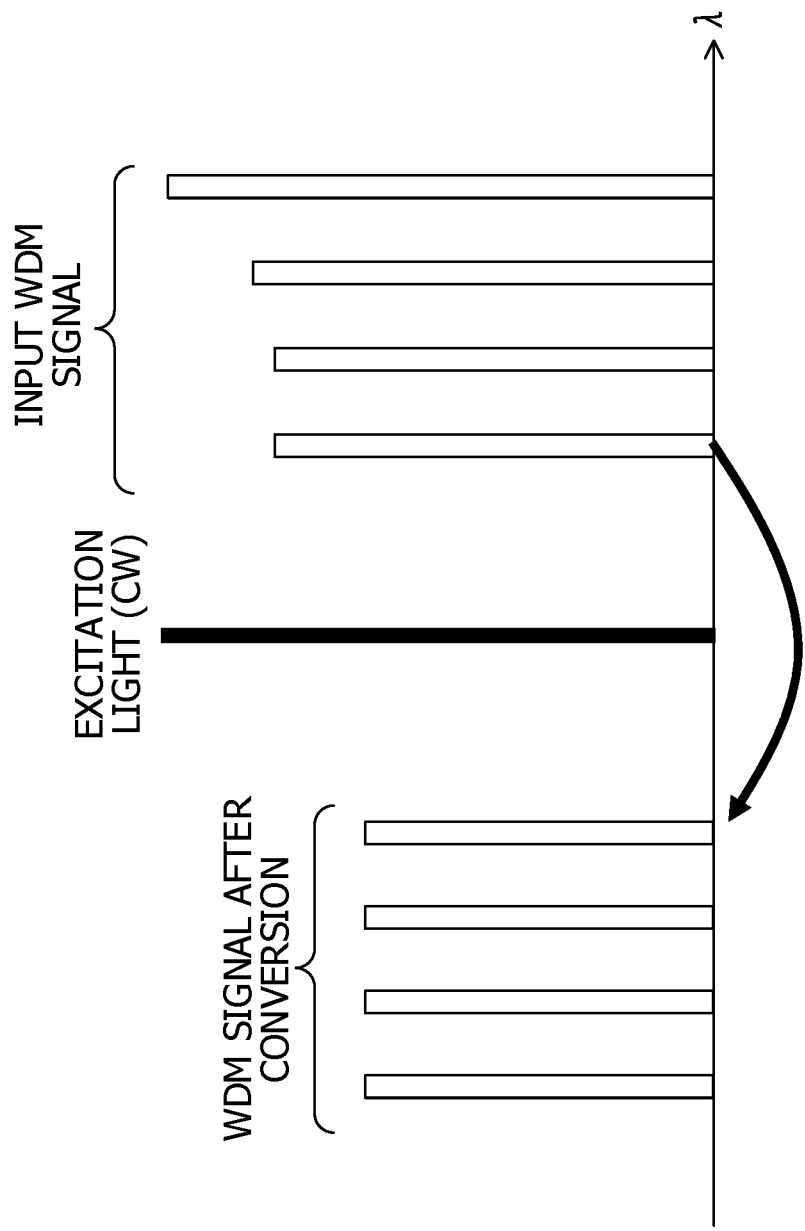
FIG. 6 is a view illustrating an example of wavelength conversion for shortening a wavelength.

In the example illustrated in FIGS. 3 to 5B, wavelength conversion for lengthening the wavelength is performed, but as illustrated in FIG. 6, it is also possible to realize wavelength conversion for shortening the wavelength. The wavelength conversion for shortening the wavelength may be realized in both a configuration using one excitation light and a configuration using two excitation light.

Figure 7:
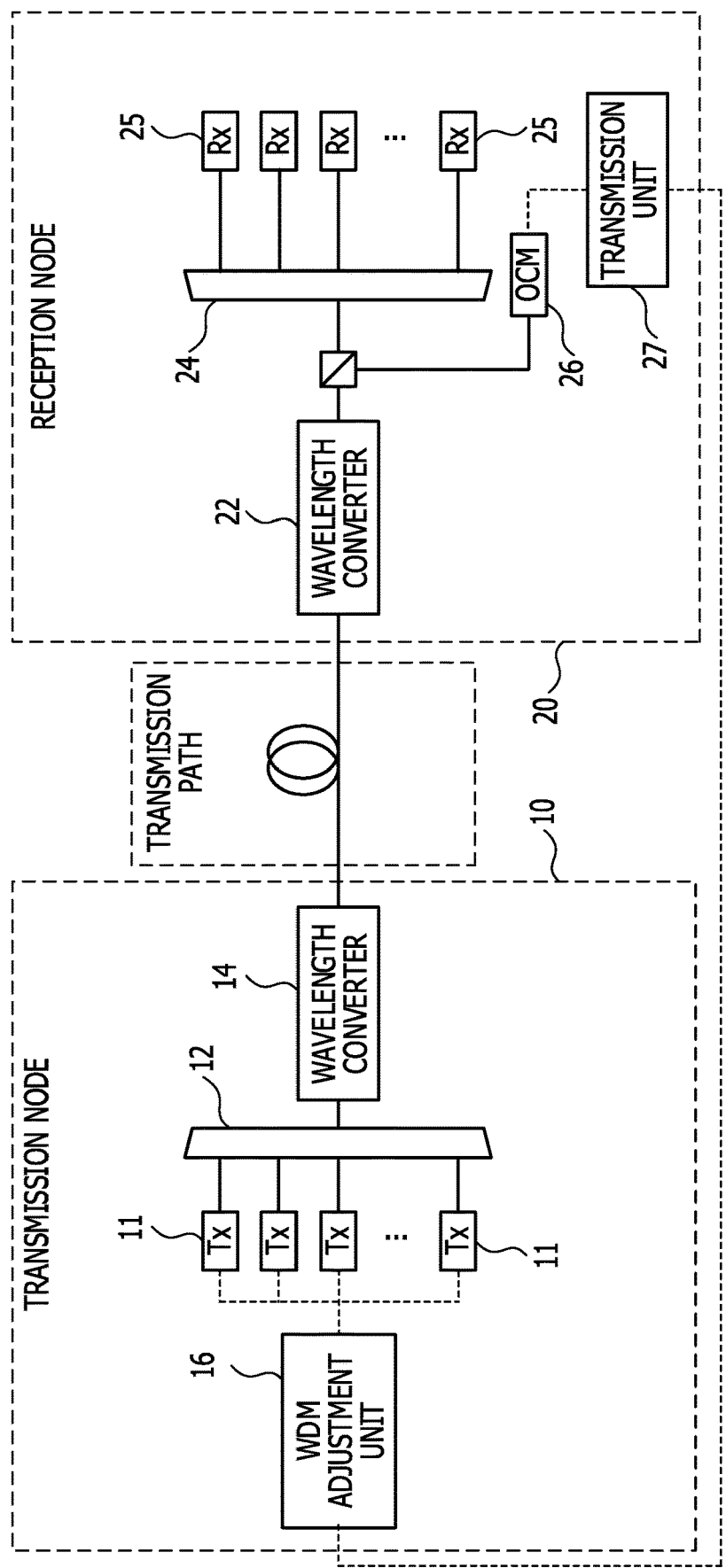
FIG. 7 is a diagram illustrating an example of feedback control for the pre-emphasis.

FIG. 7 illustrates an example of feedback control for the pre-emphasis. In this example, in a transmission node 10, optical signals generated by a plurality of transmitters (Tx)

11 are multiplexed by a WDM multiplexer 12 to generate a WDM signal. The plurality of transmitters 11 generate optical signals having different wavelengths in the C-band.

A wavelength converter 14 converts the wavelength of the WDM signal output from the WDM multiplexer 12. In this example, the WDM signal in the C-band is converted into the WDM signal in the L-band or the WDM signal in the S-band. Then, the WDM signal after wavelength conversion is transmitted from a transmission node 10 to a reception node 20 through an optical transmission path.

In the reception node 20, a wavelength converter 22 converts the wavelength of the received WDM signal. The wavelength converter 22 performs wavelength conversion corresponding to that of the wavelength converter 14. For example, when the wavelength converter 14 generates the WDM signal in the L-band, the wavelength converter 22 converts the WDM signal in the L-band into the WDM signal in the C-band. When the wavelength converter 14 generates the WDM signal in the S-band, the wavelength converter 22 converts the WDM signal in the S-band into the WDM signal in the C-band. Then, the WDM demultiplexer 24 splits the WDM signal for each wavelength to be guided to a corresponding receiver (Rx) 25. Each of the receivers 25 is configured to receive the optical signal in the C-band.

An optical channel monitor (OCM) 26 monitors the power of each wavelength channel of the WDM signal output from the wavelength converter 22. Then, a transmission unit 27 transmits monitoring information indicating the monitoring result of the optical channel monitor 26 to the transmission node 10. For example, the monitoring result on the power of each wavelength channel of the WDM signal output from the wavelength converter 22 is notified from the reception node 20 to the transmission node 10.

A WDM adjustment unit 16 adjusts the power of each wavelength channel of the WDM signal based on the monitoring result notified from the reception node. As an example, the WDM adjustment unit 16 adjusts transmission power of each transmitter 11 so that the power of each wavelength channel detected by the optical channel monitor 26 becomes uniform. In this case, pre-emphasis illustrated in FIGS. 3 to 5B is realized by this feedback control. As a result, the power of each wavelength channel of the WDM signal output from the wavelength converter 22 becomes uniform.

First Embodiment

Figure 8:
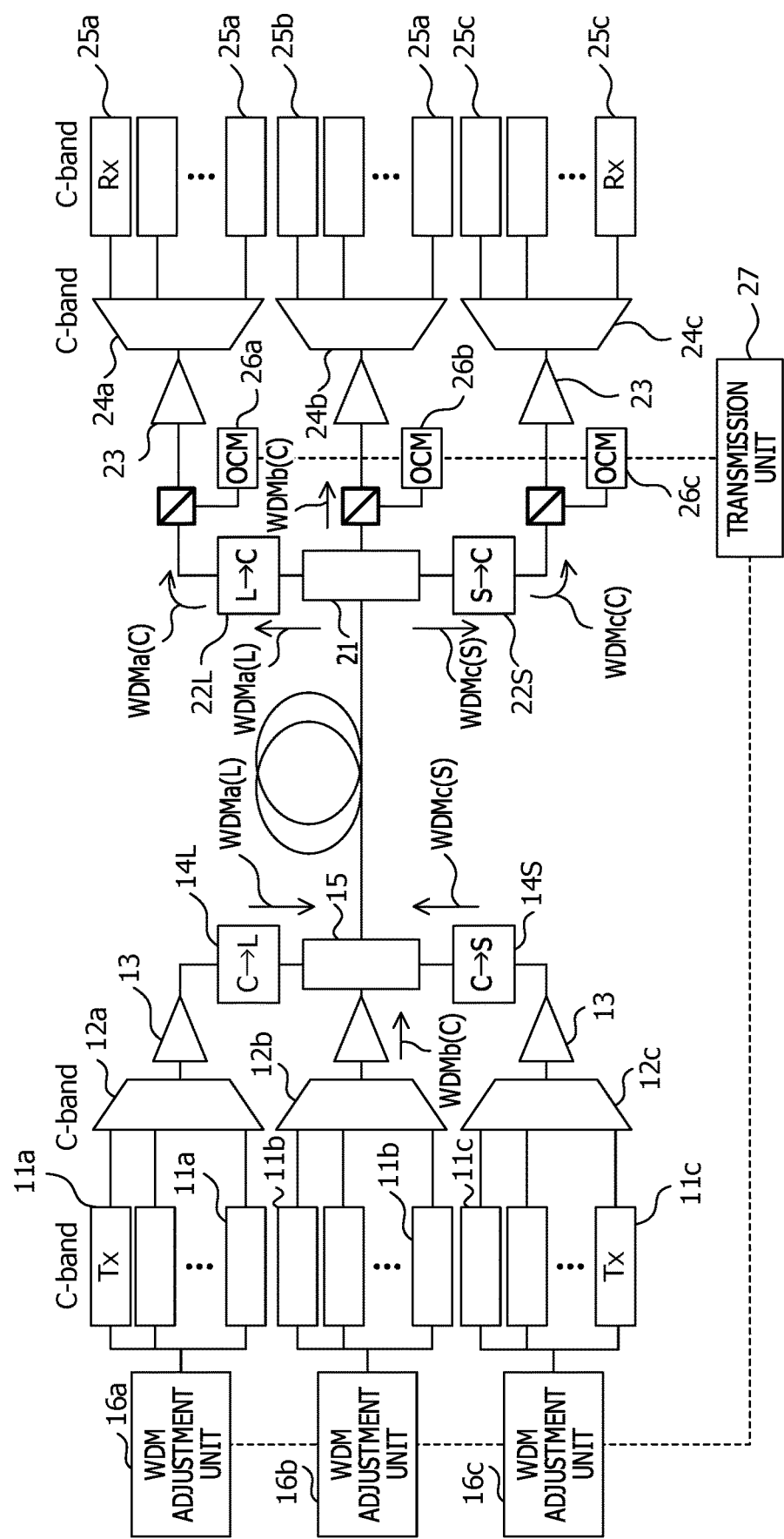
FIG. 8 is a diagram illustrating an example of an optical transmission system according to a first embodiment.

FIG. 8 illustrates an example of an optical transmission system according to a first embodiment of the present disclosure. The plurality of transmitters 11a to 11c, the WDM multiplexers 12a to 12c, the wavelength converters 14L and 14S, the multiplexer 15, the splitter 21, the wavelength converters 22L and 22S, the WDM demultiplexers 24a to 24c, and the plurality of receivers 25a to 25c are substantially the same in FIG. 1 and FIG. 8.

For example, the wavelength converter 14L performs wavelength conversion from the C-band to the L-band on the WDMa signal output from the WDM multiplexer 12a, thereby generating the WDMa(L) signal. The wavelength converter 14S performs wavelength conversion from the C-band to the S-band on the WDMc signal output from the WDM multiplexer 12c, thereby generating the WDMc(S) signal. The wavelength converter 22L performs wavelength conversion from the L-band to the C-band on the WDMa(L) signal, thereby generating the WDMa(C) signal. The wavelength converter 22S performs wavelength conversion from the S-band to the C-band on the WDMc(S) signal, thereby generating the WDMc(C) signal.

As such, the WDMa signal generated from an output optical signal of the plurality of transmitters 11a is arranged in the L-band by the wavelength converter 14L and transmitted, and rearranged in the C-band by the wavelength converter 22L. The WDMc signal generated from the output optical signal of the plurality of transmitters 11c is arranged in the S-band by the wavelength converter 14S and transmitted, and rearranged in the C-band by the wavelength converter 22S. The WDMb signal generated from the output optical signal of the plurality of transmitters 11b is transmitted without being subjected to wavelength conversion.

An optical channel monitor 26a monitors the power of each wavelength channel of the WDMa(C) signal output from the wavelength converter 22L. The monitoring result (that is, monitoring information representing the power of each wavelength channel of the WDMa(C) signal) by an optical channel monitor 26a is notified to the WDM adjustment unit 16a. Then, the WDM adjustment unit 16a adjusts the transmission power of each transmitter 11a based on this monitoring information. As an example, the WDM adjustment unit 16a adjusts the transmission power of each transmitter 11a so that the power of each wavelength channel detected by the optical channel monitor 26a becomes uniform. Therefore, by pre-emphasis based on the feedback control, the power of each wavelength channel of the WDM signal output from the wavelength converter 22L may be made uniform.

Figure 9A:
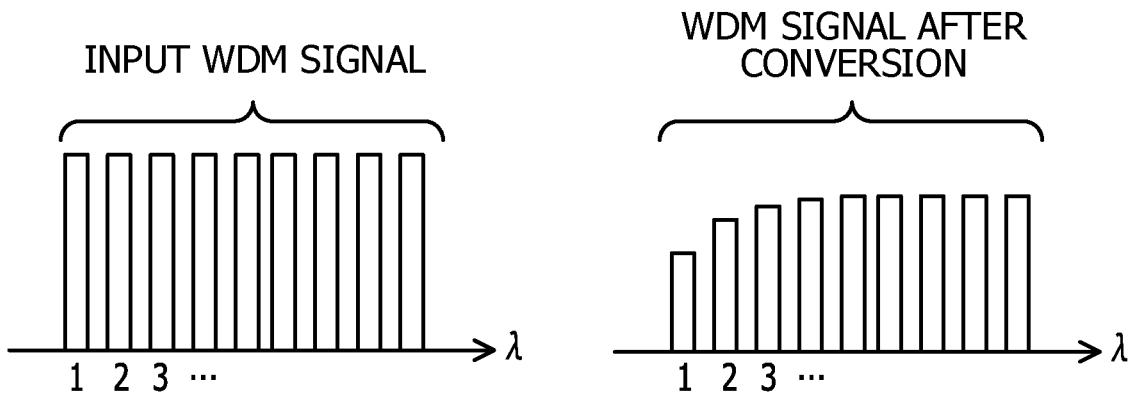
FIGS. 9A to 9C are views illustrating examples of spectra of WDM signals before wavelength conversion and after wavelength conversion.
Figure 9B:
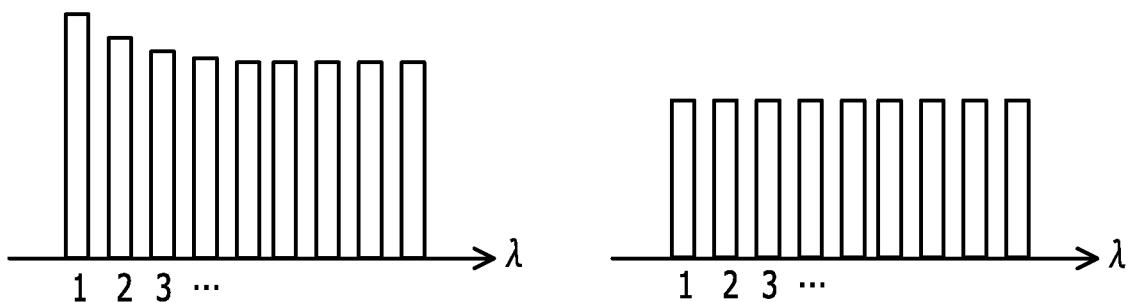
Figure 9C:
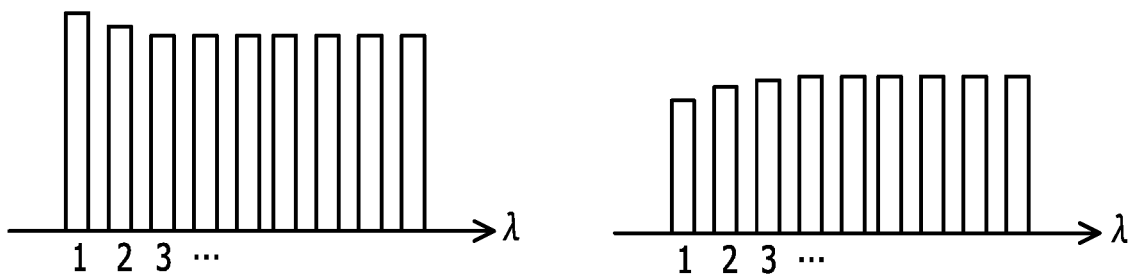

FIGS. 9A to 9C illustrate examples of the spectra of WDM signals before wavelength conversion and after wavelength conversion. In FIGS. 9A to 9C, an "input WDM signal" represents the WDM signal input to the wavelength converter 14L illustrated in FIG. 8 (or the WDM signal output from the WDM multiplexer 12a), and a "WDM signal after conversion" represents the WDM signal output from the wavelength converter 22L illustrated in FIG. 8.

In this example, when pre-emphasis is not performed, as illustrated in FIG. 9A, it is assumed that power of some wavelength channels in the WDM signal after the wavelength conversion decreases. In the example illustrated in FIG. 9A, the power of wavelength channels 1 to 3 in the WDM signal after the wavelength conversion is lower than that of the other wavelength channels.

The WDM adjustment unit 16a executes feedback control so that the power of each wavelength channel of the WDM signal after wavelength conversion becomes uniform. For example, as illustrated in FIG. 9B, the WDM adjustment unit 16a performs pre-emphasis to increase the transmission power of the wavelength channels 1 to 3. As a result, the power of each wavelength channel of the WDM signal after the wavelength conversion becomes uniform.

The optical channel monitor 26c monitors the power of each wavelength channel of the WDMc(C) signal output from the wavelength converter 22S. The monitoring result by the optical channel monitor 26c (that is, monitoring information representing the power of each wavelength channel of the WDMc(C) signal) is notified to the WDM adjustment unit 16c. Then, the WDM adjustment unit 16c adjusts the transmission power of each transmitter 11c based on this monitoring information. As an example, the WDM adjustment unit 16c adjusts the transmission power of each transmitter 11c so that the power of each wavelength channel detected by the optical channel monitor 26c becomes uniform. Therefore, by this feedback control, the power of each wavelength channel of the WDM signal output from the wavelength converter 22S may be made uniform.

The WDMb(C) signal generated from the output optical signal of the plurality of transmitters 11b is transmitted without being subjected to wavelength conversion. The optical channel monitor 26b monitors the power of each wavelength channel of the WDMb(C) signal. The monitoring result by the optical channel monitor 26b (that is, monitoring information representing the power of each wavelength channel of the WDMb(C) signal) is notified to the WDM adjustment unit 16b. The WDM adjustment unit 16b adjusts the transmission power of each transmitter 11b based on this monitoring information. As an example, the WDM adjustment unit 16b adjusts the transmission power of each transmitter 11b so that the power of each wavelength channel detected by the optical channel monitor 26b becomes uniform. Therefore, by this feedback control, the power of each wavelength channel of the WDM signal that is not subjected to wavelength conversion can also be made uniform.

In this manner, in the optical transmission system illustrated in FIG. 8, the WDMa signal transmitted from the transmitter 11a to the receiver 25a is converted from the C-band to the L-band at the transmission side, and is reconverted from the L-band to the C-band at the reception side. The WDMb signal transmitted from the transmitter 11b to a receiver 25b is transmitted using the C-band without being subjected to wavelength conversion. The WDMc signal transmitted from the transmitter 11c to a receiver 25c is converted from the C-band to the S-band at the transmission side, and is reconverted from the S-band to the C-band at the reception side. Therefore, the WDM transmission device installed in each node is realized by an apparatus or circuit that processes C-band optical signals, except for the wavelength converter. The optical channel monitors 26a to 26c are also realized by a configuration for monitoring the WDM signal in the C-band.

In the feedback control illustrated in FIG. 9B, pre-emphasis to make the power of each wavelength channel of the WDM signal after wavelength conversion uniform is performed, but the first embodiment is not limited thereto. For example, as illustrated in FIG. 9C, pre-emphasis may be performed to suppress variation in the power of the wavelength channel of the WDM signal after wavelength conversion to one half. As an example, when pre-emphasis is not performed, the power of the wavelength channels 1, 2 and 3 is reduced by 4 dB, 2 dB, 1 dB, respectively, as compared with other wavelength channels, due to wavelength conversion. In this case, the WDM adjustment unit 16 increases the transmission power of the wavelength channels 1, 2, and 3 by 2 dB, 1 dB, and 0.5 dB, respectively. Then, the power of the wavelength channels 1, 2, and 3 of the WDM signal after wavelength conversion is controlled to be lower than the other wavelength channels by 2 dB, 1 dB, and 0.5 dB, respectively.

When such pre-emphasis is performed, characteristic variation occurring in the optical amplifier installed at the input side of the wavelength converter (for example, the wavelength converter 14L) and characteristic dispersion occurring in the optical amplifier installed at the output side of the wavelength converter (for example, the wavelength converter 22L) are canceled out. For example, in the example illustrated in FIG. 9C, since the power of the wavelength channels 1 to 3 in the input WDM signal is relatively large, the SNR is higher than that of the other wavelength channels. On the other hand, since the power of the wavelength channels 1 to 3 in the WDM signal after the wavelength conversion is relatively small, the SNR becomes lower than that of the other wavelength channels. Accordingly, the SNR of each wavelength channel of this WDM signal is substantially the same.

Figure 10:
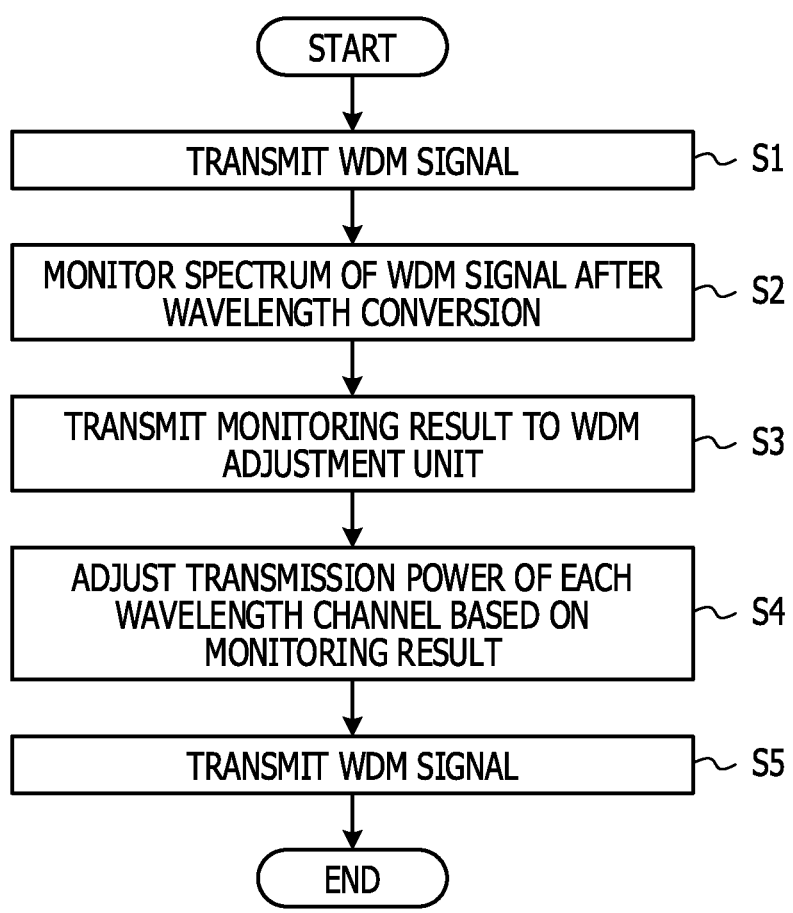
FIG. 10 is a flowchart illustrating an example of a method for adjusting optical power in the first embodiment.

FIG. 10 is a flowchart illustrating an example of a method for adjusting optical power in the first embodiment. The process of this flowchart is executed for each WDM signal.

In S1, the transmission node transmits a WDM signal. It is assumed that pre-emphasis is not performed at this point in time.

In S2, the optical channel monitor 26 (26a, 26b, and 26c) installed in the reception node monitors the spectrum of the received WDM signal. For example, the optical channel monitor 26 monitors the spectrum of each wavelength channel of the WDM signal after wavelength conversion.

In S3, the reception node notifies the transmission node of the monitoring result of the optical channel monitor 26. For example, monitoring information representing the power of each wavelength channel of the wavelength converted WDM signal is sent from the reception node to the transmission node.

In S4, the WDM adjustment unit 16 (16a, 16b, and 16c) installed in the transmission node calculates the transmission power of each wavelength channel based on the monitoring result notified from the reception node. In this case, the WDM adjustment unit 16 calculates the transmission power of each wavelength channel, for example, so that the power of each wavelength channel measured by the optical channel monitor 26 is the same. Then, the WDM adjustment unit 16 adjusts the transmission power of each wavelength channel according to the calculation result.

In S5, the transmission node transmits the WDM signal. For example, the WDM signal on which pre-emphasis is performed is transmitted. As a result, at the reception node, the power of each wavelength channel of the WDM signal after the wavelength conversion becomes uniform. The WDM adjustment unit 16 and the optical channel monitor 26 may repeat processes of S2 to S5.

FIGS. 11A and 11B, and FIGS. 12A and 12B illustrate examples of a configuration for adjusting the transmission power of each wavelength channel. In the example illustrated in FIG. 8, the WDM adjustment unit 16 corresponds to the WDM adjustment units 16a, 16b, or 16c. Monitor information representing the power of each wavelength channel of the wavelength converted WDM signal is given to the WDM adjustment unit 16.

Figure 11A:
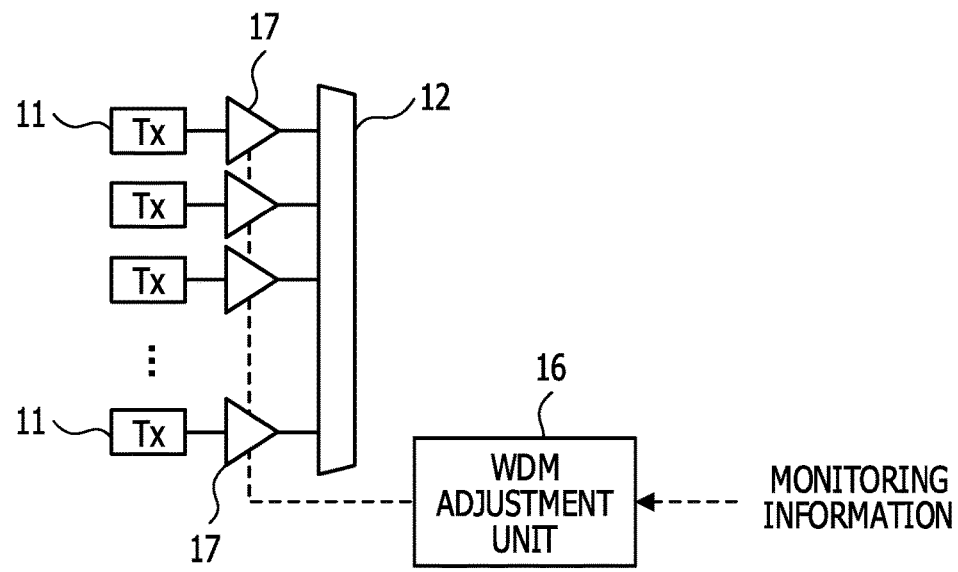
FIGS. 11A and 11B are diagrams (part 1) illustrating an example of a configuration for adjusting transmission power of each wavelength channel.

In the example illustrated in FIG. 11A, amplifiers 17 for amplifying optical signals are provided at the output side of each transmitter 11. In this case, the WDM adjustment unit 16 calculates a gain of each amplifier 17 based on the monitoring information. For example, a gain for equalizing the power of each wavelength channel of the WDM signal after the wavelength conversion is calculated. Then, each amplifier 17 amplifies the optical signal with the calculated gain.

Figure 11B:
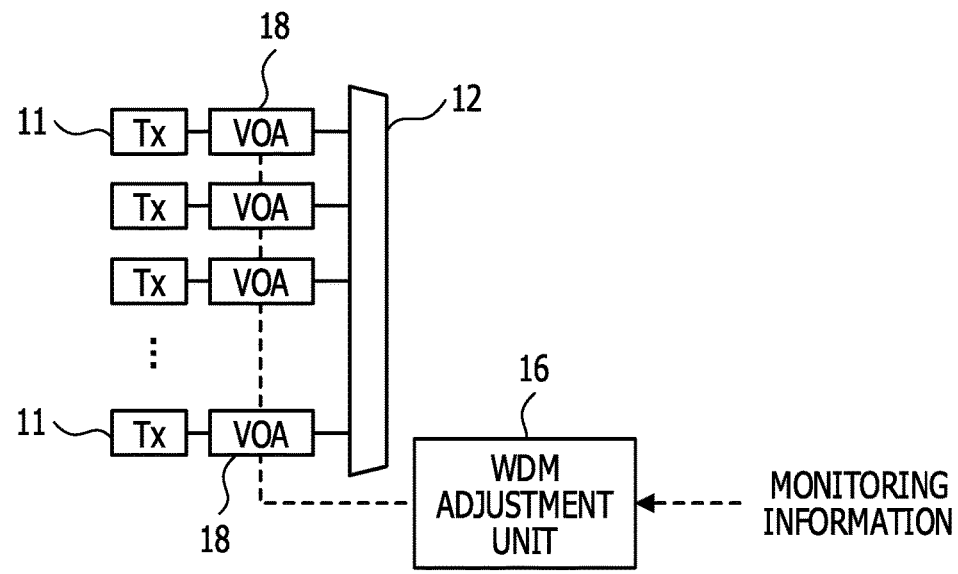

In the example illustrated in FIG. 11B, each of variable optical attenuators (VOA) 18 for attenuating the optical signals is provided at the output side of each transmitter 11. In this case, the WDM adjustment unit 16 calculates an attenuation amount of each variable optical attenuator 18 based on the monitoring information. For example, an attenuation amount for equalizing the power of each wavelength channel of the WDM signal after the wavelength conversion is calculated. Then, each variable optical attenuator 18 attenuates the optical signal with the calculated attenuation amount.

Figure 12A:
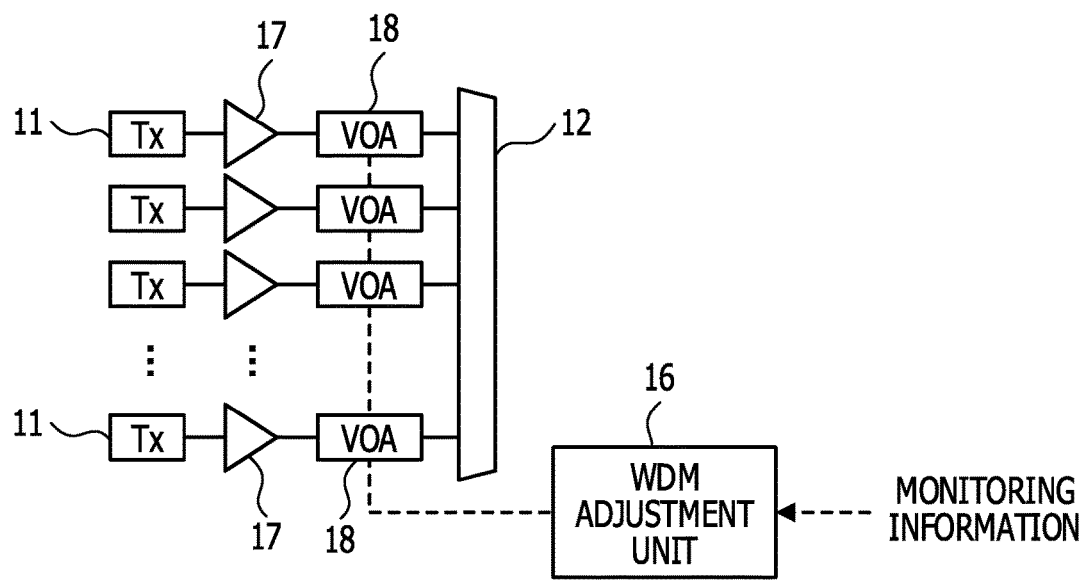
FIGS. 12A and 12B are diagrams (part 2) illustrating another example of the configuration for adjusting the transmission power of each wavelength channel.

In the example illustrated in FIG. 12A, at the output side of each transmitter 11, the amplifiers 17 for amplifying the optical signals and the variable optical attenuators 18 for attenuating an optical signal are provided, respectively. In this case, the WDM adjustment unit 16 calculates the gain of each amplifier 17 or the attenuation amount of each variable optical attenuator 18 based on the monitoring information. For example, the gain or the attenuation amount for equalizing the power of each wavelength channel of the WDM signal after the wavelength conversion is calculated. In the example illustrated in FIG. 12A, the WDM adjustment unit 16 calculates the attenuation amount of each variable optical attenuator 18 based on the monitoring information. Then, each variable optical attenuator 18 attenuates the optical signal with the calculated attenuation amount.

Figure 12B:
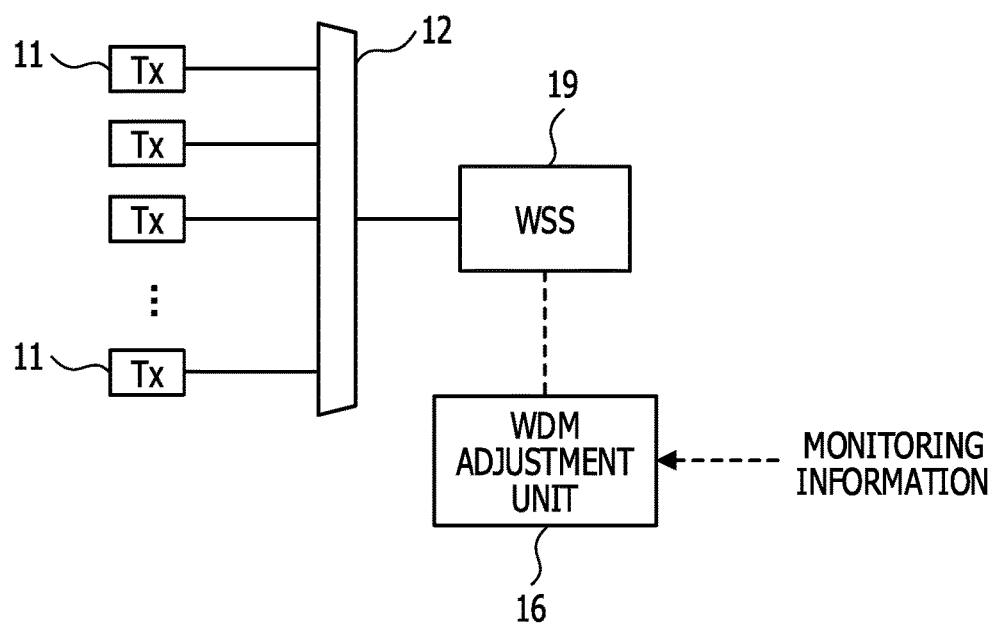

In the example illustrated in FIG. 12B, a wavelength selection switch (WSS) 19 for processing the WDM signal is provided. The wavelength selection switch 19 has a function of attenuating the power of each wavelength channel of the WDM signal. In this case, the WDM adjustment unit 16 calculates the attenuation amount of each channel in the wavelength selection switch 19 based on the monitoring information. For example, the attenuation amount for equalizing the power of each wavelength channel of the WDM signal after the wavelength conversion is calculated. Then, the wavelength selection switch 19 attenuates the optical signal with the calculated attenuation amount.

In the configuration illustrated in FIG. 11A, the WDM adjustment unit 16 adjusts the gain of each amplifier 17 based on the monitoring result by the optical channel monitor, in S4 of FIG. 10. In the configuration illustrated in FIG. 11B or FIG. 12A, the WDM adjustment unit 16 adjusts the attenuation amount of each variable optical attenuator 18 based on the monitoring result, in S4. In the configuration illustrated in FIG. 12B, the WDM adjustment unit 16 adjusts the attenuation amount of each channel in the wavelength selection switch 19 based on the monitoring result, in S4.

Figure 13:
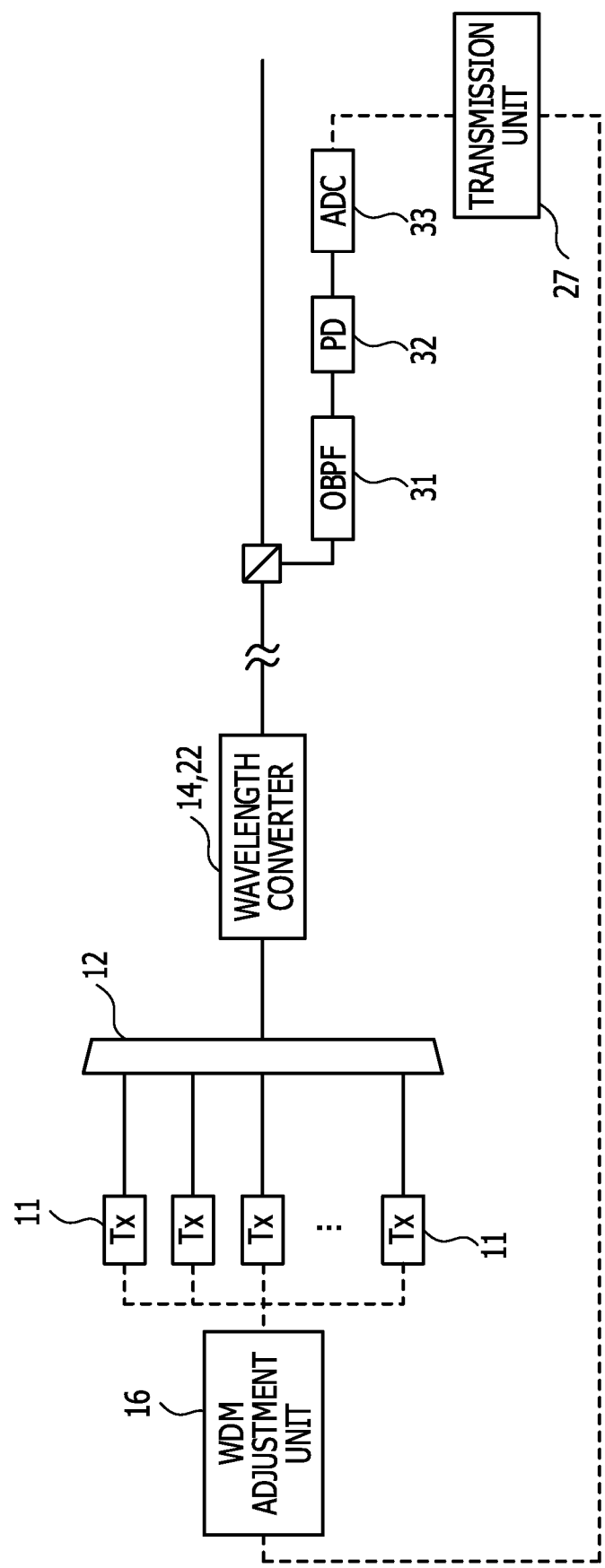
FIG. 13 is a diagram illustrating an example of a variation of a circuit for monitoring the WDM signal.

FIG. 13 illustrates an example of a variation of a circuit for monitoring the WDM signal. In the example illustrated in FIGS. 7 and 8, the power of each wavelength channel of the WDM signal is monitored by the optical channel monitor 26 (26a to 26c). In contrast, in the example illustrated in FIG. 13, the power of each wavelength channel is monitored using an optical filter and a light receiver. Not only the optical channel monitor 26 but also the circuit illustrated in FIG. 13 is an example of an optical monitoring unit that monitors the power of each wavelength channel of the WDM signal.

An optical band pass filter (OBPF) 31 filters the WDM signal after wavelength conversion. A center wavelength of a pass band of the optical filter 31 is controlled so as to scan, for example, the wavelength band of the WDM signal. A photodetector (PD) 32 converts output light of the optical filter 31 into an electric signal. An A/D converter 33 converts the output signal of the light receiver 32 into a digital signal. This digital signal corresponds to monitoring information representing the power of each wavelength channel of the WDM signal. Then, the transmission unit 27 transmits this monitoring information to the WDM adjustment unit 16.

Second Embodiment

FIGS. 14A to 15B illustrate an example of wavelength conversion according to a second embodiment. In this embodiment, the WDM signal and a set of excitation lights P1 and P2 are input to the wavelength converter. The polarization of the WDM signal and the polarization of the excitation light are orthogonal to each other. The wavelength converter includes an excitation light source and a highly nonlinear fiber for generating the excitation lights P1 and P2.

Figure 14A:
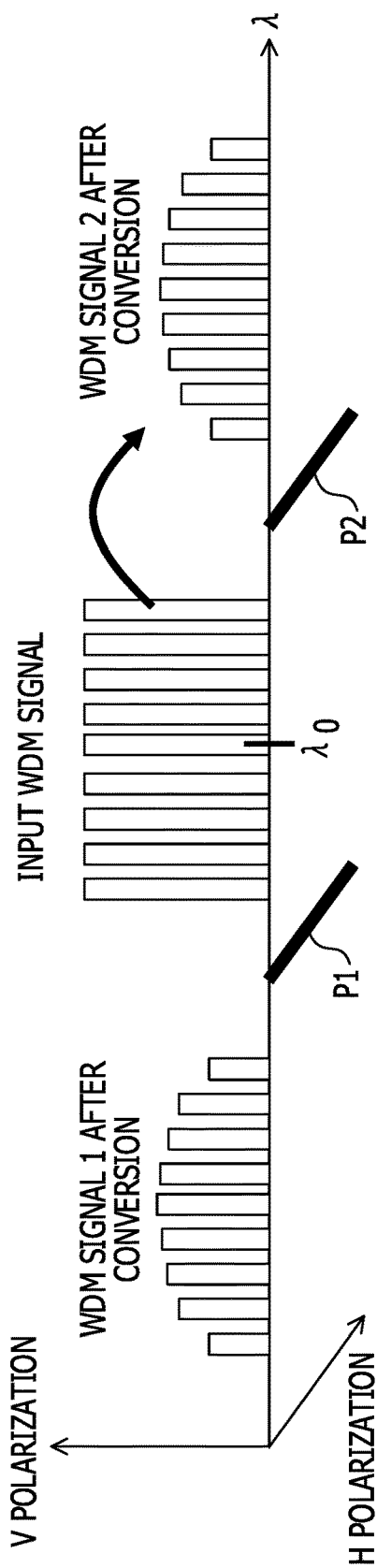
FIGS. 14A and 14B are views (part 1) illustrating an example of wavelength conversion according to a second embodiment.

In the example illustrated in FIG. 14A, the center of the wavelength band of the input WDM signal is designed to substantially coincide with a zero-dispersion wavelength $\lambda 0$ of the highly nonlinear fiber. Then, a set of excitation lights P1 and P2 is input to the highly nonlinear fiber. A wavelength difference $\Delta\lambda$, between the excitation lights P1 and P2 is designed according to a wavelength shift amount by wavelength conversion.

When the excitation lights P1 and P2 described above are applied, the wavelength converter outputs one set of WDM signals (output WDM signal 1 and output WDM signal 2). A wavelength shift of the output WDM signal 1 with respect to the input WDM signal is $-\Delta\lambda$, and a wavelength shift of the output WDM signal 2 with respect to the input WDM signal is $+\Delta\lambda$. In this embodiment, it is assumed that the output WDM signal 2 is transmitted among the one set of WDM signals. In this case, it is assumed that the output WDM signal 2 is arranged at a target wavelength.

As described above with reference to FIGS. 5A and 5B, wavelength conversion efficiency of the highly nonlinear fiber depends on the wavelength. For that reason, even if the power of each wavelength channel of the input WDM signal is uniform, as illustrated in FIG. 14A, the power of the wavelength channel of the WDM signal (that is, the output WDM signals 1 and 2) after wavelength conversion may not be uniform. In this example, the power of the wavelength channel arranged at the end portions of the wavelength band of each WDM signal after the wavelength conversion is decreased.

Figure 14B:
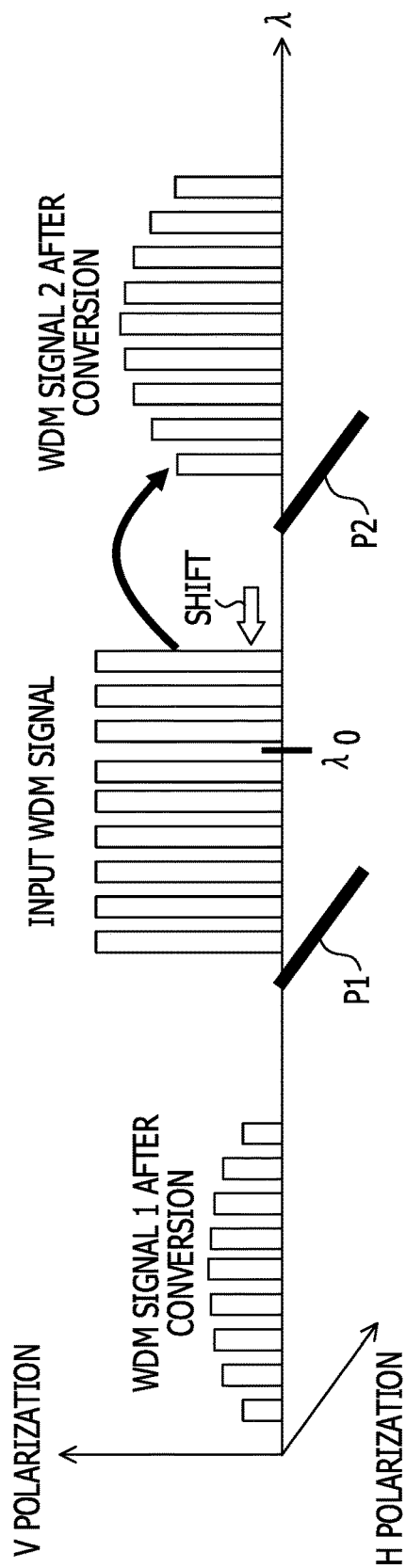

The power of each wavelength channel of the WDM signal after the wavelength conversion depends on a relationship between the wavelength of the input WDM signal and the zero-dispersion wavelength $\lambda 0$ of the highly nonlinear fiber. For example, when the wavelength of the input WDM signal is shifted, the power of each of the output WDM signals 1 and 2 changes. It is assumed that the output power of the output WDM signal 2 is increased. In this case, for example, as illustrated in FIG. 14B, the wavelength of the input WDM signal is shifted to a shorter wavelength side. As a result, as compared with the state illustrated in FIG. 14A, the power of the output WDM signal 1 decreases and the power of the output WDM signal 2 increases.

However, if the wavelength of the input WDM signal is shifted, the wavelength of the WDM signal after wavelength conversion also shifts. In the example illustrated in FIGS. 14A and 14B, the wavelength of the output WDM signal 2 is shifted to the shorter wavelength side with respect to the target wavelength. Therefore, in order to increase a wavelength shift amount due to the wavelength conversion, as illustrated in FIG. 15A, the wavelength difference $\Delta\lambda$, between the excitation lights P1 and P2 is increased. For example, the wavelength difference $\Delta\lambda$, between the excitation lights P1 and P2 is adjusted so as to compensate for the wavelength shift of the input WDM signal.

In order to equalize the power of each wavelength channel of the output WDM signal 2, as illustrated in FIG. 15B, the transmission power of each wavelength channel of the WDM signal is adjusted. The adjustment of the transmission power of each wavelength channel is realized by pre-emphasis of the first embodiment.

Figure 16:
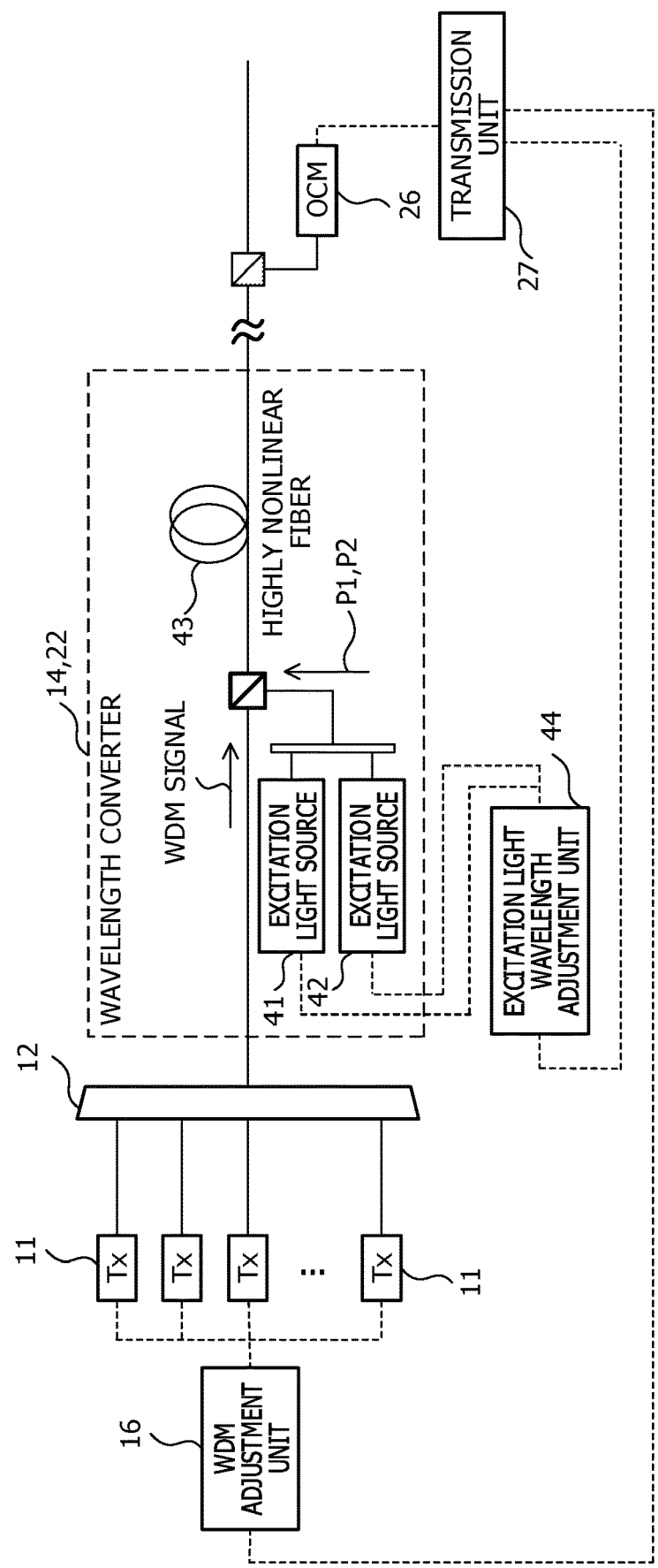
FIG. 16 is a diagram illustrating an example of feedback control according to the second embodiment.

FIG. 16 illustrates an example of feedback control according to the second embodiment. In this embodiment, the wavelength converter 14 or 22 includes excitation light sources 41 and 42 and a highly nonlinear fiber 43.

Similarly as in the first embodiment, the WDM adjustment unit 16 controls the transmission power of each wavelength channel of the WDM signal based on the monitoring result of the optical channel monitor 26. In addition to this, the WDM adjustment unit 16 has a function of shifting the wavelength of output light of each transmitter 11, as illustrated in FIG. 14B.

An excitation light wavelength adjustment unit 44 adjusts the wavelength of at least one of the excitation light P1 or P2 based on the monitoring result of the optical channel monitor 26. For example, the excitation light wavelength adjustment unit 44 adjusts the wavelength of output light of at least one of the excitation light sources 41 and 42 so that the wavelength of the WDM signal monitored by the optical channel monitor 26 approaches the target wavelength. As a result, the wavelength shift of the excitation light illustrated in FIG. 15A is realized. In the example illustrated in FIG. 15A, the wavelength of the excitation light P2 is adjusted.

The excitation light sources 41 and 42 respectively generate excitation light according to adjustment by the excitation light wavelength adjustment unit 44. The WDM signal and the excitation lights P1 and P2 are input to the highly nonlinear fiber 43. As a result, the wavelength conversion of the WDM signal is realized.

Figure 17:
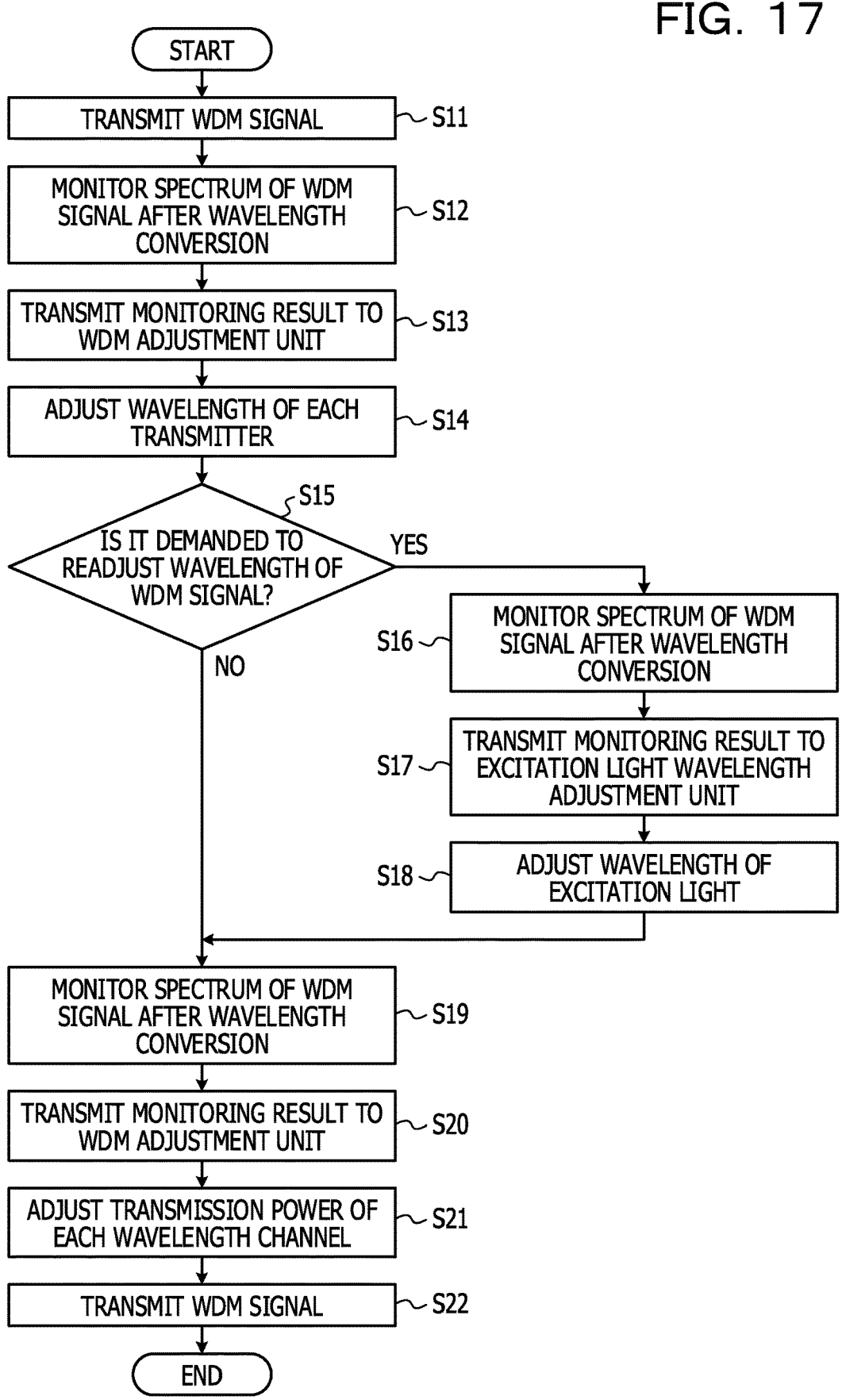
FIG. 17 is a flowchart illustrating an example of a method for adjusting optical power in the second embodiment.

FIG. 17 is a flowchart illustrating an example of a method for adjusting optical power in the second embodiment. S11 and S19 to S22 are substantially the same as S1 and S2 to S5 illustrated in FIG. 10. For example, in the second embodiment, S12 to S18 are executed in addition to the procedural sequence of the first embodiment.

In S12, the optical channel monitor 26 (26a, 26b, and 26c) monitors the spectrum of the received WDM signal. For example, the optical channel monitor 26 monitors the power of each wavelength channel of the WDM signal after wavelength conversion. In S13, the transmission unit 27 notifies the WDM adjustment unit 16 of the monitoring result of the optical channel monitor 26. For example, the monitoring information indicating the power of each wavelength channel of the WDM signal after wavelength conversion is transmitted to the WDM adjustment unit 16.

In S14, the WDM adjustment unit 16 adjusts the wavelength of the output light of each transmitter 11 so that the power of the WDM signal after the wavelength conversion approaches a target level, based on the monitoring result of the optical channel monitor 26. In this case, for example, the wavelength shift illustrated in FIG. 14B is performed.

In S15, it is determined whether it is demanded to adjust the wavelength of the WDM signal. In this case, for example, if the wavelength shift amount in S14 is larger than a predetermined value, it may be determined that it is demanded to adjust the wavelength of the WDM signal.

When it is demanded to adjust the wavelength of the WDM signal (Yes in S15), S16 to S18 are executed. In S16, the optical channel monitor 26 (26a, 26b, and 26c) monitors the spectrum of the received WDM signal. In S17, the transmission unit 27 notifies the excitation light wavelength adjustment unit 44 of the monitoring result of the optical channel monitor 26. For example, the monitoring result indicating the power of each wavelength channel of the WDM signal after the wavelength conversion is notified to the excitation light wavelength adjustment unit 44. In S18, the excitation light wavelength adjustment unit 44 adjusts the wavelength of output light of the excitation light sources 41 and 42 based on the notified monitoring result. For example, for example, the wavelength of the output light of the excitation light sources 41 and 42 is adjusted so as to compensate for the wavelength shift in S14. As a result, the wavelength shift illustrated in FIG. 15A is realized. Thereafter, the process of feedback control proceeds to S19.

When the wavelength of the WDM signal does not have to be adjusted (No in S15), S16 to S18 are skipped, and the process of feedback control proceeds to S19. As described above, S19 to S22 are substantially the same as S2 to S5 illustrated in FIG. 10. For example, the transmission power of each wavelength channel of the WDM signal is adjusted based on the monitoring result of the optical channel monitor 26. With this configuration, pre-emphasis illustrated in FIG. 15B is realized.

Third Embodiment

In the second embodiment, as illustrated in FIGS. 14A and 14B, the power of the WDM signal after wavelength conversion is adjusted by shifting the center wavelength of the WDM signal before wavelength conversion. This power adjustment depends on the relationship between the center wavelength of the WDM signal before wavelength conversion and the zero-dispersion wavelength λ0 of the highly nonlinear fiber. For example, the adjustment for shifting the center wavelength of the WDM signal before wavelength conversion relative to the zero-dispersion wavelength λ0 of the highly nonlinear fiber and the adjustment for shifting the zero-dispersion wavelength λ0 of the highly nonlinear fiber to the center wavelength of the WDM signal before the wavelength conversion are equivalent. Therefore, in the third embodiment, the zero-dispersion wavelength λ0 of the highly nonlinear fiber is adjusted instead of the wavelength shift illustrated in FIG. 14A.

Figure 18A:
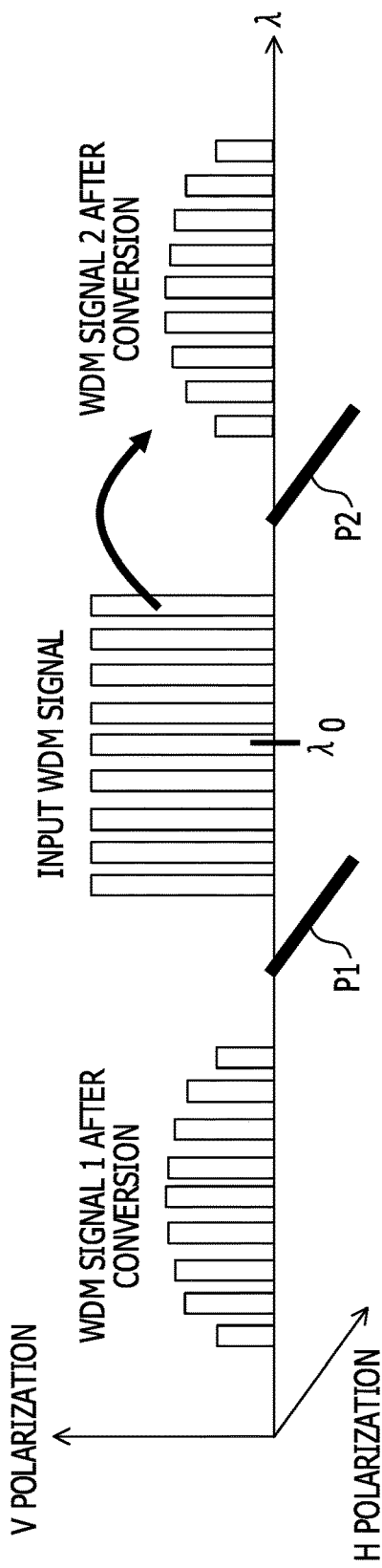
FIGS. 18A and 18B are views illustrating an example of a wavelength shift of the WDM signal by adjusting a zero-dispersion wavelength of a highly nonlinear fiber.
Figure 18B:
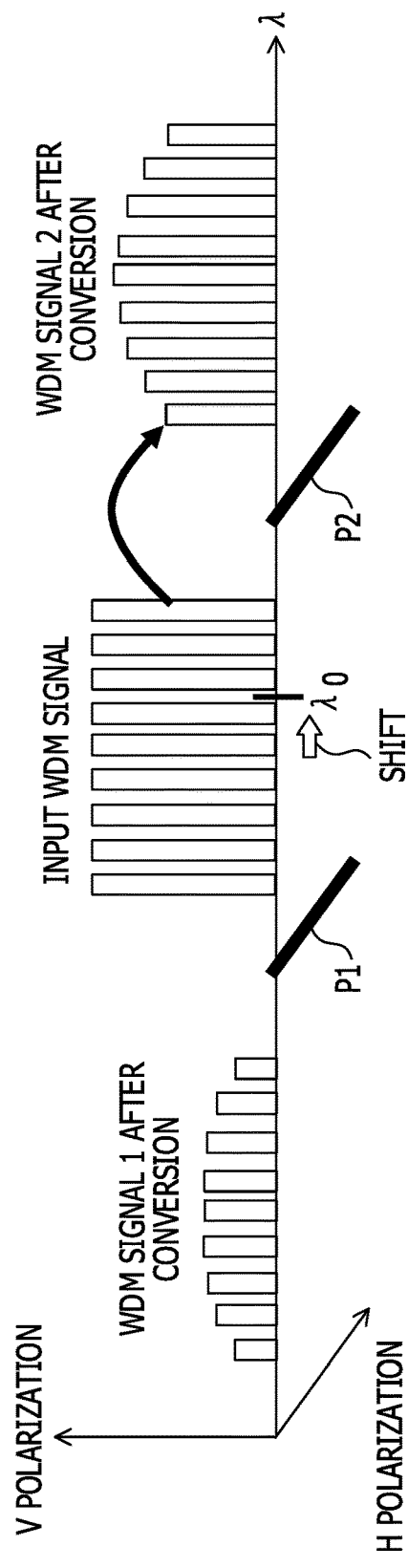

FIGS. 18A and 18B illustrate an example of a method for shifting the wavelength of the WDM signal by adjusting the zero-dispersion wavelength of the highly nonlinear fiber. The state illustrated in FIG. 18A is the same as the state illustrated in FIG. 14A.

In this example, in order to increase the power of the WDM signal 2 after the wavelength conversion, as illustrated in FIG. 18B, the zero-dispersion wavelength λ0 of the highly nonlinear fiber is shifted to the longer wavelength side. An amount of wavelength shift of the zero-dispersion wavelength λ0 is determined so that the power of the WDM signal 2 after the wavelength conversion coincides with the target level, similarly as in the second embodiment.

Figure 19:
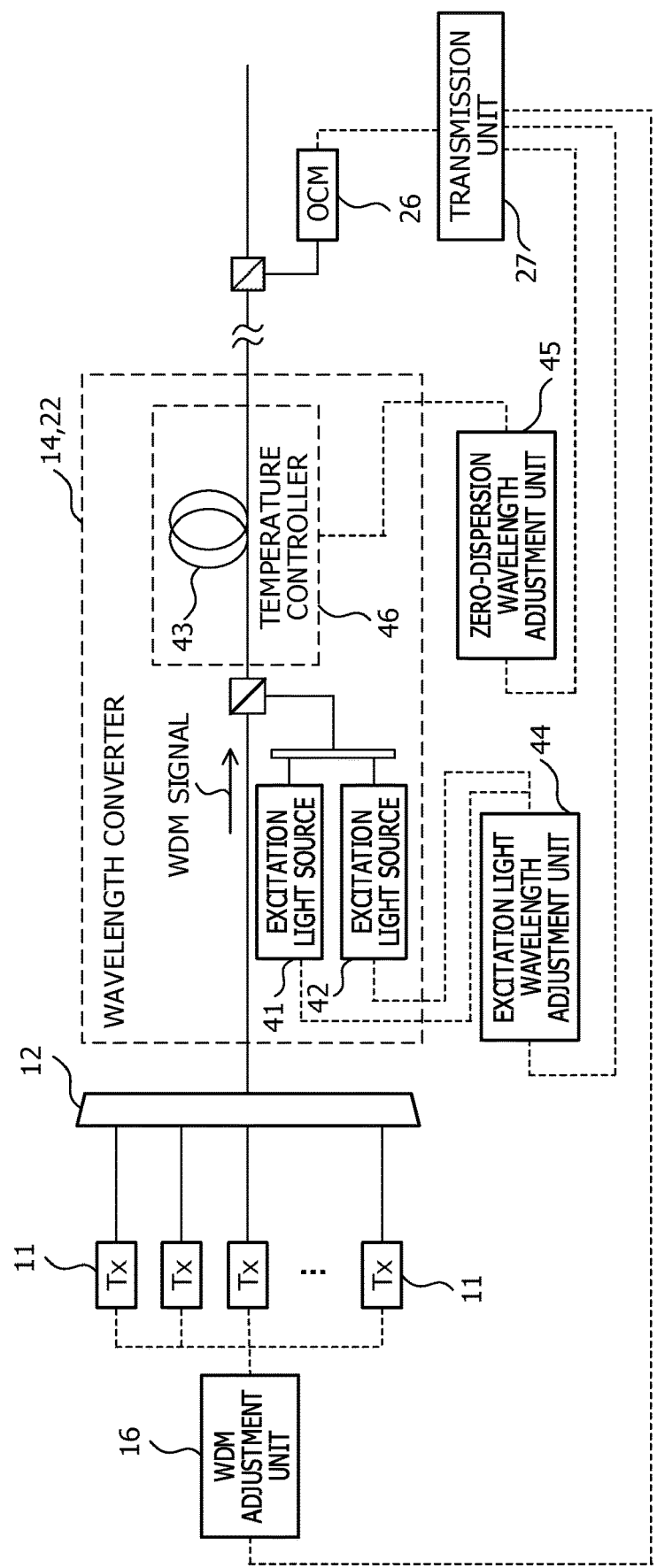
FIG. 19 is a diagram illustrating an example of feedback control according to a third embodiment.

FIG. 19 illustrates an example of feedback control according to the third embodiment. In this embodiment, the wavelength converter 14 or 22 includes the excitation light sources 41 and 42, the highly nonlinear fiber 43, and a temperature controller 46. The temperature controller 46 is provided in the vicinity of the highly nonlinear fiber 43 and adjusts temperature of the highly nonlinear fiber 43 according to control by a zero-dispersion wavelength adjustment unit 45 to be described later. The temperature controller 46 is realized by, for example, a heater or a Peltier element.

The zero-dispersion wavelength adjustment unit 45 adjusts the zero-dispersion wavelength λ0 of the highly nonlinear fiber 43 based on the monitoring result of the optical channel monitor 26. It is assumed that the zero-dispersion wavelength λ0 of the highly nonlinear fiber 43 varies with the temperature. Therefore, the zero-dispersion wavelength adjustment unit 45 adjusts the temperature of the highly nonlinear fiber 43 so that the power of the WDM signal monitored by the optical channel monitor 26 approaches the target level. The temperature of the highly nonlinear fiber 43 is adjusted by controlling the temperature controller 46. As a result, adjustment of the zero-dispersion wavelength λ0 illustrated in FIG. 18B is realized.

In the second embodiment, if the wavelength of the input WDM signal is shifted to increase the power of the wavelength converted WDM signal 2, the wavelength of the WDM signal 2 also shifts. On the other hand, in the third embodiment, even if the zero-dispersion wavelength $\lambda 0$ is shifted in order to increase the power of the WDM signal 2 after the wavelength conversion, the wavelength of the WDM signal 2 is not shifted. Accordingly, in the third embodiment, a process of shifting the wavelength of the excitation lights P1 and P2 (that is, the wavelength shift illustrated in FIG. 15A) is not demanded.

FIG. 20 is a flowchart illustrating an example of a method for adjusting optical power in the third embodiment. S21 and S25 to S28 are substantially the same as S1 and S2 to S5 illustrated in FIG. 10. For example, in the third embodiment, S22 to S24 are executed in addition to the procedural sequence of the first embodiment.

In S22, the optical channel monitor 26 (26a, 26b, and 26c) monitors the spectrum of the received WDM signal. For example, the optical channel monitor 26 monitors the power of each wavelength channel of the WDM signal after wavelength conversion. In S23, the transmission unit 27 notifies the zero-dispersion wavelength adjustment unit 45 of the monitoring result of the optical channel monitor 26. For example, monitoring information indicating the power of each wavelength channel of the WDM signal after the wavelength conversion is notified to the zero-dispersion wavelength adjustment unit 45.

In S24, the zero-dispersion wavelength adjustment unit 45 adjusts the temperature of the highly nonlinear fiber 43 so that the power of the WDM signal after wavelength conversion approaches the target level, based on the monitoring result of the optical channel monitor 26. In this case, the zero-dispersion wavelength adjustment unit 45 controls the temperature controller 46 according to the monitoring result. By this control, for example, the wavelength shift illustrated in FIG. 18B is realized.

Thereafter, S25 to S28 are executed. S25 to S28 are substantially the same as S2 to S5 illustrated in FIG. 10 as described above. For example, the transmission power of each wavelength channel of the WDM signal is adjusted based on the monitoring result of the optical channel monitor 26. For example, pre-emphasis illustrated in FIG. 15B is realized.

Fourth Embodiment

In the method for performing wavelength conversion using two excitation light, the WDM signals after wavelength conversion appear at the input side and the output side of the input WDM signal, respectively, as described above. In the second and third embodiments, one of the two WDM signals output from the wavelength converter is used. In contrast, in the fourth embodiment, both of the two WDM signals output from the wavelength converter may be used. Accordingly, in the fourth embodiment, feedback control for suppressing deviation in power of the two WDM signals output from the wavelength converter is performed.

FIGS. 21A to 22 illustrate examples of wavelength conversion according to the fourth embodiment. In this embodiment, the WDM signal and one set of excitation lights P1 and P2 are input to the wavelength converter. However, as illustrated in FIG. 21A, powers of the two WDM signals output from the wavelength converter are different from each other. For example, the power of the WDM signal 2 is larger than that of the WDM signal 1.

In this case, as illustrated in FIG. 21B, the wavelength of the WDM signal before wavelength conversion is adjusted so as to increase the power of the WDM signal 1 and reduce the power of the WDM signal 2. In this embodiment, the wavelength of the WDM signal before wavelength conversion is shifted to the longer wavelength side. As a result, the powers of the WDM signal 1 and the WDM signal 2 are substantially the same. Thereafter, as illustrated in FIG. 22, pre-emphasis for making the powers of the wavelength channels of the WDM signals (that is, the WDM signals 1 and 2) after conversion uniform is performed. The feedback control according to the fourth embodiment is realized by the configuration illustrated in FIG. 7 or 16, for example.

Figure 23:
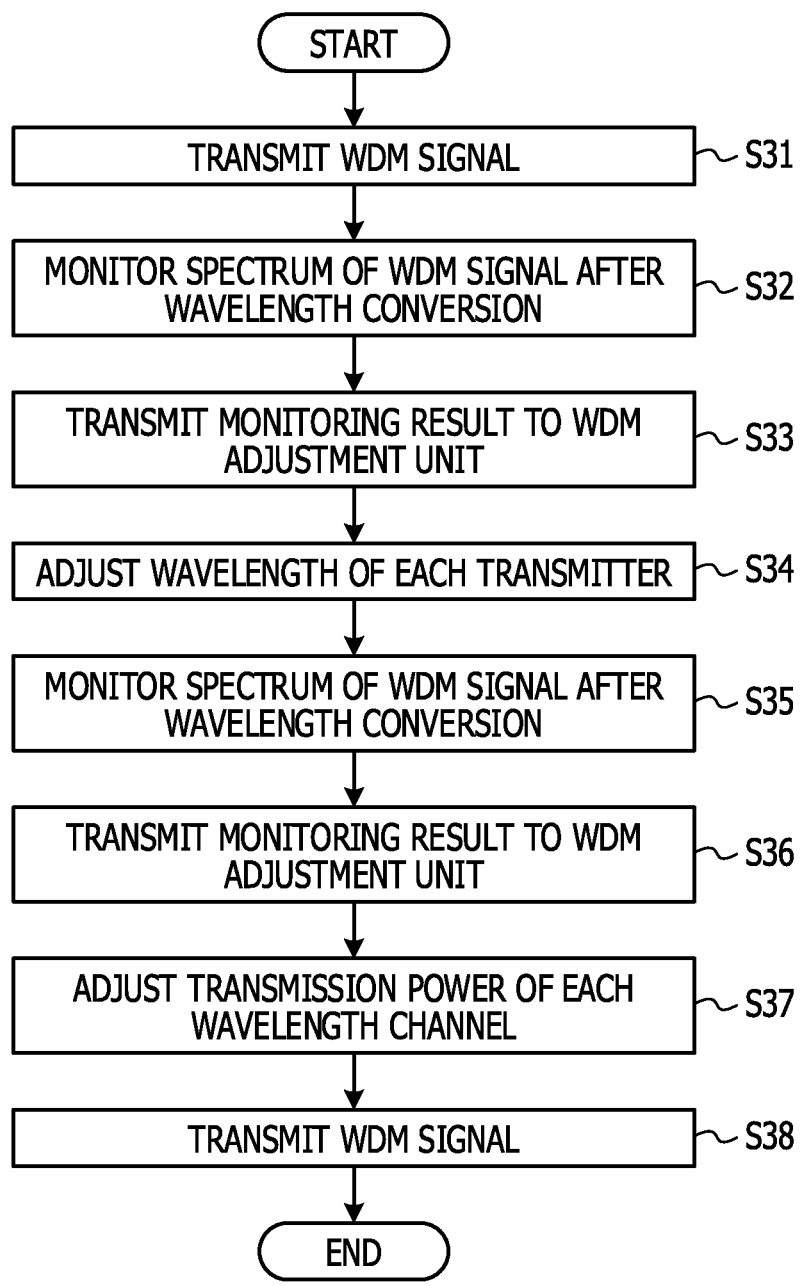
FIG. 23 is a flowchart illustrating an example of a method for adjusting optical power in the fourth embodiment.

FIG. 23 is a flowchart illustrating an example of a method for adjusting optical power in the fourth embodiment. S31 and S35 to S38 are substantially the same as S1 and S2 to S5 illustrated in FIG. 10. For example, in the fourth embodiment, S32 to S34 are executed in addition to the procedural sequence of the first embodiment.

In S32, the optical channel monitor 26 (26a, 26b, and 26c) monitors the spectrum of the received WDM signal. For example, the optical channel monitor 26 monitors the power of each wavelength channel of the WDM signal after wavelength conversion. In this case, the optical channel monitor 26 monitors the WDM signals generated on the shorter wavelength side and the long wavelength side, respectively, with respect to the WDM signal before wavelength conversion. In the example illustrated in FIGS. 21A and 21B, the WDM signal 1 and the WDM signal 2 are respectively monitored.

In S33, the transmission unit 27 notifies the WDM adjustment unit 16 of the monitoring result of the optical channel monitor 26. For example, monitoring information indicating the power of each wavelength channel of each WDM signal after the wavelength conversion is notified to the WDM adjustment unit 16.

In S34, based on the monitoring result of the optical channel monitor 26, the WDM adjustment unit 16 adjusts the wavelength of the output light of each transmitter 11 so that the powers of the two WDM signals obtained by the wavelength conversion are substantially the same. In this case for example, the wavelength shift illustrated in FIG. 21B is performed.

Thereafter, S35 to S38 are executed. S35 to S38 are substantially the same as S2 to S5 illustrated in FIG. 10, as described above. For example, the transmission power of each wavelength channel of the WDM signal is adjusted based on the monitoring result of the optical channel monitor 26. For example, pre-emphasis illustrated in FIG. 22 is realized.

As described in the second and third embodiments, it is possible to adjust the power of the WDM signal after wavelength conversion by shifting the zero-dispersion wavelength of the highly nonlinear fiber, instead of shifting the wavelength of the WDM signal before wavelength conversion. Therefore, also in the fourth embodiment, the powers of the two WDM signals obtained by the wavelength conversion can be made substantially equal to each other by shifting the zero dispersion wavelength of the highly nonlinear fiber instead of the wavelength shift of the WDM signal illustrated in FIG. 21B.

For example, in the example illustrated in FIG. 24A, the center wavelength of the WDM signal before wavelength conversion is shorter than the zero-dispersion wavelength $\lambda 0$ of the highly nonlinear fiber and the power of the WDM signal 2 is larger than that of the WDM signal 1. In this case, as illustrated in FIG. 24B, the zero-dispersion wavelength $\lambda 0$ is shifted to the shorter wavelength side so that the powers of the WDM signal 1 and the WDM signal 2 are substantially the same. The adjustment of the zero-dispersion wavelength λ0 illustrated in FIGS. 24A and 24B is realized by the configuration illustrated in FIG. 19, for example.

Fifth Embodiment

In the first to fourth embodiments described above, feedback control for equalizing the power of each wavelength channel of the WDM signal after wavelength conversion is performed (except for the example illustrated in FIG. 9C). However, if the power of each wavelength channel of the WDM signal after wavelength conversion is too large, signal quality (for example, a bit error rate) may be deteriorated due to nonlinear noise occurring between the wavelength channels. Accordingly, in the fifth embodiment, in addition to the feedback control for equalizing the power of each wavelength channel of the WDM signal after wavelength conversion, feedback control for improving the signal quality of each wavelength channel is executed.

In the example illustrated in FIG. 25, the wavelength of the WDM signal in which the wavelength channels 1 to n are multiplexed is converted. In this case, feedback control for making the power of each wavelength channel of the WDM signal after wavelength conversion uniform and improving the signal quality of each wavelength channel is performed. As a result, the transmission power of the wavelength channel 1 is larger than before the pre-emphasis. The transmission power of the wavelength channel 2 is almost the same as before the pre-emphasis. However, the transmission powers of the wavelength channels 3 to n are smaller than those before the pre-emphasis. For example, in the fifth embodiment, transmission power of one or a plurality of wavelength channels may be reduced by the pre-emphasis in order to suppress the nonlinear noise occurring between wavelength channels.

Figure 26:
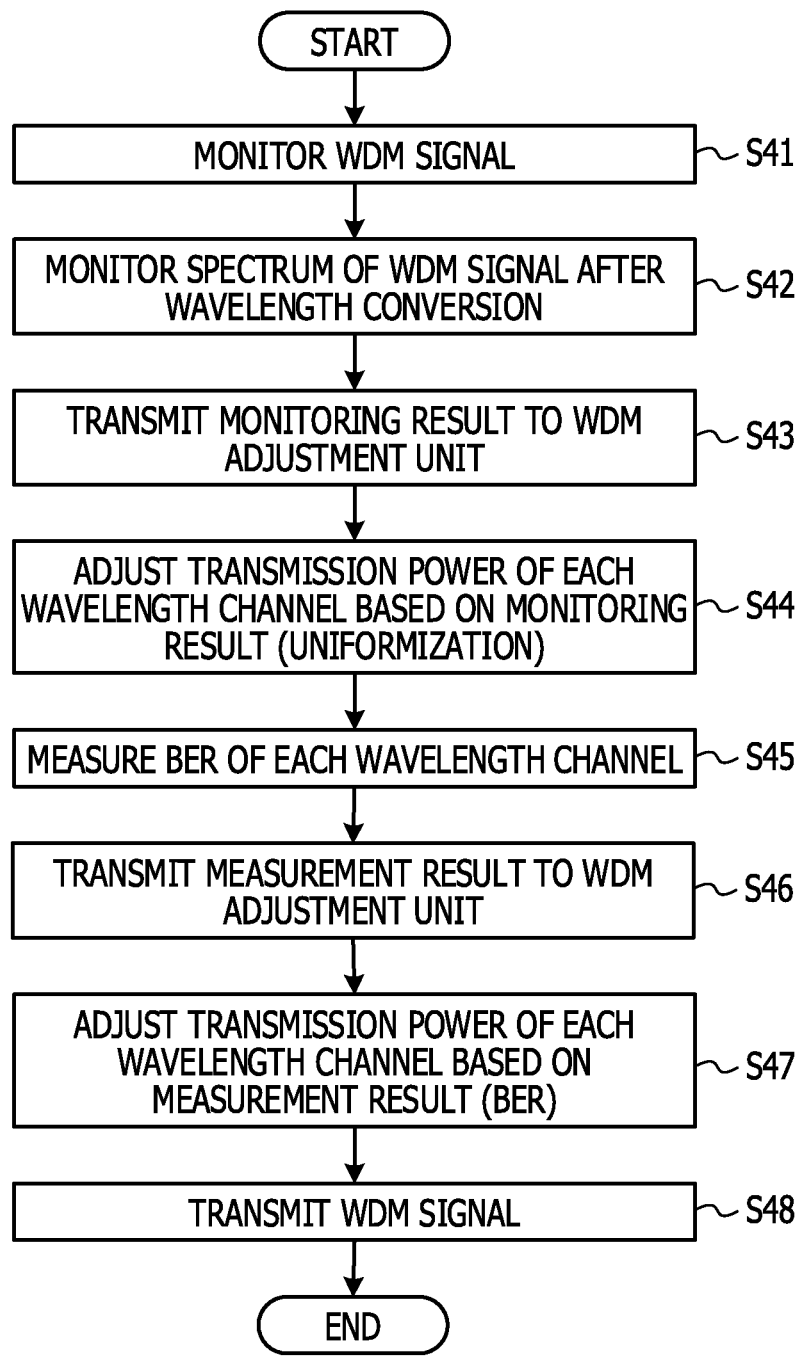
FIG. 26 is a flowchart illustrating an example of a method for adjusting optical power in the fifth embodiment.

FIG. 26 is a flowchart illustrating an example of a method for adjusting optical power in the fifth embodiment. S41 to S44 and S48 are substantially the same as S1 to S4 and S5 illustrated in FIG. 10. For example, in the fifth embodiment, S45 to S47 are executed in addition to the procedural sequence of the first embodiment.

S45 to S47 are executed after S42 to S44, in this embodiment. For example, when S45 to S47 are executed, it is assumed that the power of each wavelength channel of the WDM signal after wavelength conversion is made uniform.

In S45, an error rate measurement circuit (not illustrated) measures the bit error rate of each wavelength channel. For example, in the optical transmission system illustrated in FIG. 8, the bit error rate is measured using output signals of the receivers 25a to 25c. In S46, a transmission unit (not illustrated) transmits measurement information indicating the error rate measured for each wavelength channel to the WDM adjustment unit 16.

In S47, the WDM adjustment unit 16 adjusts the transmission power of each wavelength channel based on the error rate measured for each wavelength channel. As an example, the transmission power of the corresponding wavelength channel is adjusted so that the error rate of each wavelength channel is smaller than a predetermined target value. In this case, while maintaining the power of each wavelength channel of the WDM signal after wavelength conversion uniformly, the transmission power of a corresponding wavelength channel may be adjusted so that the error rate of each wavelength channel becomes smaller than a predetermined target value. However, in order to make the error rate of each wavelength channel smaller than the predetermined target value, the power of each wavelength channel of the wavelength converted WDM signal may not be uniform.

Sixth Embodiment

Figure 27:
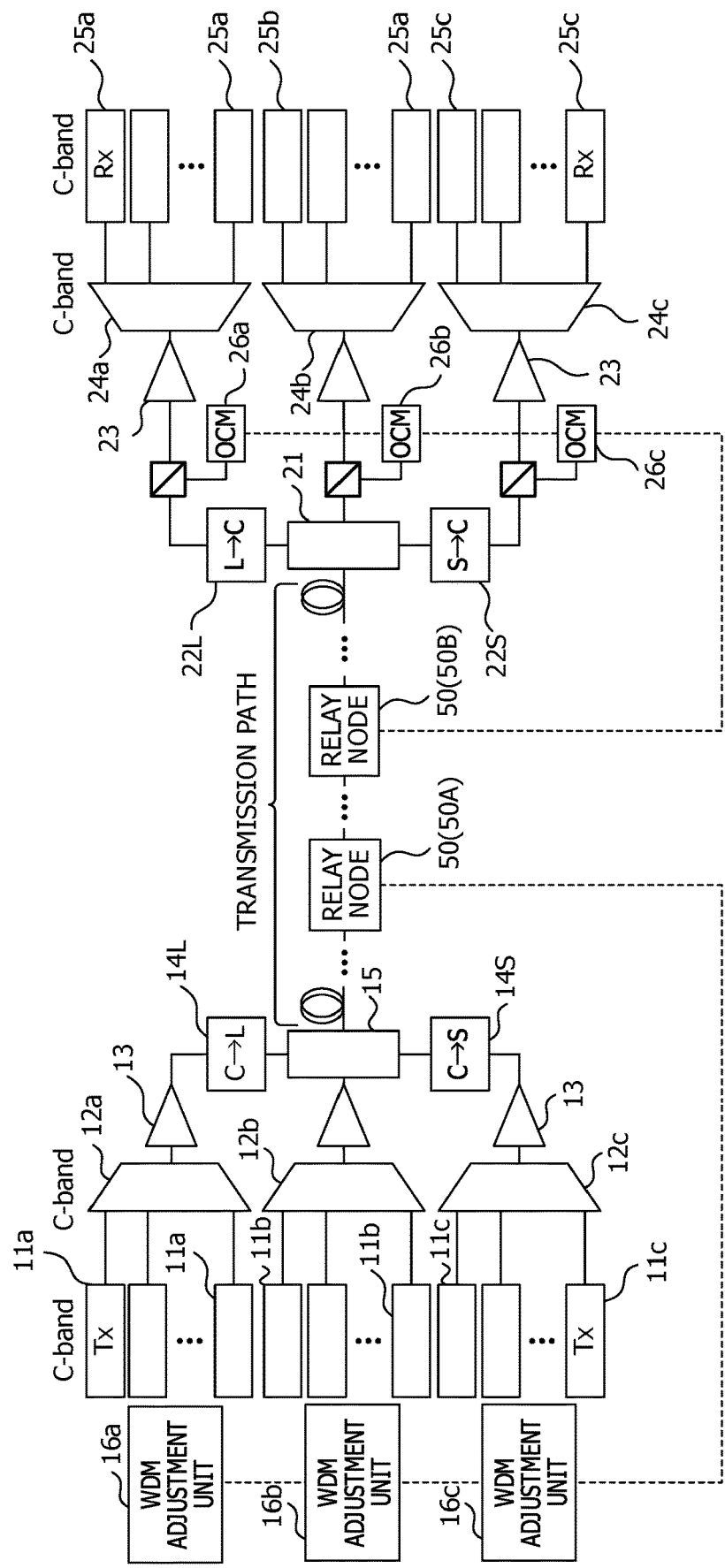
FIG. 27 is a diagram illustrating an example of an optical transmission system according to a sixth embodiment.

FIG. 27 illustrates an example of an optical transmission system according to a sixth embodiment of the present disclosure. The plurality of transmitters 11a to 11c, the WDM multiplexers 12a to 12c, the wavelength converters 14L and 14S, the multiplexer 15, the splitter 21, the wavelength converters 22L and 22S, the WDM demultiplexers 24a to 24c, the plurality of receivers 25a to 25c, and the optical channel monitors 26a to 26c are substantially the same in FIG. 8 and FIG. 27.

In the sixth embodiment, relay nodes are provided on the transmission path. In the example illustrated in FIG. 27, a relay node 50 (50A and 50B) is installed on the transmission path.

Figure 28A:
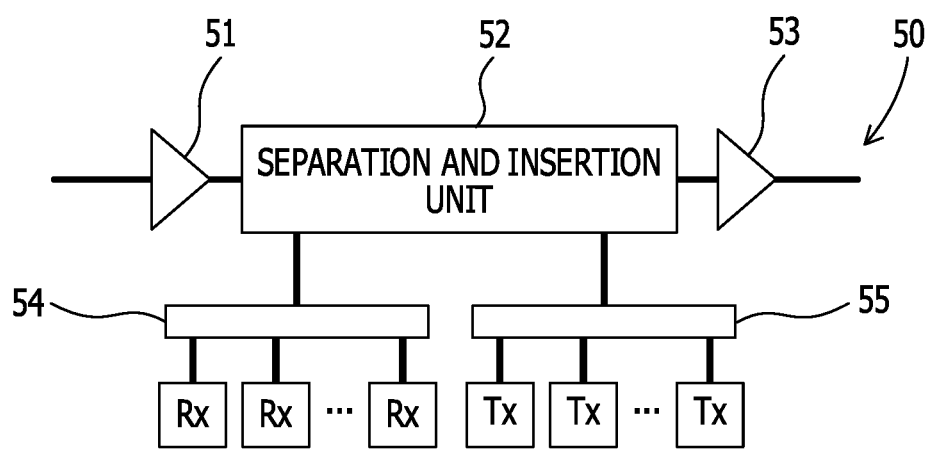
FIGS. 28A and 28B are diagrams illustrating examples of a relay node.
Figure 28B:
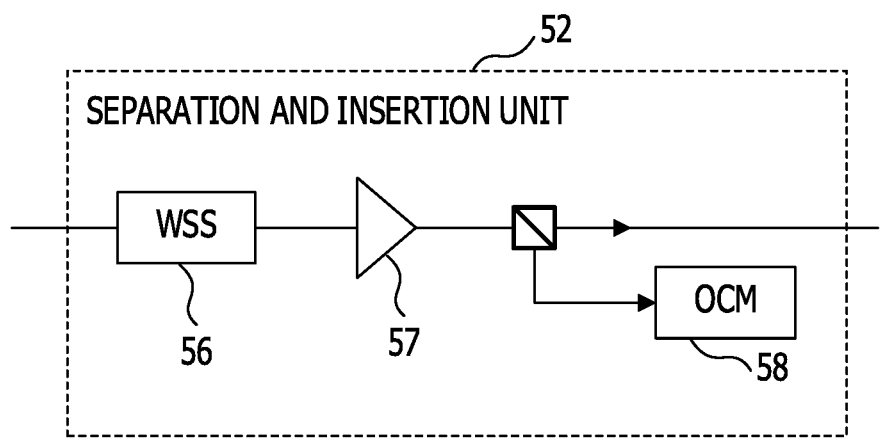

FIGS. 28A and 28B illustrate examples of the relay node 50. In this embodiment, the relay node 50 is a reconfigurable optical add-drop multiplexer (ROADM) node. In this case, for example, as illustrated in FIG. 28A, the relay node 50 includes an amplifier 51, a separation and insertion unit 52, an amplifier 53, a distributor 54, and a multiplexer 55. The relay node 50 has a function of transmitting control information to other nodes and a function of receiving control information from other nodes.

The amplifier 51 amplifies the received WDM signal. The separation and insertion unit 52 splits the optical signal of a designated wavelength channel from the received WDM signal and guides the optical signal to the distributor 54. The separation and insertion unit 52 inserts the optical signal received from the multiplexer 55 into a free channel of the reception WDM signal. The separation and insertion unit 52 has a function of adjusting the optical power of each wavelength channel. The amplifier 53 amplifies the WDM signal output from the separation and insertion unit 52. The distributor 54 distributes the optical signal separated from the received WDM signal by the separation and insertion unit 52 to the receiver (Rx). The multiplexer 55 guides the optical signal output from the transmitter (Tx) to the separation and insertion unit 52.

As illustrated in FIG. 28B, the separation and insertion unit 52 includes a wavelength selection switch (WSS) 56, an amplifier 57, and an optical channel monitor (OCM) 58. The wavelength selection switch 56 has a function of adjusting the power of each wavelength channel of the WDM signal. This adjustment function is realized by, for example, a variable optical attenuator. The amplifier 57 amplifies the WDM signal output from the wavelength selection switch 56. The optical channel monitor 58 monitors the power of each wavelength channel of the WDM signal output from the wavelength selection switch 56.

The relay node 50 may notify the other nodes of the monitoring result of the optical channel monitor 58. In the example illustrated in FIG. 27, the relay node 50A transmits control information including the monitoring result of the optical channel monitor 58 to the WDM adjustment units 16 (16a to 16c). Then, the WDM adjustment unit 16 adjusts the transmission power of each wavelength channel based on the monitoring result. In this case, the power of each wavelength channel of the WDM signal after wavelength conversion by the wavelength converters 14L and 14S is made uniform. It is preferable that a relay node notifying a transmission source node of the WDM signal the monitoring result of the optical channel monitor 58 is a relay node adjacent to the transmission source node.

The monitoring result of the optical channel monitor 26 (26a to 26c) is notified to the relay node 50 provided on the transmission path. In the example illustrated in FIG. 27, the monitoring result of the optical channel monitor 26 is notified to the relay node 50B. Then, the relay node 50B adjusts the power of each wavelength channel based on the monitoring result by utilizing the power adjustment function of the wavelength selection switch 56. In this case, the power of each wavelength channel of the WDM signal after wavelength conversion by the wavelength converters 22L and 22S is equalized. It is preferable that a relay node that adjusts the power of each wavelength channel based on the monitoring result notified from a destination node is a relay node adjacent to the destination node.

The WDM adjustment units 16 (16a to 16c), the excitation light wavelength adjustment unit 44, and the zero-dispersion wavelength adjustment unit 45 are realized by, for example, a processor system including a processor and a memory. In this case, the functions of the WDM adjustment unit 16, the excitation light wavelength adjustment unit 44, and the zero-dispersion wavelength adjustment unit 45 are realized by executing a program stored in the memory by the processor.

Optical Channel Monitor

Figure 29:
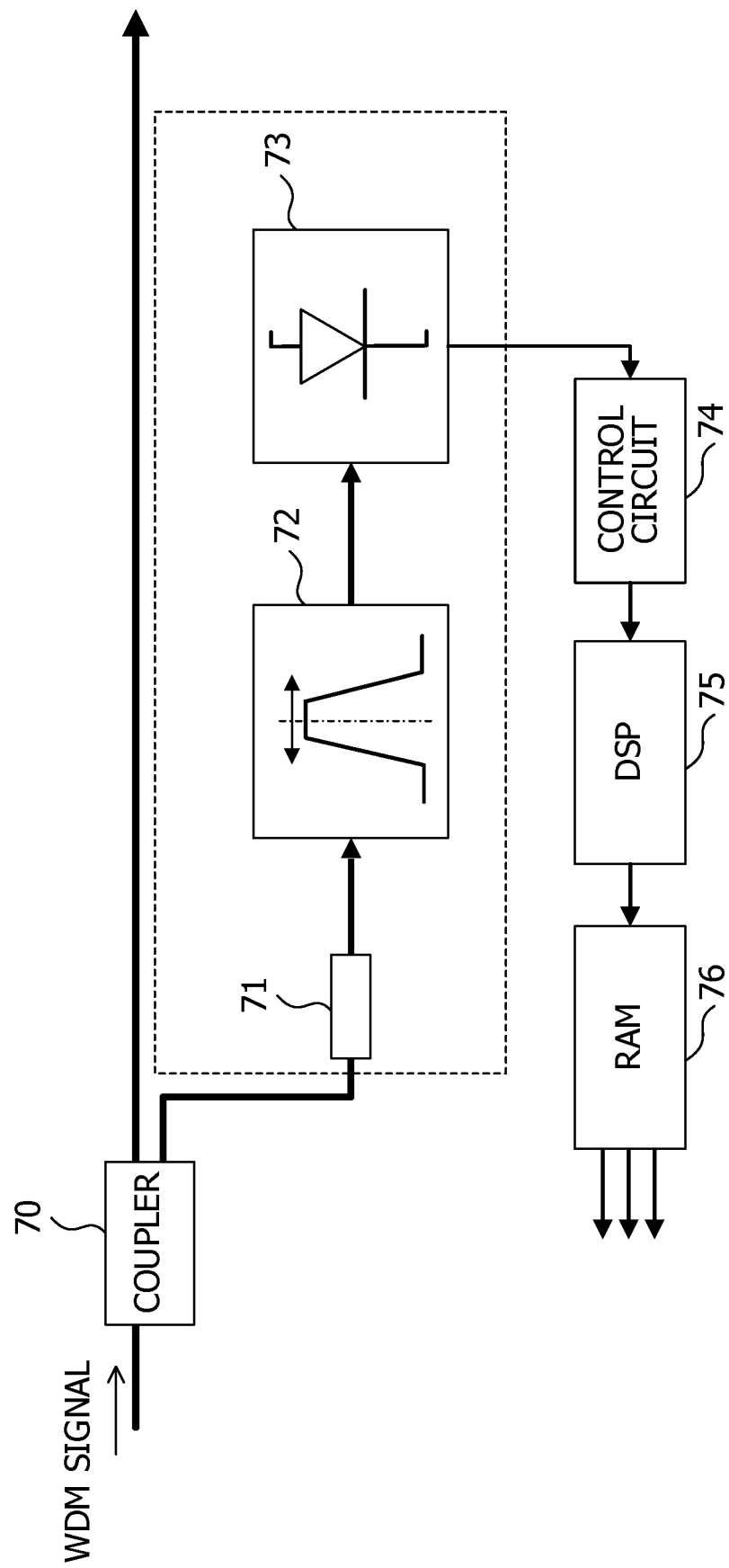
FIG. 29 is a diagram (part 1) illustrating a configuration example of an optical channel monitor.
Figure 30:
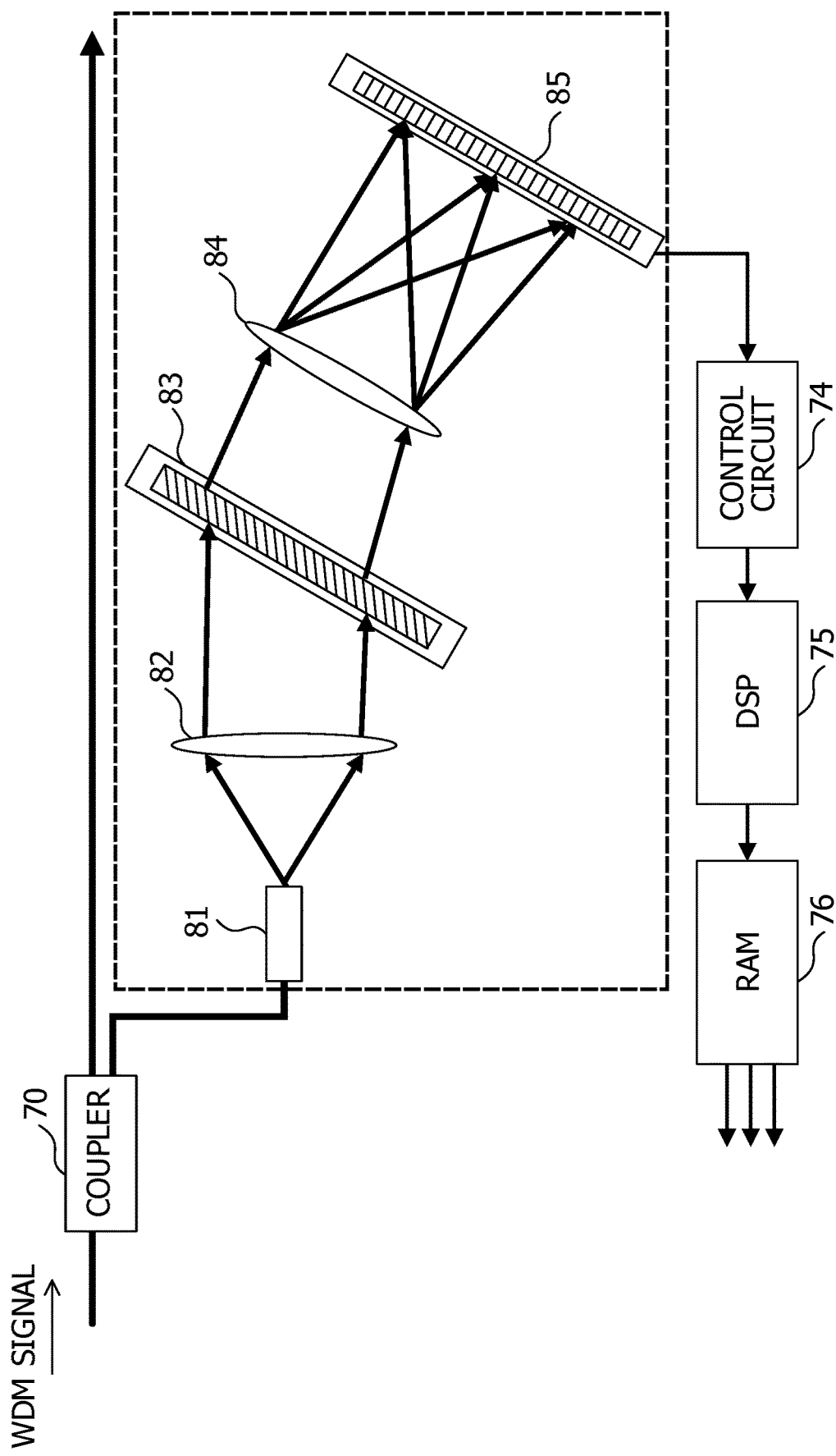
FIG. 30 is a diagram (part 2) illustrating another configuration example of the optical channel monitor.
Figure 31:
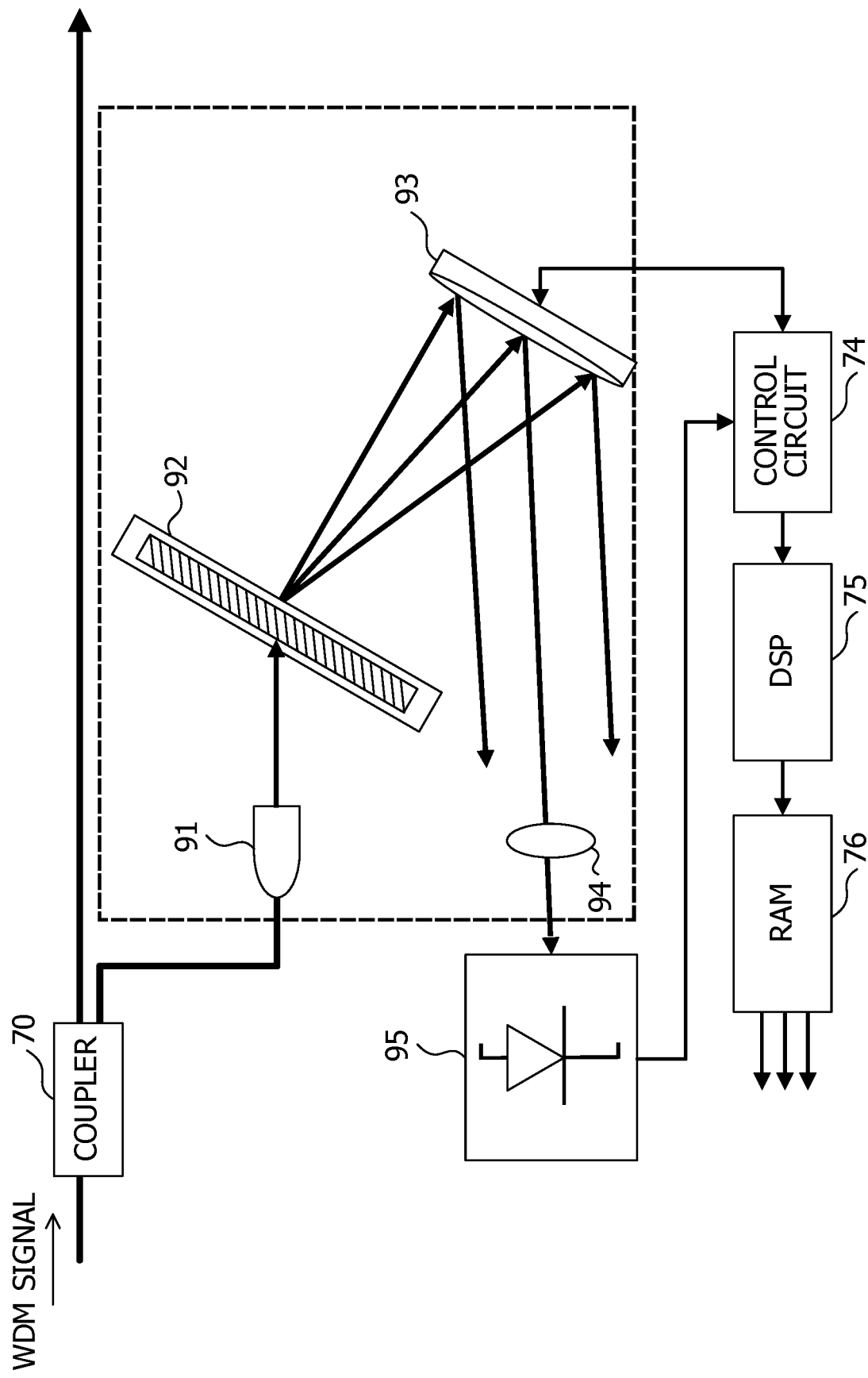
FIG. 31 is a diagram (part 3) illustrating still another configuration example of the optical channel monitor.

FIGS. 29 to 31 illustrate examples of a configuration of the optical channel monitor. In the examples illustrated in FIGS. 29 to 31, an input WDM signal is separated by an optical coupler 70 and guided to the optical channel monitor.

In the example illustrated in FIG. 29, the input WDM signal is guided to a wavelength variable optical filter 72 by an optical fiber and lens 71. A pass wavelength of the wavelength variable optical filter 72 is controlled so as to scan a wavelength band of the WDM signal. A light receiver (PD) 73 converts output light of the wavelength variable optical filter 72 into an electric signal.

A control circuit 74 generates a digital signal representing the optical power based on the output signal of the light receiver 73. A digital signal processor (DSP) 75 generates monitor data representing the power of each wavelength channel based on the digital signal generated by the control circuit 74. This monitor data is stored in a RAM 76.

In the example illustrated in FIG. 30, the input WDM signal is guided to a PD array 85 through an optical fiber 81, a lens 82, a grating 83, and a lens 84. In this case, the input WDM signal is split for each wavelength in the grating 83. For example, light of each wavelength channel of the WDM signal is incident on different positions of the PD array 85. Accordingly, monitor data representing optical power of each wavelength channel is obtained. In this configuration, an arrayed waveguide gratings (AWG) may be installed instead of the grating 83.

In the example illustrated in FIG. 31, the input WDM signal is guided to a light receiver 95 through a lens 91, a grating 92, a MEMS mirror 93, and a lens 94. In this case, the input WDM signal is split for each wavelength in the grating 92. For example, light of each wavelength channel of the WDM signal is incident on different positions of the MEMS mirror 93. Accordingly, it is possible to guide light of each wavelength channel to the light receiver 95 in order, by controlling an angle of the MEMS mirror 93. As a result, monitor data representing the optical power of each wavelength channel is obtained.

The optical channel monitor described above is installed in a node of the WDM transmission system. The existing WDM transmission system mainly transmits the WDM signal to be arranged in the C-band. However, in order to further increase the capacity of the WDM transmission system, a configuration in which a WDM signal to be arranged in the L-band and/or the S-band is transmitted in addition to the WDM signal to be arranged in the C-band has been proposed. In this case, it is preferable that the optical channel monitor can monitor not only the WDM signal to be arranged in the C-band but also the WDM signal to be arranged in the L-band and/or the S-band.

However, a wavelength range that can be monitored by the existing optical channel monitor is not wide. For example, in the configuration illustrated in FIG. 29, the pass wavelength is adjusted by controlling temperature of the wavelength variable optical filter 72. For example, when both the C-band and the L-band are monitored with this optical channel monitor, it is demanded to change the temperature of the wavelength variable optical filter 72 by 100 degrees or more. For that reason, it is difficult to monitor both the C-band and the L-band with this optical channel monitor. This problem is the same even in a case of monitoring both the C-band and the S-band. Accordingly, in the configuration in which the WDM signal to be arranged in the L-band and/or the S-band is transmitted in addition to the WDM signal to be arranged in the C-band, it is demanded to provide the optical channel monitor for each WDM signal, which may increase the cost of the WDM transmission system. Therefore, a configuration in which the WDM signals respectively to be arranged in a plurality of wavelength bands (that is, the C-band, L-band, and S-band) may be monitored using an optical channel monitor for monitoring one wavelength band (for example, the C-band) is examined.

Figure 32:
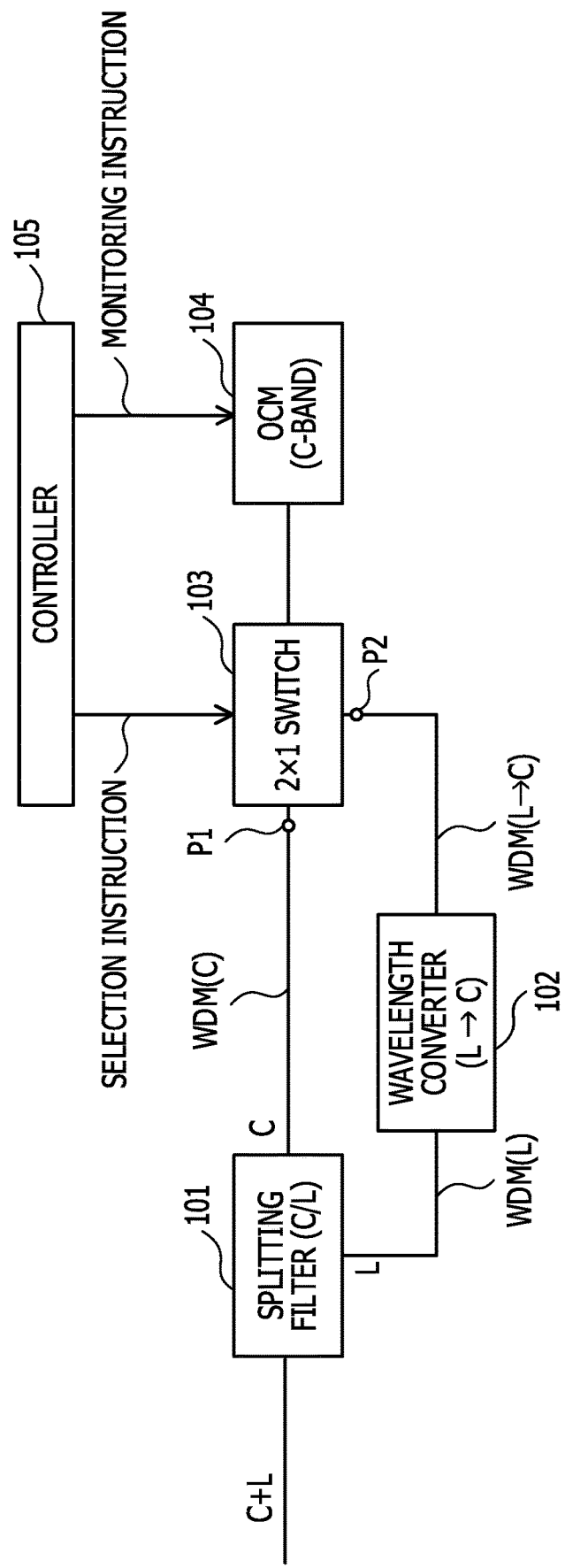
FIG. 32 is a diagram illustrating a first example of an optical channel monitoring system.

FIG. 32 illustrates a first example of an optical channel monitoring system. In this example, it is assumed that a WDM signal to be arranged in the C-band and a WDM signal to be arranged in the L-band are multiplexed and transmitted. In the following description, the WDM signal to be arranged in the C-band is referred to as a "WDM(C) signal", and the WDM signal to be arranged in the L-band is referred to as a "WDM(L) signal".

As illustrated in FIG. 32, the optical channel monitoring system of the first example includes a splitting filter 101, a wavelength converter 102, a 2×1 switch 103, an optical channel monitor 104, and a controller 105. An optical signal including the WDM(C) signal and the WDM(L) signal is input to the optical channel monitoring system.

The splitting filter 101 splits the WDM(C) signal and the WDM(L) signal. For example, the splitting filter 101 extracts the WDM(C) signal and the WDM(L) signal from the input optical signal. The wavelength converter 102 performs wavelength conversion so that the WDM(L) signal is arranged in the C-band. In the following description, the WDM signal output from the wavelength converter 102 may be referred to as a "WDM(L→C) signal".

The 2×1 switch 103 selects input light of a port P1 or a port P2 according to a selection instruction given from the controller 105. The WDM(C) signal is input to the port P1. The WDM(L→C) signal is input to the port P2. The optical channel monitor 104 monitors power of each wavelength channel of the WDM signal output from the 2×1 switch 103 according to the monitor instruction given from the controller 105. For example, when the port P1 is selected in the 2×1 switch 103, the optical channel monitor 104 monitors the WDM(C) signal. On the other hand, when the port P2 is selected in the 2×1 switch 103, the optical channel monitor 104 monitors the WDM(L→C) signal. The optical channel monitor 104 is configured to monitor C-band light.

The controller 105 is realized by a processor system including, for example, a processor and a memory. In this case, the controller 105 is realized by executing the program stored in the memory by the processor.

The WDM(L→C) signal is generated by converting the wavelength of the WDM(L) signal using the wavelength converter 102. Accordingly, the power of each wavelength channel of the WDM(L) signal is substantially monitored by monitoring the WDM(L→C) signal. For example, the optical channel monitoring system illustrated in FIG. 32 may monitor both the WDM signal to be arranged in the C-band and the WDM signal to be arranged in the L-band by using the optical channel monitor 104 for the C-band.

The wavelength converter 102 is realized by using, for example, a nonlinear optical crystal and an excitation light source. In this case, the nonlinear optical crystal is formed of lithium niobate, for example. This technology is disclosed in, for example, Japanese Laid-open Patent Publication No. 2000-075330. Alternatively, the wavelength converter 102 may be realized by a distributed feedback laser diode (DFB-LD).

Figure 33:
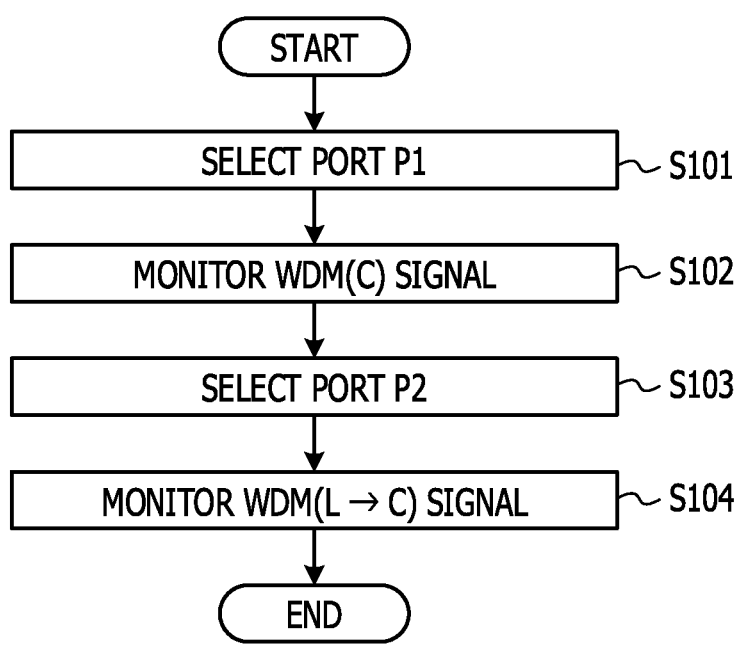
FIG. 33 is a flowchart illustrating an example of an operation of the optical channel monitoring system illustrated in FIG. 32.

FIG. 33 is a flowchart illustrating an example of an operation of the optical channel monitoring system illustrated in FIG. 32. In this example, it is assumed that the WDM(L→C) signal generated from the WDM(L) signal by the wavelength converter 102 is input to the port P2 of the 2×1 switch 103.

In S101, the controller 105 gives a selection instruction for designating the port P1 to the 2×1 switch 103. Then, the 2×1 switch 103 selects the WDM(C) signal input to the port P1 and guides the WDM(C) signal to the optical channel monitor 104. In step S102, the controller 105 gives a monitor instruction to the optical channel monitor 104. Then, the optical channel monitor 104 monitors the power of each wavelength channel of the WDM(C) signal.

In S103, the controller 105 gives a selection instruction for designating the port P2 to the 2×1 switch 103. Then, the 2×1 switch 103 selects the WDM(L→C) signal input to the port P2 and guides the WDM(L→C) signal to the optical channel monitor 104. In S104, the controller 105 gives a monitor instruction to the optical channel monitor 104. Then, the optical channel monitor 104 monitors the power of each wavelength channel of the WDM(L→C) signal. The controller 105 may activate the wavelength converter 102 only during a period in which S103 to S104 are executed.

Figure 34:
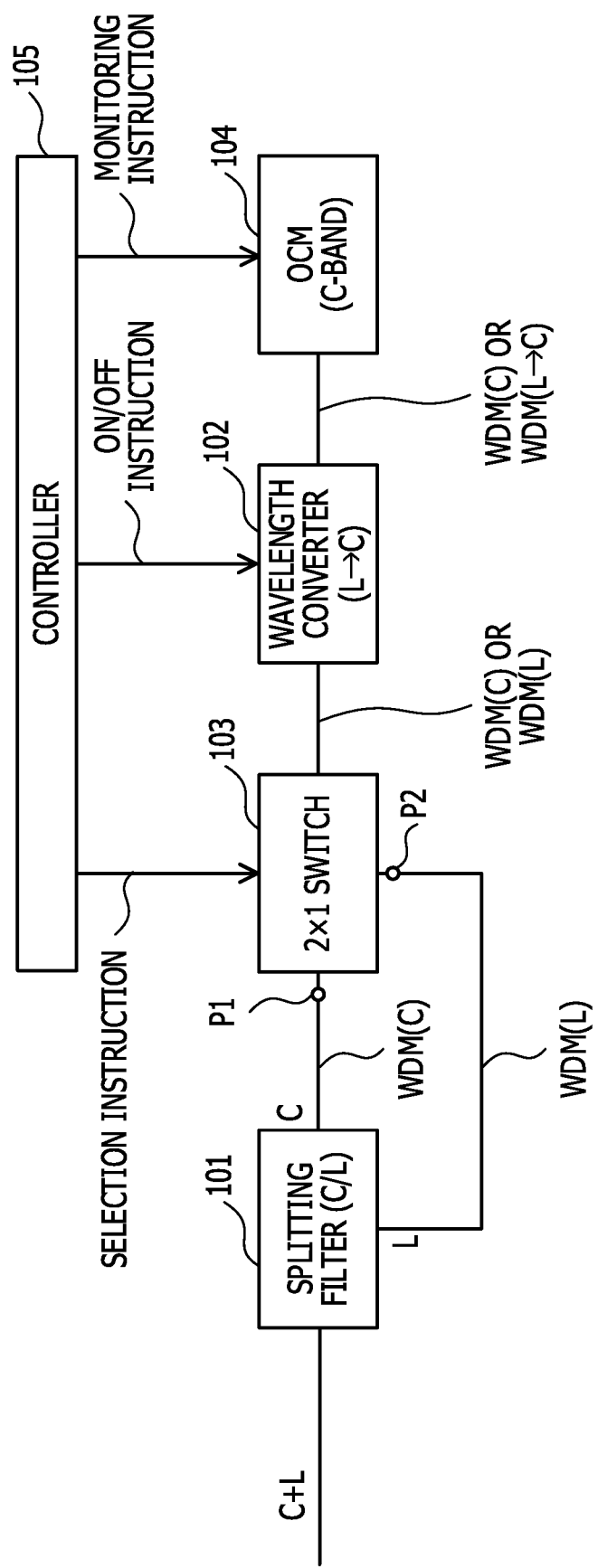
FIG. 34 is a diagram illustrating a second example of the optical channel monitoring system.

FIG. 34 illustrates a second example of the optical channel monitoring system. Similarly as in the first example, the optical channel monitoring system of the second example also includes the splitting filter 101, the wavelength converter 102, the 2×1 switch 103, the optical channel monitor 104, and the controller 105. However, in the first example and the second example, arrangements of the wavelength converter 102 and the 2×1 switch 103 are different from each other.

The WDM(C) signal and the WDM(L) signal extracted by the splitting filter 101 are guided to the port P1 and the port P2 of the 2×1 switch 103, respectively. The 2×1 switch 103 selects input light of the port P1 or port P2 according to a selection instruction given from the controller 105. The wavelength converter 102 executes wavelength conversion when the ON/OFF instruction given from the controller 105 indicates "ON".

The controller 105 controls the 2×1 switch 103 and the wavelength converter 102. For example, when the 2×1 switch 103 selects the input light of the port P1, the 2×1 switch 103 and the wavelength converter 102 are controlled so that the wavelength converter 102 does not perform the wavelength conversion. When the 2×1 switch 103 selects the input light of the port P2, the 2×1 switch 103 and the wavelength converter 102 are controlled so that the wavelength converter 102 performs wavelength conversion.

Figure 35:
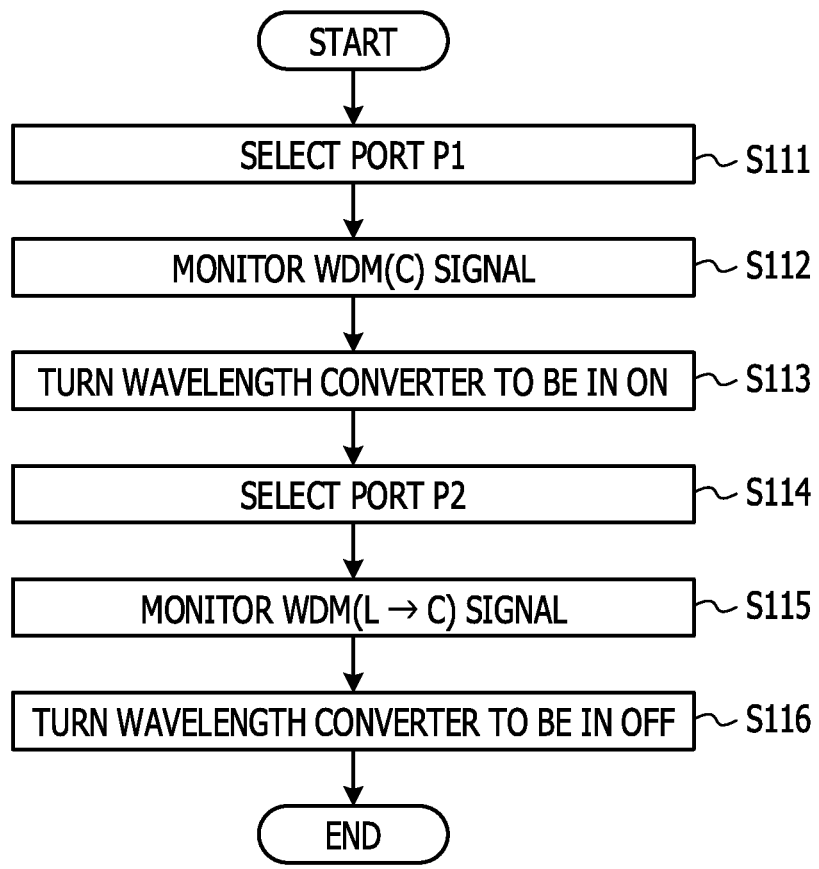
FIG. 35 is a flowchart illustrating an example of an operation of the optical channel monitoring system illustrated in FIG. 34.

FIG. 35 is a flowchart illustrating an example of an operation of the optical channel monitoring system illustrated in FIG. 34. It is assumed that the wavelength converter 102 is in the OFF state when a process of this flowchart is started.

In S111, the controller 105 gives the selection instruction for designating the port P1 to the 2×1 switch 103. Then, the 2×1 switch 103 selects the WDM(C) signal input to the port P1 and guides the WDM(C) signal to the wavelength converter 102. However, in this case, the wavelength converter 102 is in the OFF state. Accordingly, the WDM(C) signal is guided to the optical channel monitor 104 without being subjected to wavelength conversion. In S112, the controller 105 gives the monitor instruction to the optical channel monitor 104. Then, the optical channel monitor 104 monitors the power of each wavelength channel of the WDM(C) signal. In S113, the controller 105 controls the wavelength converter 102 to be in an ON state by using an ON/OFF instruction.

In S114, the controller 105 gives the selection instruction for designating the port P2 to the 2×1 switch 103. Then, the 2×1 switch 103 selects the WDM(L) signal input to the port P2 and guides the WDM(L) signal to the wavelength converter 102. In this case, the wavelength converter 102 is in the ON state. Accordingly, the WDM(L) signal is arranged in the C-band by the wavelength converter 102. For example, the WDM(L→C) signal is generated by the wavelength converter 102 and guided to the optical channel monitor 104. In S115, the controller 105 gives the monitor instruction to the optical channel monitor 104. Then, the optical channel monitor 104 monitors the power of each wavelength channel of the WDM(L→C) signal. In S116, the controller 105 controls the wavelength converter 102 to be in the OFF state by using the ON/OFF instruction.

As described above, in the examples illustrated in FIGS. 32 to 35, WDM signals (that is, WDM(L) signals) arranged in the L-band are arranged in the C-band and then monitored by the optical channel monitor 104. However, the conversion efficiency of the wavelength converter 102 has wavelength characteristics (or wavelength dependence). For that reason, in the configuration in which the WDM signal after wavelength conversion is monitored, an error due to wavelength conversion occurs. Accordingly, in the third to fourth examples described below, the wavelength characteristics of the conversion efficiency of the wavelength converter 102 is compensated.

Figure 36:
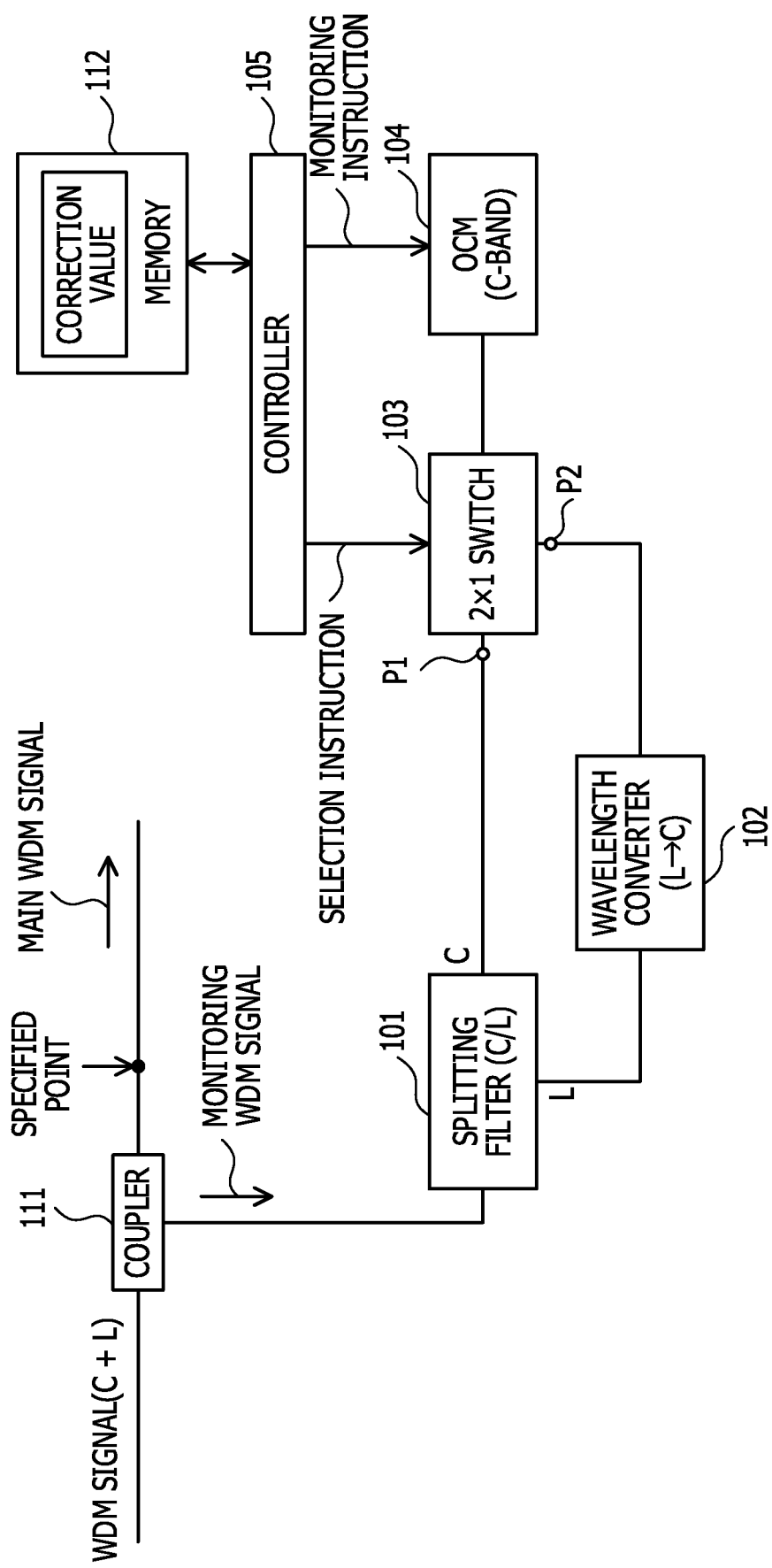
FIG. 36 is a diagram illustrating a third example of the optical channel monitoring system.

FIG. 36 illustrates a third example of the optical channel monitoring system. The splitting filter 101, the wavelength converter 102, the 2×1 switch 103, the optical channel monitor 104, and the controller 105 are substantially the same in the first example illustrated in FIG. 32 and the third example illustrated in FIG. 36.

An optical coupler 111 is used as an optical splitter, and separates the input WDM signal to generate a main WDM signal and a monitoring WDM signal. The main WDM signal is used for transmitting data. Accordingly, in order to realize high-quality data transmission, the power of each wavelength channel of the main WDM signal is desired to be appropriate. The optical channel monitoring system of the third example has a function of accurately monitoring the power of each wavelength channel at an arbitrary point (hereinafter, referred to as a specified point) on an optical path through which the main WDM signal output from the optical coupler 111 propagates.

A correction value for compensating loss in the optical coupler 111 and loss in a path from the optical coupler 111 to the optical channel monitor 104 is stored in the memory 112. This correction value is calculated in advance for each wavelength channel. As an example, an optical signal whose power at a specified point is known is input to the optical coupler 111. In this case, the power of this optical signal is measured using the optical channel monitor 104. In this case, a difference between the known power at the specified point and the measured value obtained by the optical channel monitor 104 represents the correction value. For example, when an optical signal having power of 0 dBm at a specified point is input to the optical coupler 111, the value measured by the optical channel monitor 104 is assumed to be −20 dBm. In this case, the correction value is 20 dBm. A process of calculating the correction value may be performed for each wavelength channel or may be collectively performed for a plurality of wavelength channels in the WDM signal.

The correction value is generated for each wavelength channel, for example. In this case, the optical signal in the WDM signal to be arranged in the L-band is converted by the wavelength converter 102 and guided to the optical channel monitor 104. Accordingly, the correction value generated by the method described above compensates for the wavelength characteristics of the conversion efficiency of the wavelength converter 102. For example, the correction value for compensating the wavelength characteristic of the conversion efficiency of the wavelength converter 102 is stored in the memory 112.

Figure 37A:
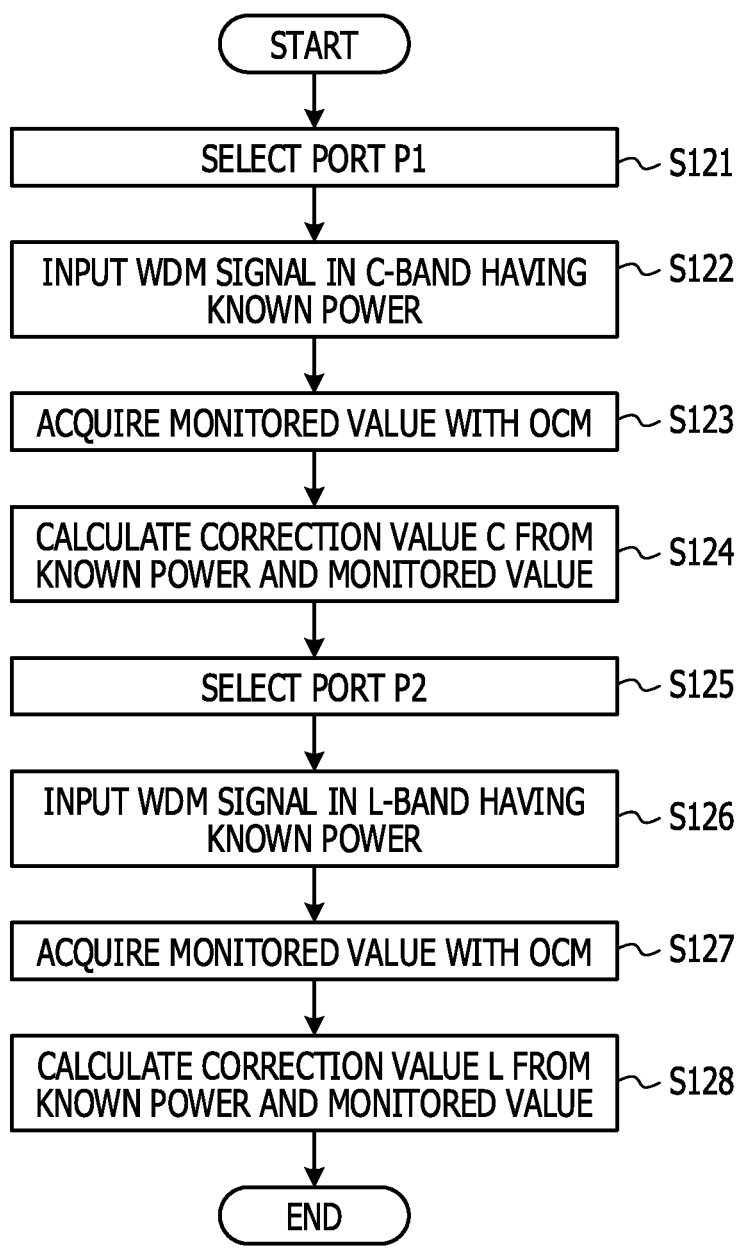
FIGS. 37A and 37B are flowcharts illustrating an example of an operation of the optical channel monitoring system illustrated in FIG. 36.
Figure 37B:
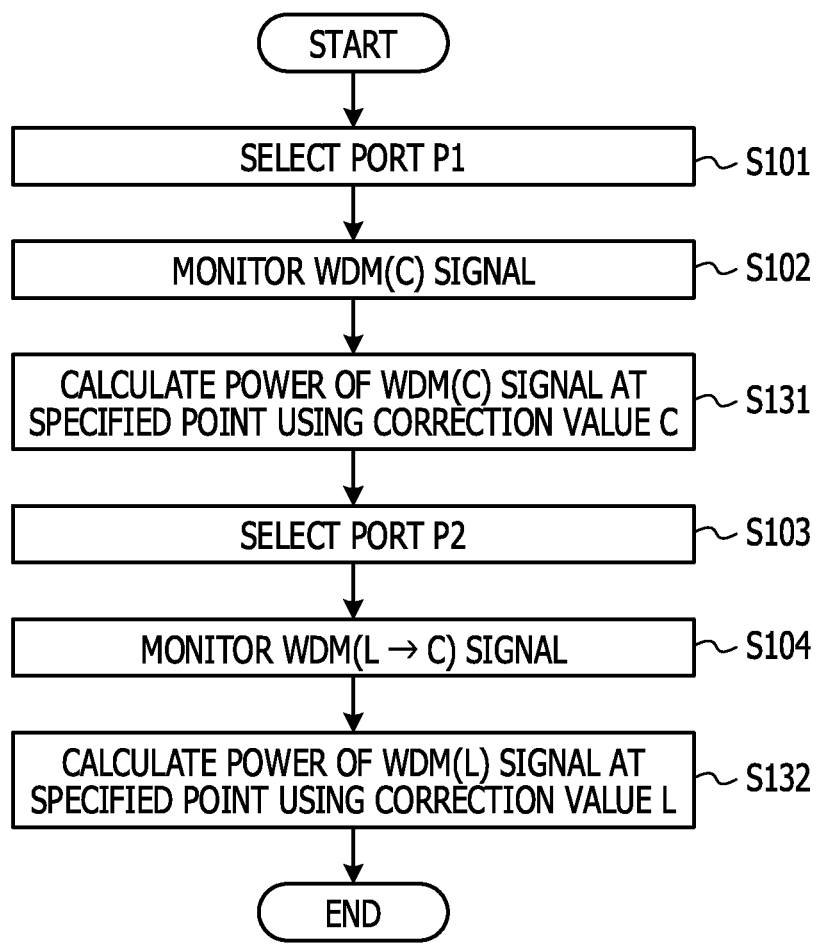

FIGS. 37A and 37B are flowcharts illustrating an example of an operation of the optical channel monitoring system illustrated in FIG. 36. In the third example illustrated in FIG. 36, a procedural sequence for calculating the correction value (FIG. 37A) and a procedural sequence for monitoring the WDM signal (FIG. 37B) are executed.

In S121, the controller 105 gives the selection instruction for designating the port P1 to the 2×1 switch 103. In S122, the WDM signal arranged in the C-band, of which the power of each wavelength channel at the specified point is known, is input. In this case, since the 2×1 switch 103 selects the input light of the port P1, the WDM signal is guided to the optical channel monitor 104. In S123, the optical channel monitor 104 monitors the power of each wavelength channel of the WDM signal.

In S124, the controller 105 calculates a correction value C for each wavelength channel based on a difference between the known power at the specified point and a monitored value obtained in S123. The calculated correction value C is stored in the memory 112.

In S125, the controller 105 gives the selection instruction for designating the port P2 to the 2×1 switch 103. In S126, the WDM signal arranged in the L-band, of which the power of each wavelength channel at the specified point is known, is input. In this case, the 2×1 switch 103 selects input light of the port P2. The WDM signal input in S126 is arranged in the C-band by the wavelength converter 102. Then, the WDM signal converted from the L-band to the C-band is guided to the optical channel monitor 104. In S127, the optical channel monitor 104 monitors the power of each wavelength channel of the WDM signal.

In S128, the controller 105 calculates a correction value L for each wavelength channel based on the difference between the known power at the specified point and the monitored value obtained in S127. The calculated correction value L is stored in the memory 112.

As such, the correction value C for correcting the power of each wavelength channel of the WDM signal in the C-band and the correction value L for correcting the power of each wavelength channel of the WDM signal in the L-band are calculated. Thereafter, the WDM signal is monitored using these correction values.

As illustrated in FIG. 37B, in the procedural sequence for monitoring the WDM signal in the third example, S131 and S132 are executed, in addition to S101 to S104 illustrated in FIG. 33. For example, in S131, the controller 105 calculates the power of each wavelength channel of the WDM signal at the specified point by correcting the monitored value obtained in S102 using the correction value C stored in the memory 112. Similarly, in S132, the controller 105 calculates the power of each wavelength channel of the WDM signal at the specified point by correcting the monitored value obtained in S104 using the correction value L stored in the memory 112. According to this method, since the wavelength characteristics of the conversion efficiency of the wavelength converter 102 is compensated, the power of each wavelength channel of the WDM signal is accurately detected.

Figure 38:
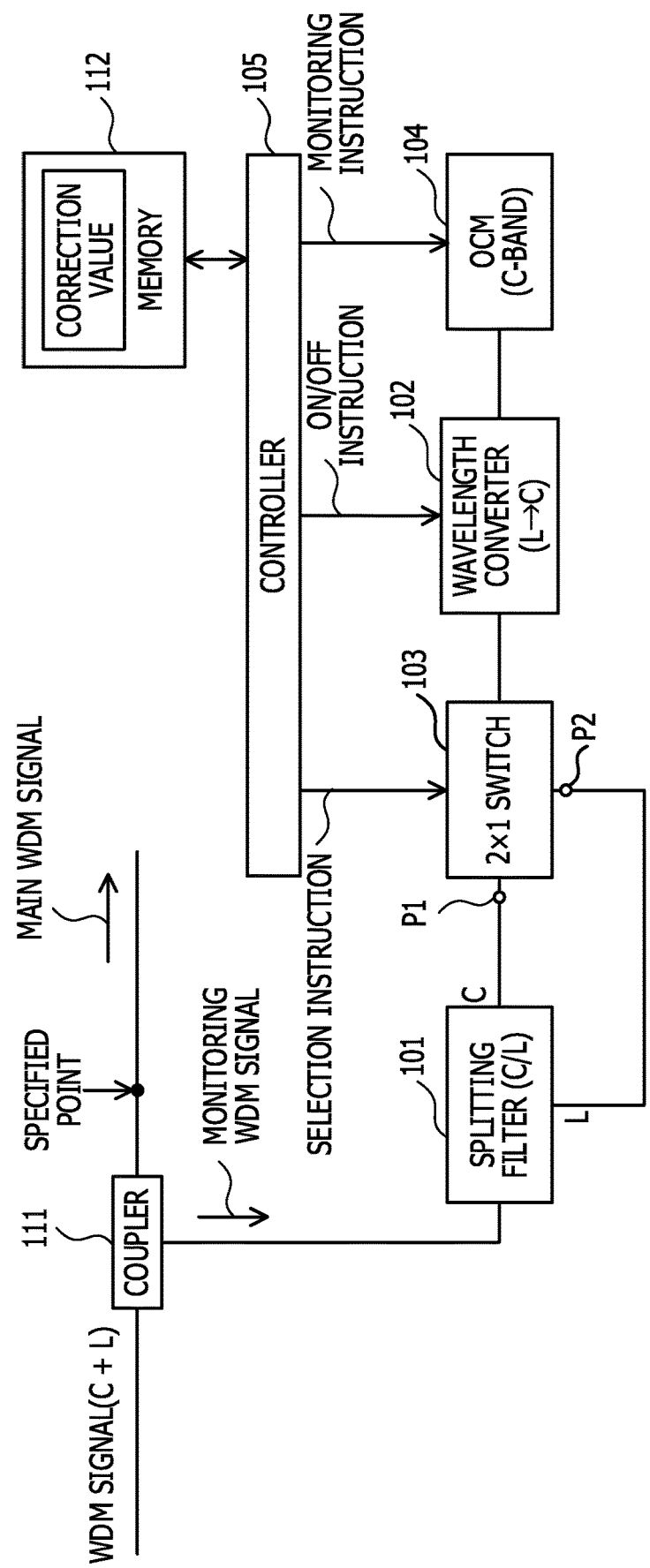
FIG. 38 is a diagram illustrating a fourth example of the optical channel monitoring system.

FIG. 38 illustrates a fourth example of the optical channel monitoring system. The splitting filter 101, the wavelength converter 102, the 2×1 switch 103, the optical channel monitor 104, and the controller 105 are substantially the same in the second example illustrated in FIG. 34 and the fourth example illustrated in FIG. 38. The optical coupler 111 and the memory 112 are substantially the same in the third example illustrated in FIG. 36 and the fourth example illustrated in FIG. 38.

Figure 39A:
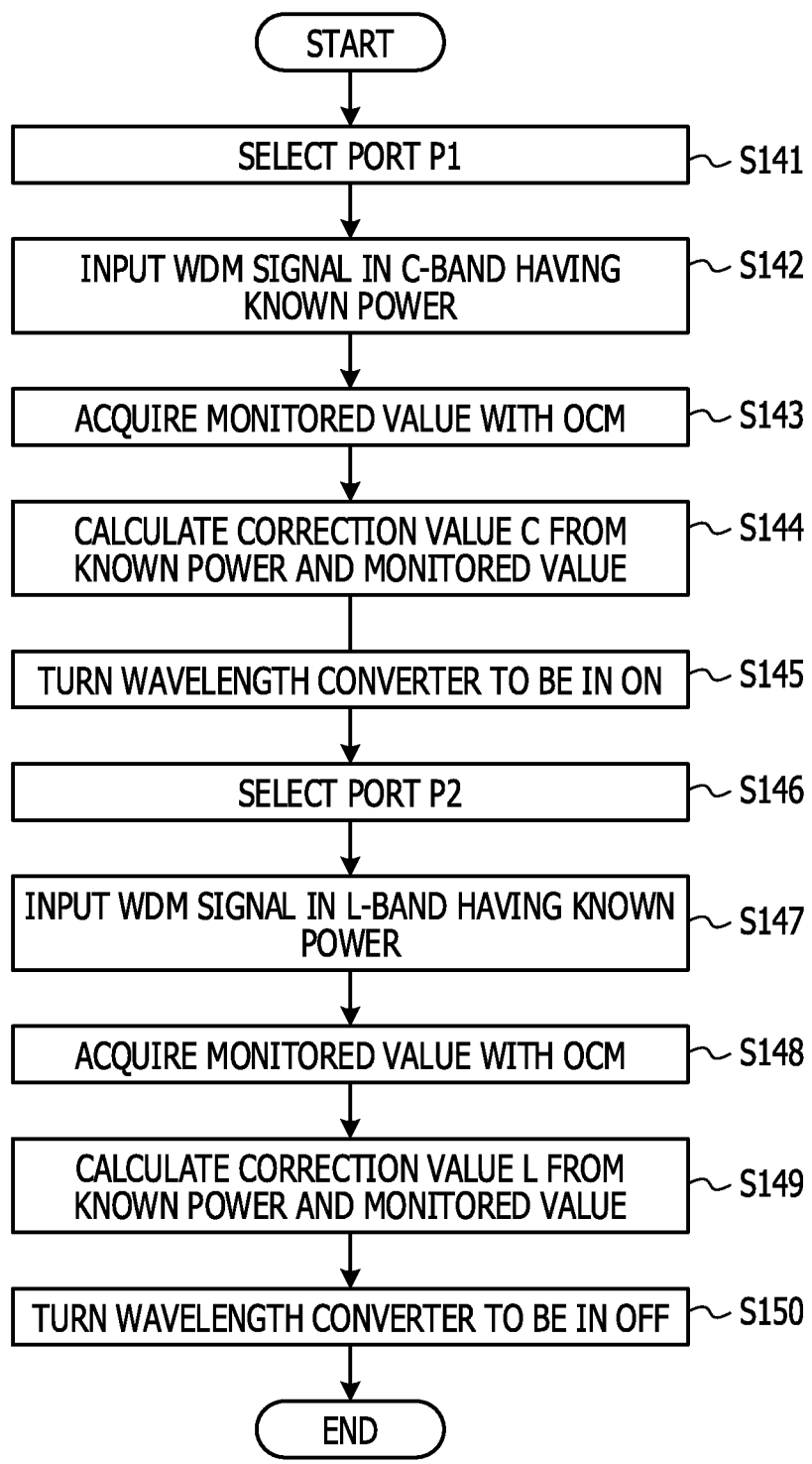
FIGS. 39A and 39B are flowcharts illustrating an example of an operation of the optical channel monitoring system illustrated in FIG. 38.
Figure 39B:
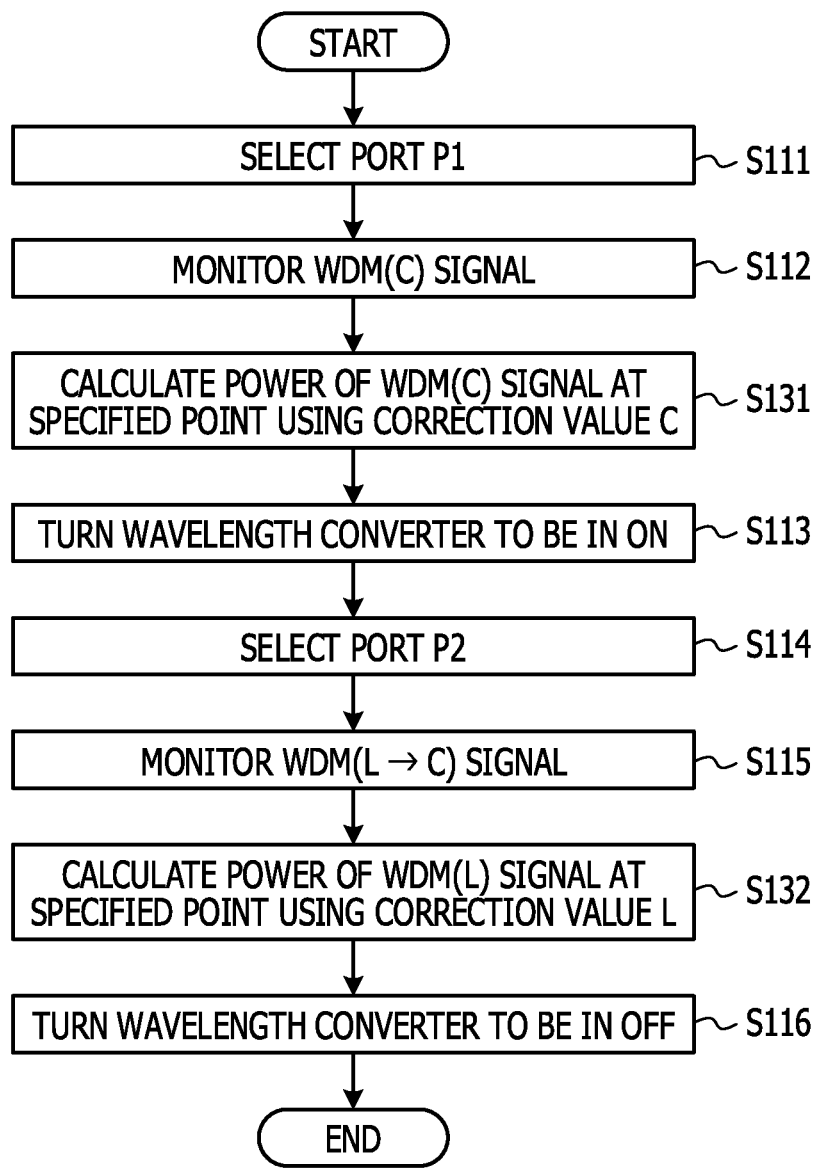

FIGS. 39A and 39B are flowcharts illustrating an example of an operation of the optical channel monitoring system illustrated in FIG. 38. In the fourth example illustrated in FIG. 38, a procedural sequence for calculating the correction value (FIG. 39A) and a procedural sequence for monitoring the WDM signal (FIG. 39B) are executed.

Similarly as in S121 to S124 in FIG. 37A, the correction value C for correcting the power of each wavelength channel of the WDM signal arranged in the C-band is calculated in S141 to S144. When S141 to S144 are executed, the wavelength converter 102 is in the OFF state. In S145, the controller 105 controls the wavelength converter 102 to be in the ON state. Subsequently, similarly as in S125 to S128 in FIG. 37A, the correction value L for correcting the power of each wavelength channel of the WDM signal arranged in the L-band is calculated, in S146 to S149. Thereafter, in S150, the controller 105 controls the wavelength converter 102 to be in the OFF state.

As such, similarly as in the third example, the correction value C for correcting the power of each wavelength channel of the WDM signal in the C-band and the correction value L for correcting the power of each wavelength channel of the W-band WDM signal in the L-band are calculated.

In the procedural sequence of monitoring the WDM signal in the fourth example, S131 to S132 are executed, in addition to S111 to S116 illustrated in FIG. 35. S131 to S132 are substantially the same in the third example and the fourth example. For example, the monitored value obtained by the optical channel monitor 104 is corrected using the correction value C or the correction value L.

Figure 40:
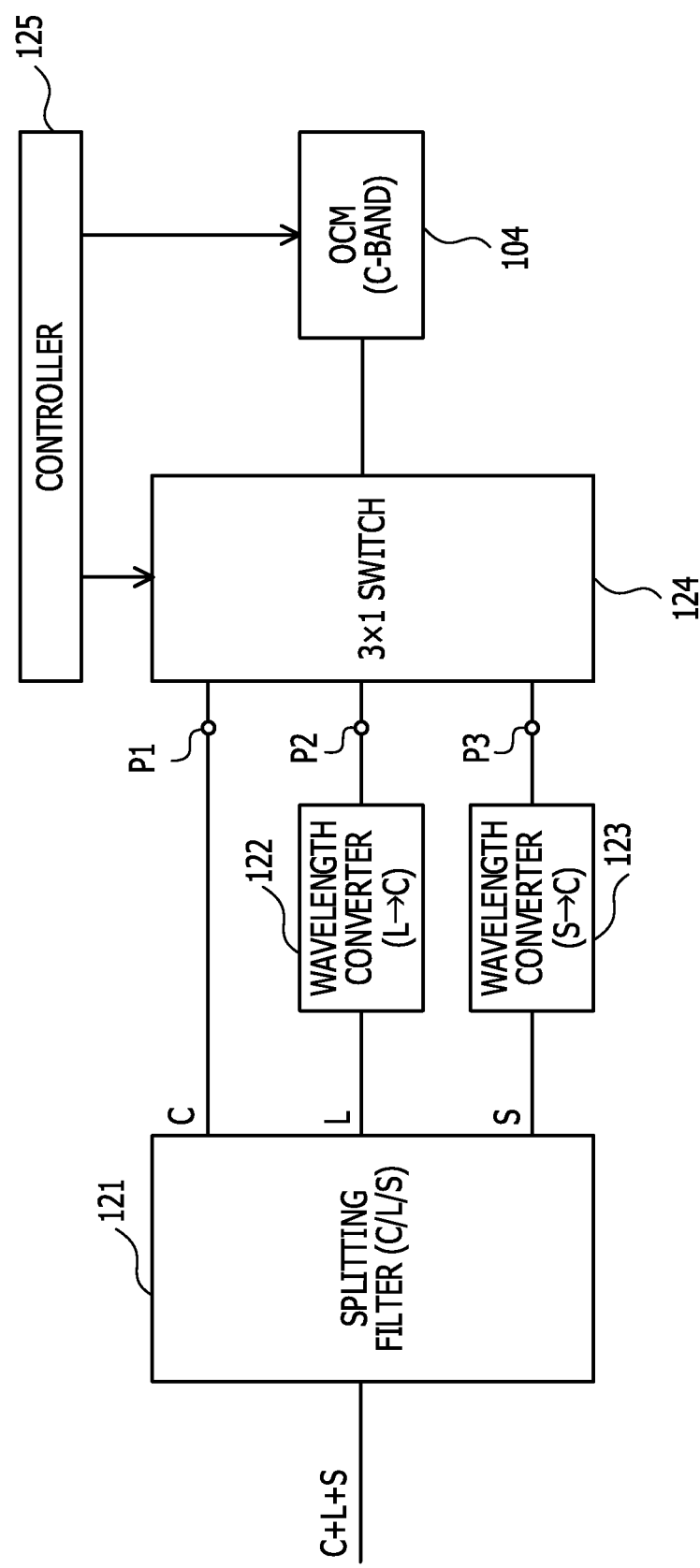
FIG. 40 is a diagram illustrating an example of a configuration for monitoring three WDM signals.

In the examples illustrated in FIGS. 32 to 39B, the optical channel monitoring system monitors WDM signals of two wavelength bands, but may monitor WDM signals of three or more wavelength bands. For example, an optical channel monitoring system that monitors WDM signals of three wavelength bands (the C-band, L-band, and S-band) is realized with a configuration illustrated in FIG. 40.

The splitting filter 121 extracts a WDM signal in the C-band, a WDM signal in the L-band, and a WDM signal in the S-band from input light. The WDM signal in the C-band is guided to the port P1 of a 3×1 switch 124, the WDM signal in the L-band is guided to a wavelength converter 122, and the WDM signal in the S-band is guided to a wavelength converter 123.

The wavelength converter 122 converts the wavelength of the WDM signal in the L-band and arranges the wavelength of the WDM signal in the C-band. The WDM signal output from the wavelength converter 122 is guided to the port P2 of the 3×1 switch 124. The wavelength converter 123 converts the wavelength of the WDM signal in the S-band and arranges the wavelength of the WDM signal in the C-band. The WDM signal output from the wavelength converter 123 is guided to a port P3 of the 3×1 switch 124.

The 3×1 switch 124 selects the input light of the port P1, the port P2, or the port P3 according to an instruction given from the controller 125. The optical channel monitor 104 monitors the WDM signal selected by the 3×1 switch 124 according to the instruction given from the controller 125.

The controller 125 controls the 3×1 switch 124 and the optical channel monitor 104. For example, when the WDM signal in the C-band is monitored, the controller 125 gives a selection instruction for designating the port P1 to the 3×1 switch 124. Then, since the WDM signal in the C-band is guided to the optical channel monitor 104, the WDM signal in the C-band is monitored. When the WDM signal in the L-band is monitored, the controller 125 gives a selection instruction for designating the port P2 to the 3×1 switch 124. Then, since the WDM signal output from the wavelength converter 122 is guided to the optical channel monitor 104, the WDM signal in the L-band is monitored. When the WDM signal in the S-band is monitored, the controller 125 gives a selection instruction for designating the port P3 to the 3×1 switch 124. Then, since the WDM signal output from the wavelength converter 123 is guided to the optical channel monitor 104, the WDM signal in the S-band is monitored.

Figure 41:
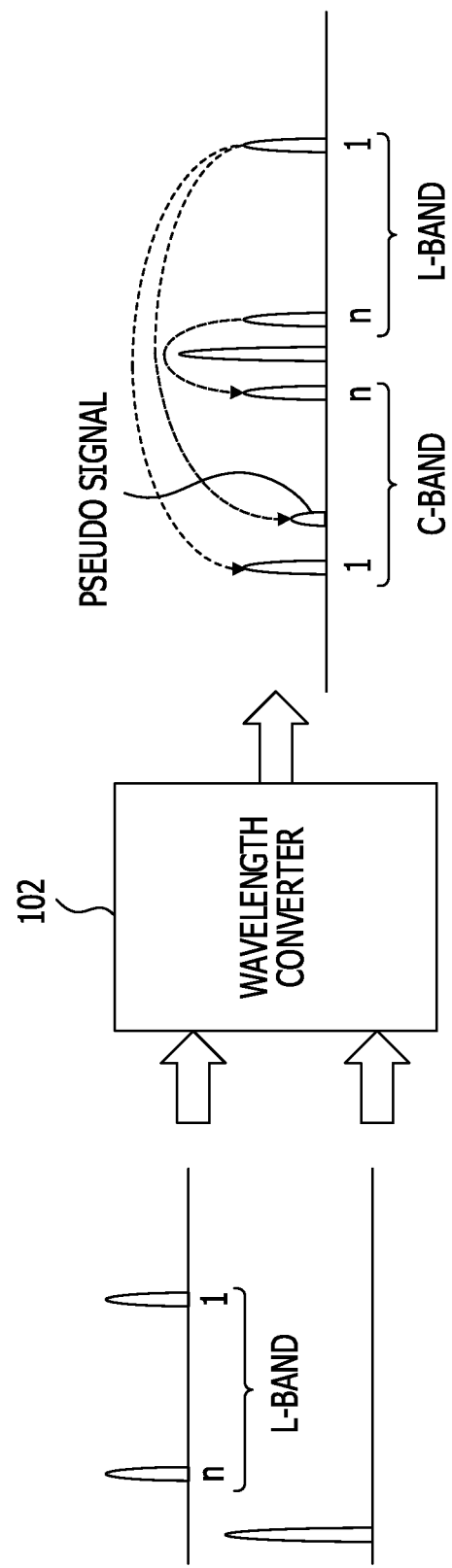
FIG. 41 is a view illustrating an example of a pseudo signal generated due to wavelength conversion.

The wavelength converter 102 converts the wavelength of the input light by using energy of excitation light. In the example illustrated in FIG. 41, the WDM signal is converted from the L-band to the C-band in the wavelength converter 102. In this case, the wavelength of each optical signal is shifted by the interaction between the excitation light and each optical signal in the WDM signal.

Power of the optical signal (optical signal after conversion) generated by the wavelength conversion depends on the power of the excitation light. In the example illustrated in FIG. 42A, when 20 dBm of excitation light is given, an optical signal lower by 10 dB than the input optical signal is generated.

However, due to the interaction between the optical signals in the WDM signal, a new optical signal may be generated. In the example illustrated in FIG. 41, the optical signal of a wavelength channel n acts as excitation light for a wavelength channel 1 in the L-band, and an unintended optical signal appears in the C-band. In the following description, this unintended optical signal may be referred to as a "pseudo signal".

Power of the pseudo signal depends on the power of the optical signal of each wavelength channel in the WDM signal. However, the power of each optical signal in the WDM signal is much smaller than the excitation light. For that reason, when compared with power of an original optical signal generated by the excitation light, the power of the pseudo signal is greatly reduced. In the example illustrated in FIG. 42B, when the power of the optical signal acting as the excitation light is 0 dBm and the power of the optical signal before conversion is 0 dBm to −20 dBm, the pseudo signal of −40 dBm to −60 dBm is generated.

As such, in the wavelength converter 102, a pseudo signal sometimes appears due to the interaction between optical signals in the WDM signal. However, when compared with the original optical signal generated by the excitation light, the power of the pseudo signal is much smaller. Accordingly, by setting an appropriate threshold level, the pseudo signal may be identified in the monitoring result by the optical channel monitor 104.

FIG. 43 is a flowchart illustrating an example of an operation of monitoring a WDM signal in consideration of a pseudo signal. A process of this flowchart is executed in the optical channel monitoring system illustrated in FIG. 32. S101 to S104 are substantially the same in FIGS. 33 and 43.

In S161, the controller 105 compares the monitored value for each wavelength channel obtained in S102 and S104 with a threshold value. In this case, if the monitored value is larger than the threshold value, it is determined that the monitored value represents power of a normal signal obtained by the wavelength conversion. On the other hand, if the monitor value is smaller than the threshold value, it is determined that the monitored value represents the power of the pseudo signal. For example, in the embodiment illustrated in FIGS. 42A and 42B, −35 dBm is used as the threshold value. As a result, in a wavelength band after wavelength conversion, the signal and the pseudo signal are discriminated.

Figure 44:
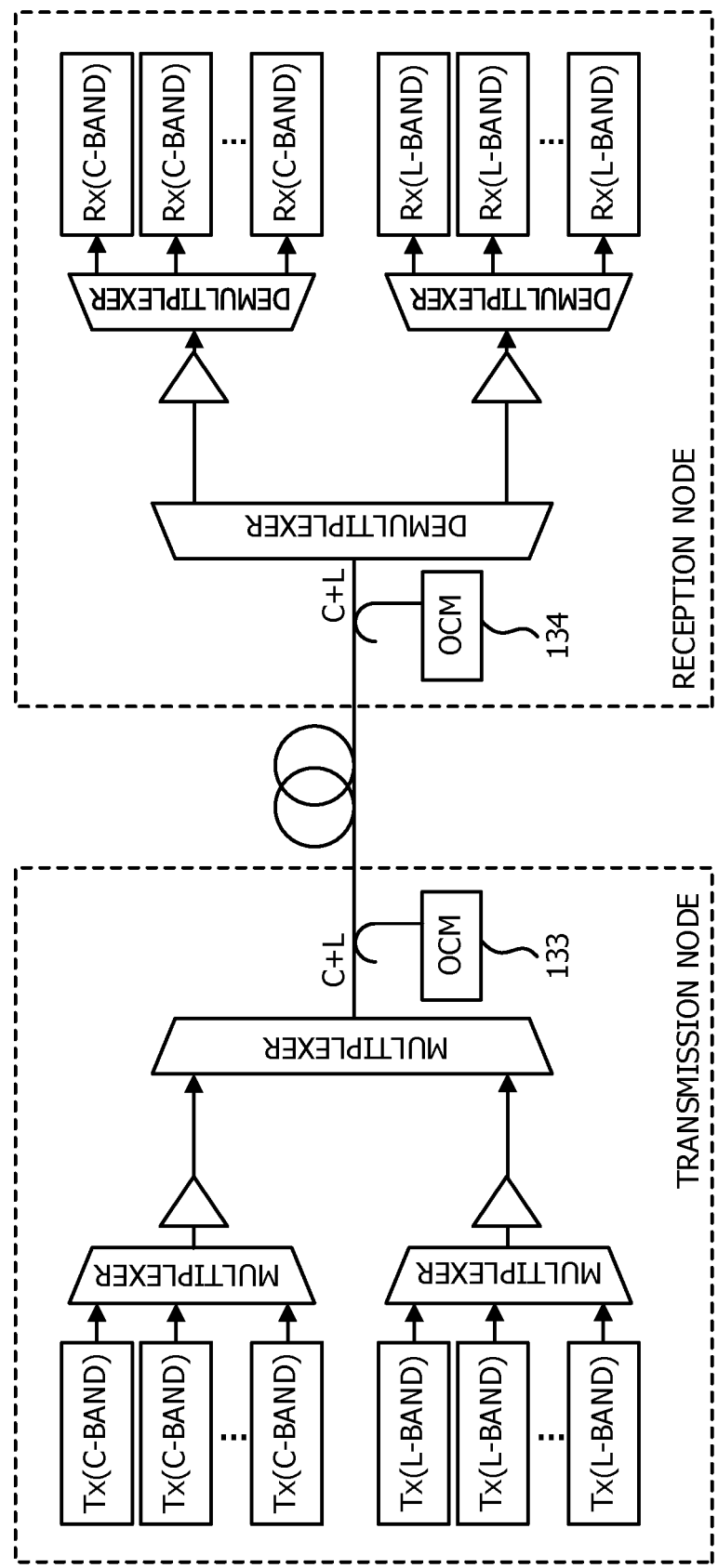
FIG. 44 is a diagram (part 1) illustrating an example of a WDM transmission system on which an optical channel monitoring system is installed.
Figure 45:
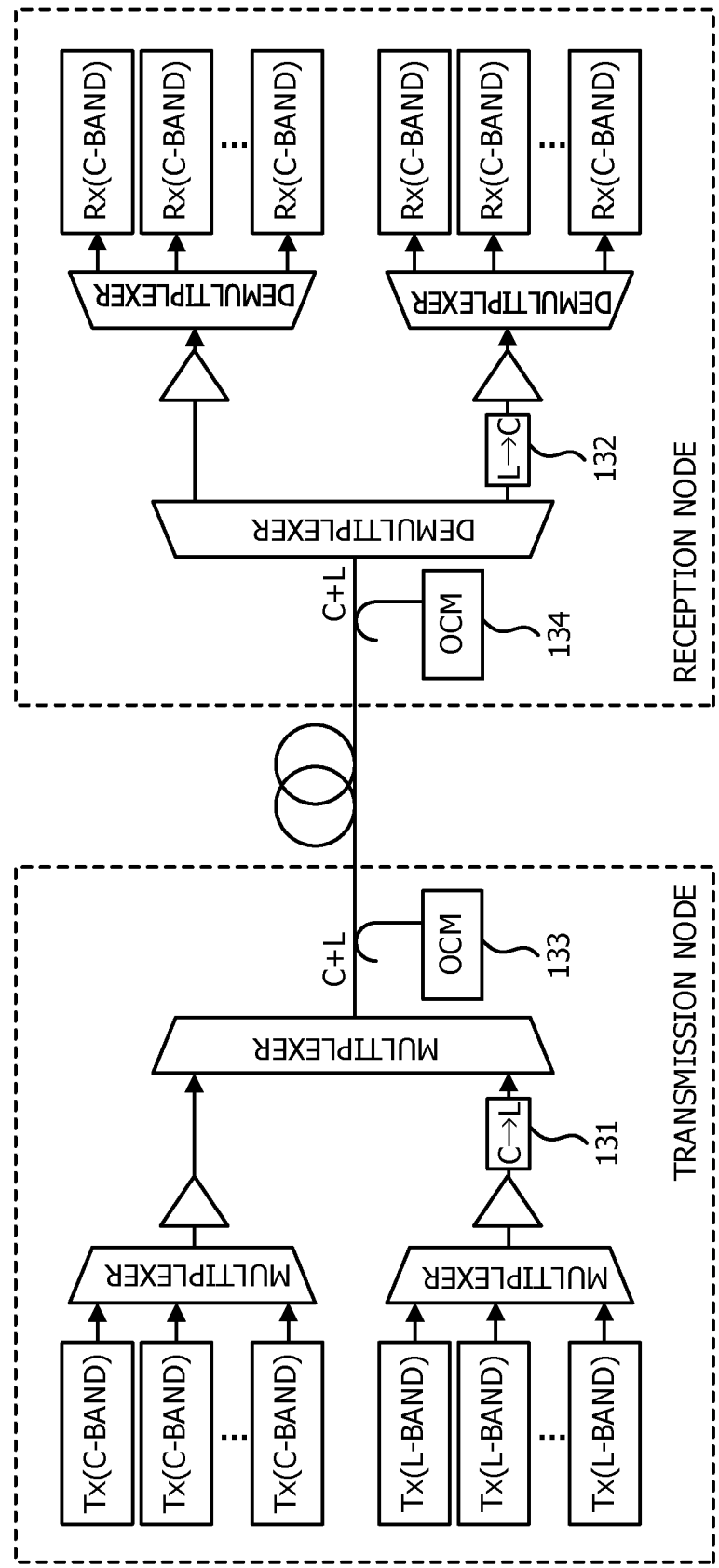
FIG. 45 is a diagram (part 2) illustrating another example of the WDM transmission system on which the optical channel monitoring system is installed.

FIGS. 44 and 45 illustrate examples of a WDM transmission system in which an optical channel monitoring system is installed. In the WDM transmission system illustrated in FIGS. 44 and 45, configurations for transmitting the WDM signal in the C-band are the same. For example, the WDM signal in the C-band is generated using a plurality of C-band optical transmitters and the WDM signal in the C-band is received using a plurality of C-band optical receivers. In contrast, configurations for transmitting the WDM signal in the L-band are different from each other in FIGS. 44 and 45.

In the WDM transmission system illustrated in FIG. 44, the WDM signal in the L-band is generated using a plurality of L-band optical transmission units, and the WDM signal in the L-band is received using a plurality of L-band optical reception units. In contrast, in the WDM transmission system illustrated in FIG. 45, the WDM signal in the L-band is generated using a plurality of C-band optical transmission units and a wavelength converter 131 that performs wavelength conversion from the C-band to the L-band. The WDM signal in the L-band is received using a wavelength converter 132 that performs wavelength conversion from the L-band to the C-band and a plurality of C-band light reception units.

The optical channel monitoring system 133 monitors the WDM signal in the C-band and the WDM signal in the L-band at a transmission node. The optical channel monitoring system 134 monitors the WDM signal in the C-band and the WDM signal in the L-band at a reception node. The optical channel monitoring systems 133 and 134 are realized by the configurations described with reference to FIGS. 32 to 43.

Variation

In the optical transmission system illustrated in FIGS. 1 to 28B, it is possible to use the optical channel monitoring system illustrated in FIGS. 32 to 43. For example, in the optical transmission system illustrated in FIG. 8, three optical channel monitors 26 (26a to 26c) are provided, and each optical channel monitor 26 monitors the WDM signal. If the optical channel monitoring system illustrated in FIG. 32 to FIG. 43 is installed on the optical transmission system illustrated in FIG. 8, the number of optical channel monitors may be reduced.

Figure 46:
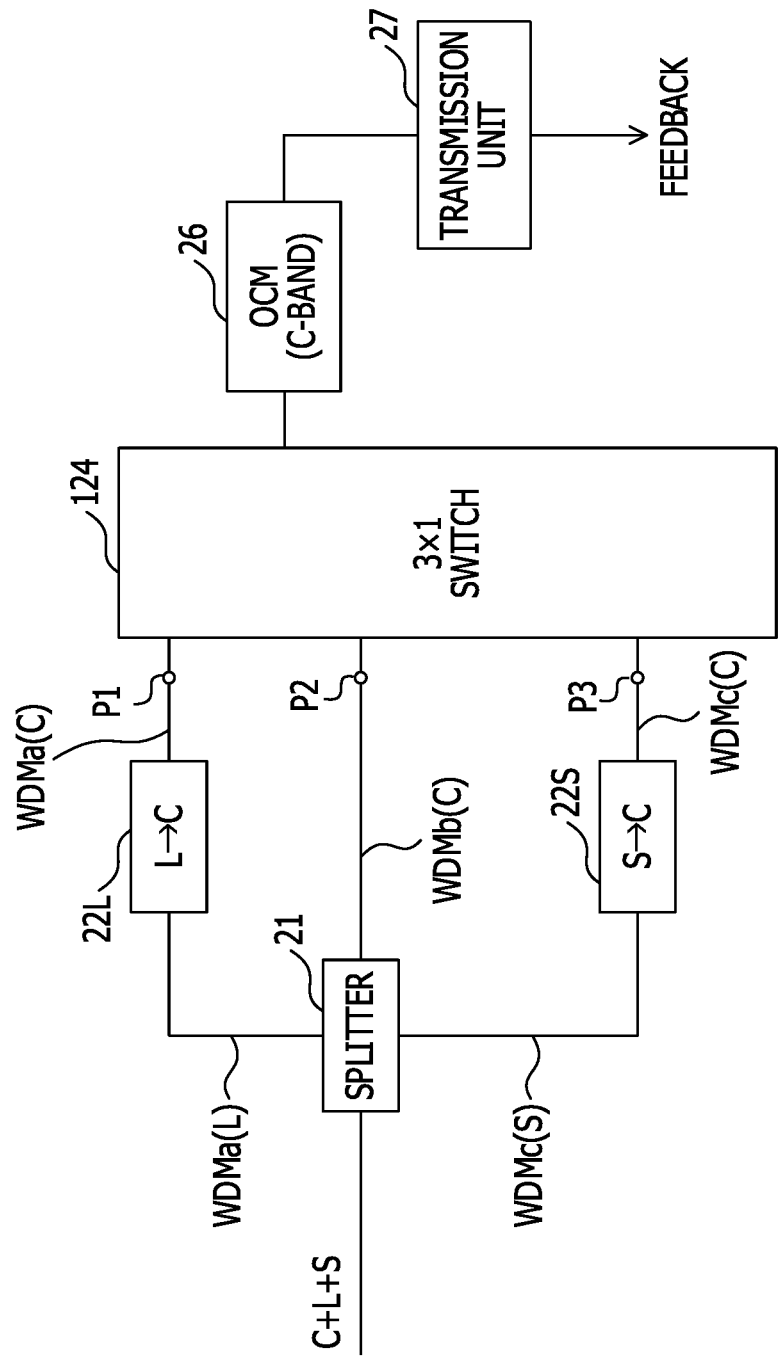
FIG. 46 is a diagram illustrating an example of the optical channel monitoring system used in the optical transmission system illustrated in FIG. 8.

FIG. 46 illustrates an example of the optical channel monitoring system used in the optical transmission system illustrated in FIG. 8. This optical channel monitoring system is provided at the reception node of the WDM signal. An optical signal including the WDM signal in the C-band (WDMb(C)), the WDM signal in the L-band (WDMa(L)), and the WDM signal in the S-band (WDMc(S)) is input to this optical channel monitoring system.

The splitter 21 extracts the WDMa(L), WDMb(C), and WDMc(S) signals from the input optical signal. The WDMa (L) signal is converted into the WDMa(C) by the wavelength converter 22L. The WDMa(C) signal is arranged in the C-band. Then, the WDMa(C) signal is guided to the port P1 of the 3×1 switch 124. The WDMb(C) signal is guided to port P2 of 3×1 switch 124 without being subjected to wavelength conversion. The WDMc(S) signal is converted into the WDMc(C) signal by the wavelength converter 22S. The WDMc(C) signal is also arranged in the C-band. Then, the WDMc(C) signal is guided to the port P3 of the 3×1 switch 124.

When the 3×1 switch 124 selects the port P1, the WDMa (C) signal is guided to the optical channel monitor 26. Accordingly, in this case, the optical channel monitor 26 monitors the power of each wavelength channel of the WDMa signal. When the 3×1 switch 124 selects the port P2, the WDMb(C) signal is guided to the optical channel monitor 26. Accordingly, in this case, the optical channel monitor 26 monitors the power of each wavelength channel of the WDMb signal. When the 3×1 switch 124 selects the port P3, the WDMc(C) signal is guided to the optical channel monitor 26. Accordingly, in this case, the optical channel monitor 26 monitors the power of each wavelength channel of the WDMc signal. In order to compensate for the wavelength characteristics of the conversion efficiencies of the wavelength converters 22L and 22S (and the wavelength converters 14L and 14S), the monitoring result of the optical channel monitor 26 may be corrected using the correction values described with reference to FIGS. 36 to 39B.

According to this configuration, using one optical channel monitor for monitoring the C-band, it is possible to monitor not only the WDM signal transmitted using the C-band but also the WDM signal transmitted using the L-band and the WDM signal transmitted using the S-band. Accordingly, the cost for monitoring and controlling the WDM signal in the optical transmission system is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus comprising:
a splitter configured to split a first wavelength division multiplexed optical signal arranged in a first wavelength band and a second wavelength division multiplexed optical signal arranged in a second wavelength band, respectively, from an optical signal including the first wavelength division multiplexed optical signal and the second wavelength division multiplexed optical signal;
a wavelength converter configured to convert a wavelength of the split second wavelength division multiplexed optical signal to generate a third wavelength division multiplexed optical signal to be arranged in the first wavelength band;
an optical monitor configured to monitor power of each wavelength channel of the third wavelength division multiplexed optical signal; and
a transmitter configured to transmit a monitoring result by the optical monitor to a transmission source node of the optical signal or a relay node of the optical signal.

2. The optical transmission apparatus according to claim 1, further comprising:
a second optical monitor configured to monitor power of each wavelength channel of the first wavelength division multiplexed optical signal,
wherein the transmitter is configured to transmit the monitoring result by the optical monitor and a monitoring result by the second optical monitor to the transmission source node of the optical signal or the relay node of the optical signal.

3. The optical transmission apparatus according to claim 1, further comprising:
a switch configured to select the first wavelength division multiplexed optical signal split by the splitter or the third wavelength division multiplexed optical signal generated by the wavelength converter,
wherein, when the first wavelength division multiplexed optical signal is selected by the switch, the optical monitor monitors power of each wavelength channel of the first wavelength division multiplexed optical signal, and
when the third wavelength division multiplexed optical signal is selected by the switch, the optical monitor monitors the power of each wavelength channel of the third wavelength division multiplexed optical signal.

4. The optical transmission apparatus according to claim 3, further comprising:
an optical coupler configured to separate the optical signal and to guide the optical signal to a predetermined specified point and the splitter;
a memory configured to store a correction value for compensating loss in the optical coupler and loss in a path from the optical coupler to the optical monitor; and
a processor configured to correct power of each wavelength channel monitored by the optical monitor with the correction value and to calculate power at the specified point.

5. An optical transmission method comprising:
extracting a first wavelength division multiplexed optical signal arranged in a first wavelength band and a second wavelength division multiplexed optical signal arranged in a second wavelength band, respectively, from an optical signal including the first wavelength division multiplexed optical signal and the second wavelength division multiplexed optical signal;
converting a wavelength of the extracted second wavelength division multiplexed optical signal to generate a third wavelength division multiplexed optical signal to be arranged in the first wavelength band;
monitoring power of each wavelength channel of the third wavelength division multiplexed optical signal; and
transmitting a monitoring result on the power of each wavelength channel of the third wavelength division multiplexed optical signal to a transmission source node of the optical signal or a relay node of the optical signal.

6. An optical transmission system comprising:
a first optical transmission apparatus configured to transmit a plurality of wavelength division multiplexed optical signals; and
a second optical transmission apparatus configured to receive the plurality of wavelength division multiplexed optical signals,
wherein the first optical transmission apparatus includes
a first transmitter configured to transmit a first wavelength division multiplexed optical signal to be arranged in a first wavelength band and a second wavelength division multiplexed optical signal to be arranged in the first wavelength band;
a first wavelength converter configured to convert a wavelength of the second wavelength division multiplexed optical signal to generate a third wavelength division multiplexed optical signal to be arranged in a second wavelength band;
a multiplexer configured to multiplex the first wavelength division multiplexed optical signal and the third wavelength division multiplexed optical signal; and
an adjustor configured to adjust power of each wavelength channel of the second wavelength division multiplexed optical signal,
the second optical transmission apparatus includes
a splitter configured to split the first wavelength division multiplexed optical signal and the third wavelength division multiplexed optical signal from an optical signal including the first wavelength division multiplexed optical signal and the third wavelength division multiplexed optical signal;
a second wavelength converter configured to convert a wavelength of the third wavelength division multiplexed optical signal split by the splitter to generate a fourth wavelength division multiplexed optical signal to be arranged in the first wavelength band;
an optical monitor configured to monitor power of each wavelength channel of the fourth wavelength division multiplexed optical signal, and
a second transmitter configured to transmit a monitoring result by the optical monitor to the first optical transmission apparatus; and the adjustor is configured to adjust power of each wavelength channel of the second wavelength division multiplexed optical signal based on the monitoring result.

7. The optical transmission system according to claim 6, wherein the adjustor is configured to adjust the power of each wavelength channel of the second wavelength division multiplexed optical signal so that the power of each wavelength channel of the fourth wavelength division multiplexed optical signal becomes uniform.

8. The optical transmission system according to claim 6, wherein the adjustor is configured to adjust the power of each wavelength channel of the second wavelength division multiplexed optical signal so that variation in power of each wavelength channel of the fourth wavelength division multiplexed optical signal is suppressed to one half.

9. The optical transmission system according to claim 6, wherein the first wavelength converter is configured to include a light source which generates a set of excitation light and a highly nonlinear fiber to which the second wavelength division multiplexed optical signal and the set of excitation light are input, and
the adjustor is configured to execute
a first process of shifting a wavelength of each channel of the second wavelength division multiplexed optical signal so that the fourth wavelength division multiplexed optical signal has predetermined power;
a second process of controlling a wavelength difference of the set of excitation light so as to compensate for wavelength shift by the first process; and
a third process of adjusting the power of each wavelength channel of the second wavelength division multiplexed optical signal so that the power of each wavelength channel of the fourth wavelength division multiplexed optical signal becomes uniform.

10. The optical transmission system according to claim 6, wherein the first wavelength converter is configured to include a light source which generates a set of excitation light and a highly nonlinear fiber to which the second wavelength division multiplexed optical signal and the set of excitation light are input, and
the adjustor is configured to execute
a first process of adjusting a zero-dispersion wavelength of the highly nonlinear fiber so that the fourth wavelength division multiplexed optical signal has predetermined power, and
a second process of adjusting the power of each wavelength channel of the second wavelength division multiplexed optical signal so that the power of each wavelength channel of the fourth wavelength division multiplexed optical signal becomes uniform.

\* \* \* \* \*